United States Patent

Kulkarni et al.

[11] Patent Number: 6,068,352
[45] Date of Patent: May 30, 2000

[54] MICROPROCESSOR-BASED CONTROL FOR TRAILER BRAKES

[75] Inventors: Chandrakumar D. Kulkarni, Battle Creek, Mich.; Bruce E. Smith, Leo, Ind.; Marcia S. Albright, Coldwater, Mich.; Stephen A. Zavodny, Fort Wayne, Ind.

[73] Assignee: Tekonsha Engineering Company, Tekonsha, Mich.

[21] Appl. No.: 09/011,125

[22] PCT Filed: Aug. 20, 1996

[86] PCT No.: PCT/US96/13507

§ 371 Date: Jan. 20, 1998

§ 102(e) Date: Jan. 20, 1998

[87] PCT Pub. No.: WO97/07003

PCT Pub. Date: Sep. 27, 1997

[51] Int. Cl.[7] .................................................. B60T 13/72
[52] U.S. Cl. .................................. 303/20; 303/3; 303/124
[58] Field of Search ............................... 303/3, 7, 15, 20, 303/124; 188/112 R; 364/426.01

[56] References Cited

U.S. PATENT DOCUMENTS

| | | | |
|---|---|---|---|
| 2,228,631 | 1/1941 | Kuiper | 188/3 |
| 3,519,805 | 7/1970 | Throne-Booth | 235/150.2 |
| 3,601,794 | 8/1971 | Blomenkamp et al. | 340/62 |
| 3,738,710 | 6/1973 | Pokrinchak et al. | 303/20 |
| 3,780,832 | 12/1973 | Marshall | 188/3 R |
| 3,897,979 | 8/1975 | Vangalis et al. | 303/24 BB |
| 3,908,782 | 9/1975 | Lang et al. | 180/103 |
| 3,909,075 | 9/1975 | Pittet, Jr. et al. | 303/24 |
| 3,953,084 | 4/1976 | Pittet, Jr. et al. | 303/24 R |
| 3,955,652 | 5/1976 | Nilsson et al. | 188/112 |
| 3,967,863 | 7/1976 | Tomecek et al. | 303/24 C |
| 3,981,542 | 9/1976 | Abrams et al. | 303/20 |
| 3,981,544 | 9/1976 | Tomecek et al. | 303/21 AF |
| 4,030,756 | 6/1977 | Eden | 303/24 A |
| 4,042,810 | 8/1977 | Mosher | 235/150.2 |
| 4,043,608 | 8/1977 | Bourg et al. | 303/104 |
| 4,050,550 | 9/1977 | Grossner et al. | 188/112 |
| 4,084,859 | 4/1978 | Bull et al. | 303/106 |
| 4,122,434 | 10/1978 | Jensen | 340/52 B |

(List continued on next page.)

FOREIGN PATENT DOCUMENTS 2157820  9/1995  Canada .

*Primary Examiner*—Chris Schwartz
*Attorney, Agent, or Firm*—Price, Heneveld, Cooper, DeWitt & Litton

[57] ABSTRACT

An electronic brake controller for controlling the brakes of a towed vehicle in response to commands from the towing vehicle. The controller implements a microcontroller (10) that works in conjunction with analog circuit technology. In a preferred embodiment, the brake controller includes an input circuit (16) for generating a brake level signal representing the braking force to be applied by the towed vehicle's brakes, a display circuit (22) including a plurality of indicator lights, a power switching circuit (24) adapted for coupling to the brakes of the towed vehicle and to the power supply of the towing vehicle, for selectively supplying power from the towing vehicle power supply to the brakes of the towed vehicle in response to a switching control signal supplied to a control input terminal, a current sensing circuit (26) for sensing a level of braking current supplied to the brakes of the towed vehicle through the power switching circuit (24), and for generating a current level signal representing the sensed level of braking current, and a microcontroller (10) for generating and supplying a switching control signal to the control input terminal of said power switching circuit (24) thereby causing the power switching circuit (24) to deliver a braking current to the brakes of the towed vehicle that is related to the brake level signal supplied to the microcontroller (10) by the input circuit (16), the microcontroller (10) illuminates one or more of the indicator lights of the display circuit (22) to indicate a relative level of braking of the towed vehicle brakes and controls one or more of the indicator lights to indicate that the towed vehicle brakes are or are not properly connected to the power switching circuit (24).

76 Claims, 41 Drawing Sheets

U.S. PATENT DOCUMENTS

| | | | |
|---|---|---|---|
| 4,277,895 | 7/1981 | Wiklund | 33/366 |
| 4,295,687 | 10/1981 | Becker et al. | 303/20 |
| 4,386,427 | 5/1983 | Hosaka | 371/11 |
| 4,398,252 | 8/1983 | Frait | 364/426 |
| 4,402,047 | 8/1983 | Newton et al. | 364/426 |
| 4,550,372 | 10/1985 | Kahrs | 364/426 |
| 4,587,655 | 5/1986 | Hirao et al. | 371/12 |
| 4,660,418 | 4/1987 | Greenwood et al. | 73/514 |
| 4,721,344 | 1/1988 | Frait et al. | 303/20 |
| 4,722,576 | 2/1988 | Matsuda | 303/92 |
| 4,726,627 | 2/1988 | Frait et al. | 303/24 R |
| 4,836,616 | 6/1989 | Roper et al. | 303/92 |
| 4,849,655 | 7/1989 | Bennett | 307/309 |
| 4,850,656 | 7/1989 | Ise et al. | 303/100 |
| 4,856,850 | 8/1989 | Aichele et al. | 303/20 |
| 5,032,821 | 7/1991 | Domanico et al. | 340/440 |
| 5,044,697 | 9/1991 | Longyear et al. | 303/14 |
| 5,050,937 | 9/1991 | Eccleston | 303/7 |
| 5,050,940 | 9/1991 | Bedford et al. | 303/100 |
| 5,058,960 | 10/1991 | Eccleston et al. | 303/24.1 |
| 5,139,315 | 8/1992 | Walenty et al. | 303/95 |
| 5,149,176 | 9/1992 | Eccleston | 303/20 |
| 5,255,962 | 10/1993 | Neuhaus et al. | 303/111 |
| 5,333,948 | 8/1994 | Austin et al. | 303/24.1 |
| 5,352,028 | 10/1994 | Eccleston | 303/20 |
| 5,606,308 | 2/1997 | Pinkowski . | |
| 5,615,930 | 4/1997 | McGrath et al. . | |
| 5,620,236 | 4/1997 | McGrath et al. | 303/7 |
| 5,741,048 | 4/1998 | Eccleston | 303/7 |
| 5,785,393 | 7/1998 | McGrath et al. . | |

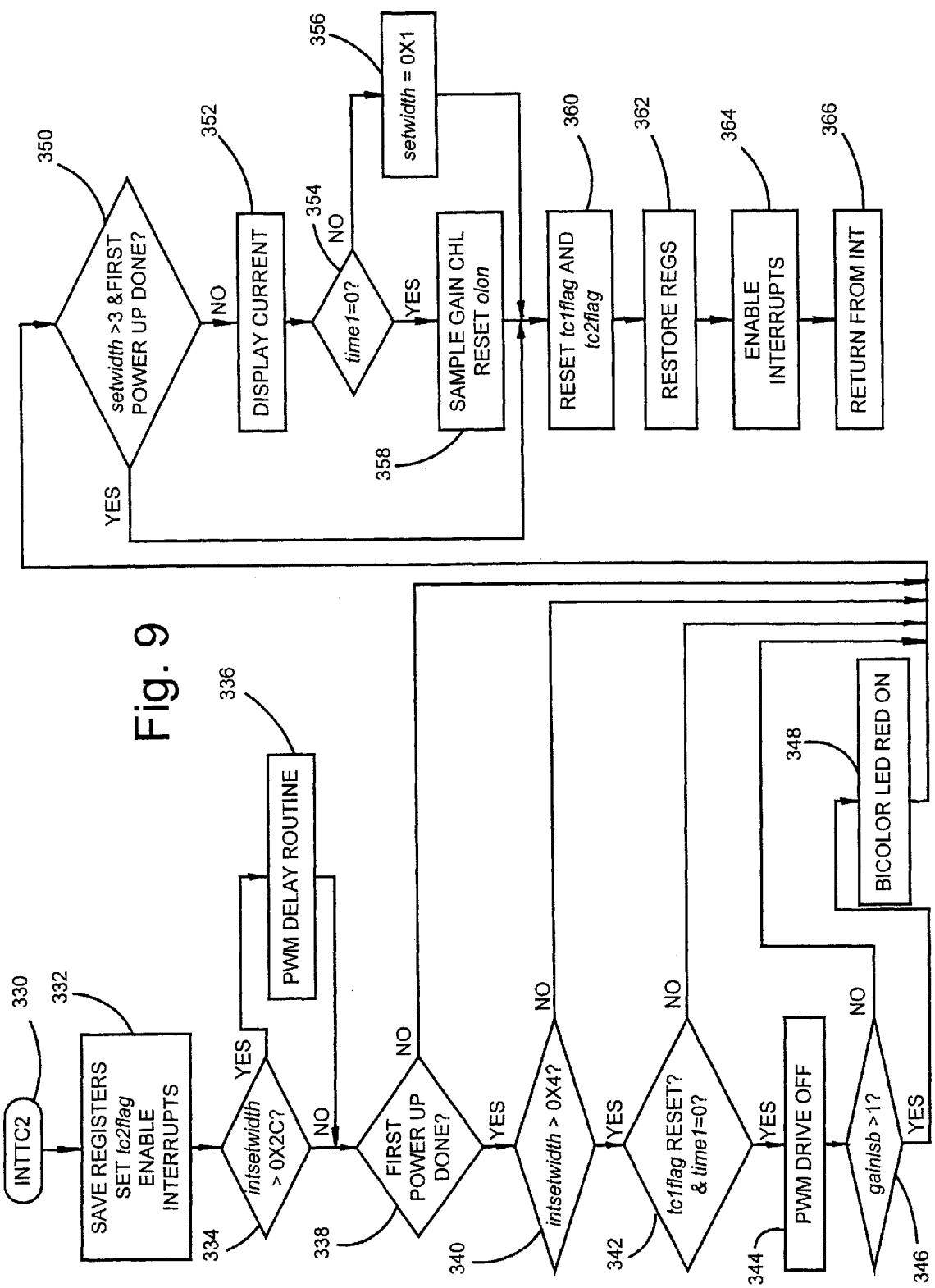

MICROPROCESSOR-BASED CONTROL FOR TRAILER BRAKES

BACKGROUND OF THE INVENTION

This invention relates to controllers for electrically actuated braking systems such as those used to apply the brakes of towed vehicles, i.e., trailers, in response to commands from the towing vehicle. More particularly, the invention relates to electronic controllers for braking systems which operate in response to inertial sensors and/or manually actuated switches, or the like, to actuate a towed vehicle's brakes in a particular controlled manner.

Substantial effort and progress has been made towards the goal of providing more stable and more responsive electronic brake system controllers which actuate the electromagnetic brake shoe actuators of a towed vehicle. For example, it is known that continuous braking excitation is likely to promote trailer brake lockup which causes a substantial decrease in braking efficiency and loss of operator control. Prior art brake controllers have eliminated these undesirable effects by applying pulsating excitation to the brakes by means of a constant pulse width applied at varying frequencies or a varying pulse width applied at a constant frequency. It is also known that trailer brake lockup may occur if the towed vehicle's brakes are applied too rapidly. However, the brakes may feel sluggish and may not be fully actuated in a timely manner if the brake current is applied too slowly. Prior art controllers have been designed to apply current to the brakes in a controlled manner which avoids these problems and which releases the brakes rapidly when the brake actuation signal is removed to prevent continued actuation of the towed vehicle's brakes. Another example of progress in prior art brake controllers is the accommodation of different towed vehicle weights and brake system characteristics which are variables having a substantial impact upon the proper braking of the towed vehicle.

Although substantial progress has been made in brake system controllers, most of these prior art devices have relied on the extensive use of analog technologies to implement the controller circuitry. There are several drawbacks to these analog designs. First, analog circuits often exhibit operational variations (drift) over temperature extremes and component variability. Second, because the operation of the controller is hardwired into the design of the circuitry, these prior art devices have only limited flexibility which necessitate complete redesigns of the circuitry when changes are desired in the brake controller operational parameters or when the addition of new operational features are desired. Finally, since analog, designs rely on small variations in voltage during normal operation, they are often sensitive to voltage fluctuations and radio frequency noise sources which may cause operational problems.

SUMMARY OF THE INVENTION

The present invention provides a new and more effective electronic brake system controller that eliminates many of the above-mentioned problems of the prior art devices caused by the reliance on analog circuit technologies.

The electronic brake controller of the present invention implements a microcontroller-based design that works in conjunction with analog circuit technology to provide improved operation and reliability over an extended temperature range and an improved response to braking conditions. The programming of the microcontroller can be quickly modified and adapted to implement a variety of analog circuits, resulting in a brake controller that has the flexibility to provide varied features and capabilities.

In the preferred embodiment, the brake controller of the present invention applies pulsating excitation to the brakes of the towed vehicle in a controlled manner such that brake lockup is avoided, and provides a gain adjustment control that accommodates different towed vehicle weights and brake system characteristics. Furthermore, the brake controller displays the magnitude of the braking current, and terminates the braking current if the magnitude exceeds a threshold value.

One aspect of the present invention is to provide a brake controller which implements a microcontroller. Another aspect of the present invention is to provide a brake controller having a microcontroller which is programmed to generate a pulse width modulated (PWM) signal. A further aspect is the use of one programming interrupt to switch the PWM drive signal high and another programming interrupt to switch the PWM drive signal low, and to enable one interrupt to switch the signal both high and low if the demand for braking current exceeds a particular threshold. Still another aspect of the present invention is to provide a brake controller having a microcontroller which generates a PWM drive signal that has a duty cycle which is inversely proportional to the demand for brake current. Yet another aspect is to provide a brake controller which implements both software and hardware to sense the magnitude of brake current.

Still another aspect of the present invention is to provide a brake controller which discontinues brake current supply when its magnitude exceeds a particular threshold, and thereafter periodically determines if the threshold continues to be exceeded. Another aspect of the brake controller of the present invention is that it enables an operator to ascertain and adjust the threshold position of a decelerometer, and to do so by use of electronic means and optical readout. Yet another aspect of the present invention is to use a bicolored LED to determine the threshold position.

Another aspect of the present invention is to provide a brake controller which enables an operator to selectively input the number of axles of a towed vehicle, and to do so by use of electronic means. An additional aspect of the brake controller is that it uses multiple LEDs to indicate the magnitude of brake current. Yet another aspect is to perform a method of brake current magnitude indication which is dependent on the number of axles of a towed vehicle, and the flashing of the LEDs when overload current conditions exist.

A further aspect of the present invention is a brake controller having a decelerometer which is disabled when a manual control is employed. Another aspect of the present invention is to provide a brake controller having a self-test mode of operation. Yet another aspect is the provision of a brake controller having a power control circuit which provides a separate means of controlling the application of brake current. A further aspect is a power control circuit which enables brake current to be applied only if a manual control is operated or if the brake lights of a towing vehicle are lit.

Still another aspect of the brake controller of the present invention is the provision of a verification to an operator that the brakes of a towed vehicle are electrically connected to the brake controller. An additional aspect of the invention is the provision of a brake controller which discontinues brake current and notifies an operator when an open ground exists. Another aspect is a brake controller having a control circuit which monitors the functioning of a microcontroller and resets it if a malfunction is detected.

Another aspect of the invention is the provision of a brake controller having a gain adjustment circuit which initiates the activation and deactivation of a towed vehicle's brakes using different time constants. Further aspects include the use of means including a Zener diode to maintain a (constant operating voltage to the sensor input circuit, and the use of means including a potentiometer in the sensor input circuit so that the current level therein can be adjusted to compensate for component tolerances. Still another aspect is a brake controller which uses means including a capacitor or other means to increase a driving voltage that is supplied to a power switching circuit.

Yet another aspect of the present invention is to provide a brake controller where the output current sampling i, not performed across a resistor, but instead is done using the drain to source resistance of the output MOSFETS during any "on" state (Rds/on) to save cost and space on the circuit board, to eliminate the heat that is generated by such a resistor, and to prevent the brake controller from overheating and entering a thermal runaway situation. Another insect is a brake controller that does not utilize a power control circuit and thereby is lower in cost.

A further aspect of the present invention is a brake controller that uses a baseline level which is correlated to the temperature dependency and/or tolerances of its components and which is established when detecting whether the brakes are connected. Another aspect is a brake controller that provides a display of the level of braking current via LEDs that is done by analyzing the duty cycle of the PWM drive signal instead of using the current values actually calculated by the current sense circuit.

Still another aspect is a brake controller that provides a reduced level of braking current in response to a braking demand by the operator of the vehicle when marginal overload current conditions were originally present. An additional aspect is a brake controller that can detect when a lamp load is mistakenly connected to a brake magnet terminal. Still another aspect is a brake controller that, after a self-test is completed, the microcontroller automatically enters normal brake controller operation even if a voltage is maintained at the microcontroller's self-test pin.

To achieve these and other aspects and advantages, the brake controller of the present invention comprises an input circuit for generating a brake level signal representing the desired braking, a power switching circuit, and adapted for coupling to the brakes of the towed vehicle and to the power supply of the towing vehicle for selectively supplying power from the towing vehicle power supply to the brakes of the towed vehicle in response to a switching control signal supplied to a control input terminal, and a microcontroller coupled to the input circuit and to the power switching circuit, the microcontroller generates and supplies a switching control signal to the control input terminal of the power switching circuit thereby causing the power switching circuit to deliver a braking current to the brakes of the towed vehicle that is proportional to the brake level signal supplied to the microcontroller by the input circuit.

Additionally, the brake controller may include a brake light circuit adapted for coupling to a brake light of a towing vehicle for generating an output signal when the brake light switch is activated as a basis for determining that the brakes of the towing vehicle are actuated. The input circuit may include a sensor input circuit coupled to the brake light circuit for sensing the deceleration of the towing vehicle in response to the output signal from said brake light circuit, and a manual input circuit for receiving input from an operator of the towing vehicle of a desired braking force of the towed vehicle's brakes.

The brake controller may also include a gain adjustment circuit coupled to the manual input circuit and to the sensor input circuit for receiving brake level signals output therefrom that are indicative of a desired level of braking and for generating a gain-adjusted brake level signal in response to a brake level signal received from either the manual input circuit or the sensor input circuit. Additionally, the brake controller may include a power control circuit adapted for coupling to a power supply of the towing vehicle for supplying power to the brakes of the towed vehicle through the power switching circuit.

The brake controller may further include a current sensing circuit for sensing a level of braking current supplied from the power control circuit to the brakes of the towed vehicle through the power switching circuit, and for generating a current level signal representing the sensed level of braking current and a display circuit for displaying information to the operator of the towing vehicle.

These and other features, advantages and objects of the present invention will be further understood and appreciated by those skilled in the art by reference to the following specification, claims and appended drawings.

BRIEF DESCRIPTION OF THE DRAWINGS

In the drawings:

FIG. 9 is the flow diagram of the "INTTC2" interrupt for the microcontroller of the present invention;

DETAILED DESCRIPTION OF PREFERRED EMBODIMENTS

Figure 1:
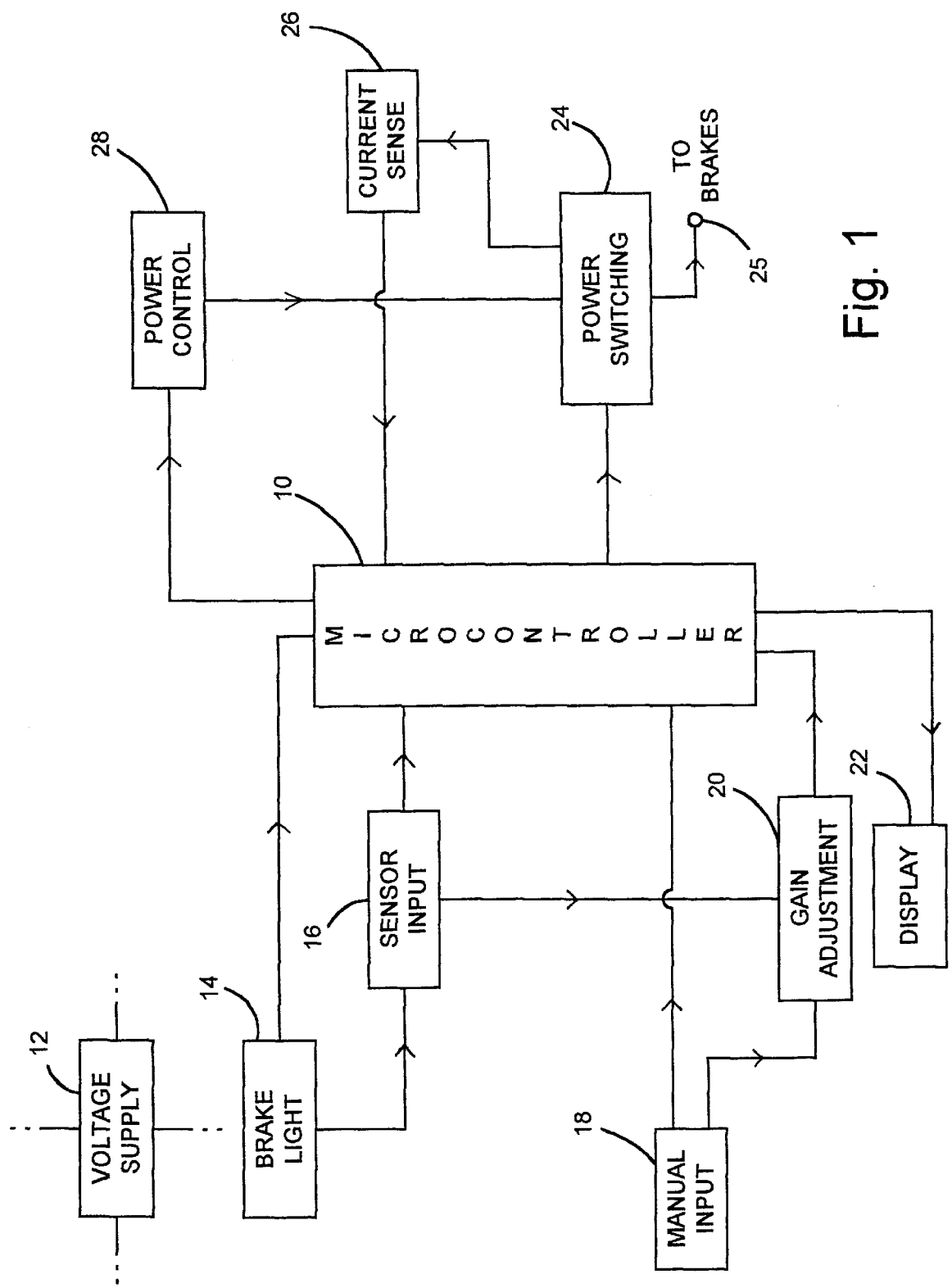
FIG. 1 is a block circuit diagram showing the brake controller of the present invention.

Referring now to FIG. 1, shown is a block circuit diagram of the brake controller of the present invention having a microcontroller 10 as its central component. Connected to microcontroller 10 are a variety of circuits which, starting from the upper left and proceeding counterclockwise, include a voltage supply circuit 12, a brake light circuit 14, a sensor input circuit 16, a manual input circuit 18, a gain adjustment circuit 20, a display circuit 22, a power switching circuit 24, a current sense circuit 26, and a power control circuit 28.

The general operation of the brake controller during normal operating conditions begins with signals supplied to gain adjustment circuit 20 from either sensor input circuit 16 or manual input circuit 18 when braking of the towed vehicle is demanded. The gain adjustment circuit generates a signal output that represents the magnitude of the desired braking, and is received by microcontroller 10 which generates a PWM drive signal in response thereto. This signal is supplied to power switching circuit 24 which, in conjunction with power control circuit 28, applies current to the towed vehicle's brakes according to the duty cycle of the PWM drive signal. Current sense circuit 26 senses the current draw of the towed vehicle's brakes and in cooperation with microcontroller 10 monitors for a short circuit condition in the brakes. Preferably, current sense circuit 26 is disabled until a predetermined delay period lapses following each time the PWM drive signal is turned off and is disabled prior to each time the PWM drive signal is turned on in order to prevent misreading of the braking current. Although sensor input circuit 16 is preferably constructed using the inertial sensor described below, it could also be implemented using a ramp circuit that gradually increases (i.e., ramps) the braking level signal during the time that the brake light is illuminated. A more detailed discussion of the operation of the brake controller and its individual components is provided below.

Figure 2A:
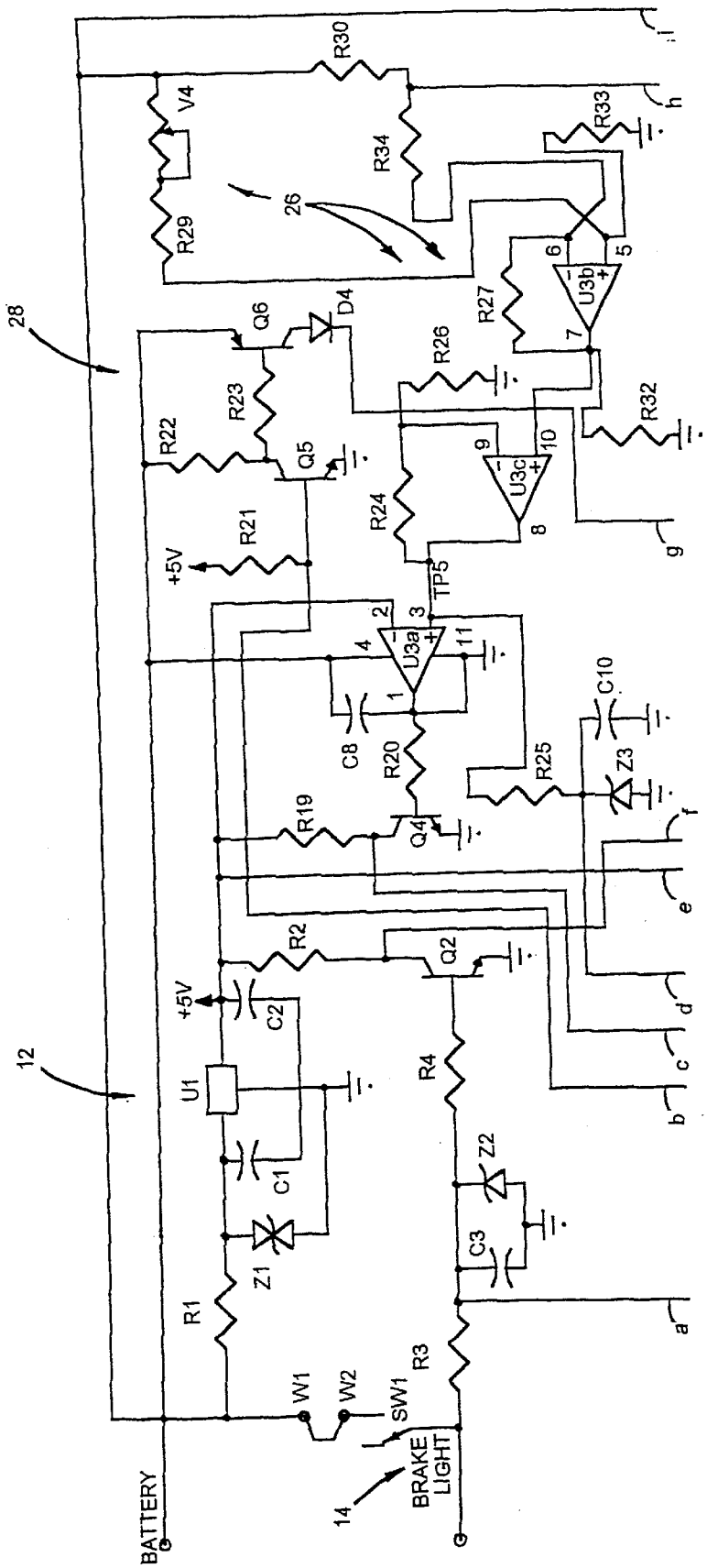
FIG. 2 is a schematic circuit diagram showing the brake controller of the present invention.
Figure 2B:
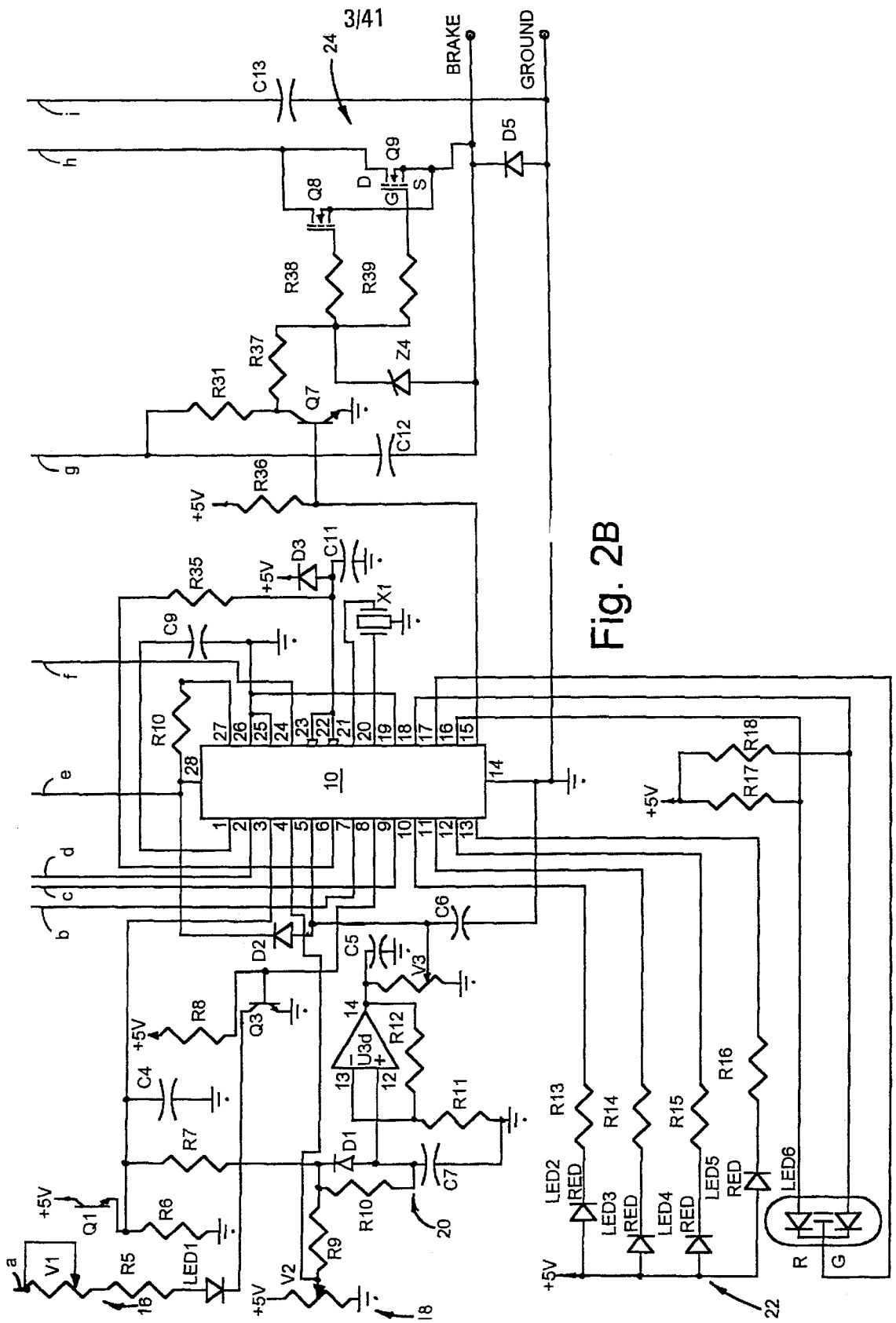

FIG. 2 is a schematic diagram showing the details of the brake controller circuits and their interconnection with one another and the microcontroller, with each of the brake controller components generally indicated by the reference numerals assigned above. Microcontroller 10 is the central component of the brake controller of the present invention and, in the preferred embodiment, is a Toshiba TMP47C241 microcontroller. The microcontroller 10 has four channels of analog input, with pin 2 receiving input from the current sense circuit 26, pin 3 receiving input from the sensor input circuit 16, pin 4 receiving input from the manual input circuit 18, pin 5 receiving input from the gain adjustment circuit 20. The microcontroller 10 has two input channels with pin 9 receiving input from the current sense circuit 20, and pin 24 receiving input from the brake light circuit 14. Microcontroller 10 has ten output channels, with pin 7 connected to the power control circuit 28, pin 8 connected to the sensor input circuit 16, pins 10–13 and 16–18 connected to the display circuit 22, and pin 15 connected to the power switching circuit 24. Connected to pins 20 and 21 is ceramic resonator X1 which provides a 4 MHz clock frequency for proper functioning of the microcontroller. Also connected to the microcontroller via pins 6, 22, and 23 is a watchdog control circuit consisting of resistor R35, diode D3, and capacitor C11. This circuit monitors pin 6 which, during normal operating conditions of the microcontroller, is kept in a high state. However, pin 6 is pulled low if the microcontroller malfunctions, causing the watchdog circuit to reset the microcontroller through reset pin 22. The watchdog control circuit also provides a "power on" reset which, during power up, keeps the microcontroller in a reset state until it has received its full operating voltage and ceramic resonator X1 is providing the proper frequency, thus preventing the microcontroller from operating until it is in proper sequence and is internally set. In the preferred embodiment, R35 is a 10 KOhm resistor and C11 is a 0.22 uF capacitor. Furthermore, FIG. 2 shows pins 14, 25, and 26 of microcontroller 10 connected to ground, pins 27 and 28 connected to each other by means of resistor R40 which is a 10 KOhm resistor in the preferred embodiment, and pin 1 connected to ground through capacitor C9 which is a 0.01 uF capacitor in the preferred embodiment. The programming for microcontroller 10 is described below in connection with FIGS. 3–11.

FIG. 2 shows the voltage supply circuit, generally indicated by the numeral 12, which supplies operating voltages to the brake controller components. This circuit is connected to the towing vehicle's battery wherefrom it receives a 12-volt supply of operating voltage. The 12-volt battery supply voltage is directly supplied to power control circuit 28 and, in some circumstances (detailed below), to brake light circuit 14 by means of switch SW1. Voltage regulator U1 receives the 12-volt battery supply voltage through resistor R1 and converts it to 5 volts which is supplied to the remaining brake controller components as indicated in FIG. 2. Varistor Z1 provides voltage protection for U1 and has a clamping voltage of 22 volts. In the preferred embodiment, R1 is a 51 Ohm resistor, C1 is a 0.27 uF capacitor, and C2 is a 220 uF capacitor.

The brake light circuit, generally indicated by the numeral 14 in FIG. 2, is connected to the brake lights of the towing vehicle (not shown) and supplies a signal to the microcontroller 10 indicating whether the brake pedal of the towing vehicle is pressed. This signal is necessary for adjusting the sensitivity of the decelerometer of sensor input circuit 16 and for setting the number of axles of the towed vehicle (described in detail below). If the brake pedal has been pressed, the voltage generated at the brake lights drives the base of transistor Q2 through resistors R3 and R4, causing Q2 to conduct such that its collector voltage is lowered. The collector voltage of Q2, and thus the signal indicating whether the brake pedal has been pressed or not, is supplied to pin 24 of microcontroller 10. In addition to receiving voltages from the brake lights of the towing vehicle, the brake light circuit may also receive the 12-volt battery supply voltage through switch SW1, as mentioned above. Switch SW1 may be closed when the manual control of manual input circuit 18 is operated, causing the towing vehicle's brake lights to light even though the brake pedal of the towing vehicle may not be pressed. The use of SW1 in this manner, as a means of lighting the towing vehicle's brake lights to indicate manual braking, is required by law in some foreign countries, although unnecessary in the United States. Brake light circuit 14 is also connected to sensor input circuit 16, for reasons which will be discussed below. In the preferred embodiment, R2 is a 10 KOhm resistor, R3 is a 150 Ohm resistor, R4 is a 10 KOhm resistor, C3 is a 0.1 uF capacitor, and Z2 is a 7.5-volt Zener diode.

FIG. 2 show the sensor input circuit, generally indicated by the numeral 16, which signals the microcontroller to apply current to the towed vehicle's brakes if braking of the towing vehicle is of sufficient magnitude. The main component of this circuit is a decelerometer consisting of infrared LED1, phototransistor Q1, and a mechanical "flag" therebetween (not shown) that modulates the light incident on Q1 from LED1. When microcontroller 10 maintains a voltage at pin 8 such that transistor Q3 is active, current will be able to flow through LED1 such that light is emitted. LED1 is connected to brake light circuit 14 through potentiometer V1 and resistor R5 such that LED1 receives its operating current, and thus the decelerometer is active, only when the brake lights are lit. This voltage supplied by the brake light circuit is maintained at 7.5 volts by means of Zener diode Z2 and filtered by capacitor C3 in order to prevent voltage fluctuation that would undesirably cause the current through LED1 to fluctuate. Thus, a constant current flows through LED1 when the brake lights are lit and Q3 is active. Potentiometer V1 is in series with LED1 and is adjusted such that the constant current flowing through LED1 is set, during manufacture, to compensate for component tolerances. This is sometimes necessary in order to compensate for mechanical misalignment and tolerance differences of different brake controller. In the preferred embodiment, V1 is a 1 KOhm potentiometer and R5 is a 270 Ohm resistor. The constant current through LED1 causes it to emit a constant amount of light which is received by phototransistor Q1 to the extent permitted by the flag in between. This flag is mechanical in nature and its positioning between LED1 and Q1 is dependent on the magnitude of deceleration forces it experiences. If no deceleration forces are present, the flag allows very little light emitted by LED1 to reach Q1, and the decelerometer is said to be in a level state. As deceleration forces are increased, the flag permits increasing amounts of light to reach Q1, and the decelerometer is said to become increasingly unbalanced. The sensitivity of this decelerometer can be adjusted with an external control that changes the positioning of the flag such that more or less light is allowed through for a particular deceleration force. If the flag permits sufficient light to reach the base of phototransistor Q1, Q1 conducts and pin 3 of microcontroller 10 receives a voltage signal indicating that the decelerometer has been actuated. The voltage supplied to pin 3 of the microcontroller, although limited by the 5-volt collector voltage, is proportional to the amount of light received by Q1 and, thus, the amount of deceleration force created by the towing vehicle's brakes. The pin 3 voltage signal enables the level of sensitivity of the decelerometer to be precisely monitored by means of bicolored LED6, described in greater detail below in connection with display circuit 22. The voltage applied to pin 3 of the microcontroller is also supplied to gain adjustment circuit 20 through R7, for reasons described below. In the preferred embodiment, C4 is a 0.001 uF capacitor, and R6, R7, and R8 are 3.3 KOhm, 43 KOhm, and 22 KOhm resistors, respectively.

In the preferred embodiment of the present invention, sensor input circuit 16 is dominated by manual input circuit 18 (described below) such that the decelerometer is immediately disabled and does not contribute to the towed vehicle's braking current when the manual control of circuit 18 is actuated by the operator of the towing vehicle. Based on an input signal from manual input circuit 18, microcontroller 10 disables the decelerometer by grounding pin 8 which deactivates Q3 and prevents current from flowing through LED1.

FIG. 2 shows the manual input circuit, generally indicated by the numeral 18, having a manual control which may be actuated by the operator of the towing vehicle to cause braking of the towed vehicle at any particular time, and which is especially useful for reducing sway of the towed vehicle during normal driving conditions. The manual control of manual input circuit 18 consists of a continuous roll-on potentiometer V2 which provides up to a 5-volt signal to pin 4 of microcontroller 10 representing the magnitude of desired manual braking. This signal is also supplied through resistor R9 to gain adjustment circuit 20, described in detail below. Upon operation of the manual control of manual input circuit 18, and reaching a minimum threshold, the microcontroller disables the decelerometer of sensor input circuit 16, as described above, and may close switch SW1 such that the 12-volt battery supply voltage is supplied to brake light circuit 14, as described above. In the preferred embodiment, V2 is a 5 KOhm potentiometer and R9 is a 47 KOhm resistor.

The gain adjustment circuit, generally indicated by the numeral 20 in FIG. 2, generates a signal which controls the extent of towed vehicle braking and which is dependent on the magnitude of the signal received from either sensor input circuit 16 or manual input circuit 18. As mentioned above, when signals from both the manual input circuit and sensor input circuit are received, the manual input circuit dominates and the decelerometer of the sensor input circuit is disabled. In response to the application of an input signal from either the manual input circuit or the sensor input circuit, the voltage at pin 12 of amplifier U3d rises with a time constant defined by resistors R7, R9, and R10 and capacitor C7. As will be seen below, this gradual increase in voltage results in a gradual braking of the towed vehicle such that undesirable abrupt changes in braking current can be avoided which have a negative effect on the performance of a brake controller. In the preferred embodiment. R10 is a 150 KOhm resistor, C7 is a 1.0 uF capacitor, and the charging time is approximately 1.5 seconds. The output of amplifier U3d is controlled by potentiometer V3 which is a gain adjustment control set by the operator of the towing vehicle. V3 provides gain limiting to limit the amount of current applied to the towed vehicle's brakes such that brake lockup can be avoided. This gain limiting is preferably adjusted when trailer load and driving conditions are changed, and is in addition to the 5-volt limits provided in the manual and sensor input circuits. The resulting signal, rising with a time constant defined by R7, R9, and R10 and C7, is then supplied to pin 5 of microcontroller 10 which, through programming discussed in detail below, generates a PWM drive signal in response thereto that controls the braking of the towed vehicle. In the preferred embodiment, V3 is a 5 KOhm potentiometer, R11 and R12 are 45.3 KOhm and 47

KOhm resistors, respectively, and C5 and C6 are both 0.001 uF capacitors. Upon discontinuation of the input signal to the gain adjustment circuit, the signal applied to amplifier U3d decreases as C7 discharges through diode D1 and resistor R7 and R9. The time constant of this discharge is preferably very short such that the towed vehicle's brakes can be deactivated quickly, and is approximately 100 milliseconds in the preferred embodiment.

The power control circuit of FIG. 2 is generally indicated by the numeral 28 and provides the necessary voltage to drive MOSFETS Q8 and Q9 of power switching circuit 24, described in greater detail below. The 12-volt battery supply voltage can be supplied to the power switching circuit through transistor Q6 which is controlled by pin 7 of microcontroller 10 through transistor Q5. When the pin 7 signal is high, Q5 conducts and pulls the base of Q6 low such that the 12-volt battery voltage is supplied to the power switching circuit. However, when the pin 7 signal is low, Q6 is deactivated and the 12-volt battery voltage is not supplied to the power switching circuit through diode D4. Microcontroller 10 controls the power control circuit 28 such that the driving voltage to power switching circuit 24 is supplied only when necessary, thus preventing constant electrical excitation that would increase the quiescent current requirement from the battery. In the preferred embodiment, the driving voltage is supplied only if the manual control of manual input circuit 18 is operated or if the brake pedal of the towing vehicle is pressed such that the brake lights of brake light circuit 14 are lit. In the preferred embodiment R21, R22, and R23 are 22 KOhm, 1 KOhm, and 4.7 KOhm resistors, respectively.

The power switching circuit of FIG. 2 is generally indicated by the numeral 24 and is the means by which braking current is applied to the towed vehicle's brakes. Braking current from current sense circuit 26 (described below) and supplied to the source of MOSFETS Q8 and Q9 is applied to the towed vehicle's brakes (not shown) when MOSFETS Q8 and Q9 conduct. Two MOSFETS are employed in the preferred embodiment, although only one MOSFET may be used for proper functioning of the circuit. The driving voltage to the gates of MOSFETS Q8 and Q9, when available from power control circuit 28, is controlled by means of transistor Q7 and a PWM drive signal received from pin 15 of microcontroller 10. The PWM drive signal is generated by the microcontroller's programming and has a duty cycle which is inversely proportional to the magnitude of the input signal received from gain adjustment circuit 20. When the PWM drive signal is high, it drives Q7 such that the voltage generated by power control circuit 28 is shorted to ground and is not applied to the gates of Q8 and Q9, thus causing no current to be applied to the towed vehicle's brakes. However, when the PWM drive signal is low, Q7 is inactive and the voltage switched by power control circuit 28 is applied to the gates of Q8 and Q9 through resistors R31, R37, R38, and R39, causing Q8 and Q9 to conduct such that the towed vehicle's brakes receive current. The amount of current supplied to the towed vehicle's brakes is dependent on the duty cycle of the PWM drive signal, with a lower duty cycle corresponding to more braking current. The voltage that is provided by power control circuit 28 is held on capacitor C12 which acts as a charge pump and enables the voltage supplied to the gates of Q8 and Q9 to be in excess of 12 volts. This is preferable to drive the MOSFETS because the source of Q8 and Q9 is at approximately 12 volts by means of connection to the battery supply voltage through current sense circuit 26. Zener diode Z4 is preferably a 16-volt Zener diode that protects the gates of the MOSFETS by limiting the voltage supplied thereto to 16 volts with respect to source. In the preferred embodiment, C12 is a 100 uF capacitor, and R31, R36, R37, R38, and R39 are 1.8 KOhm, 5.6 KOhm, 270 Ohm, 270 Ohm, and 270 Ohm resistors, respectively.

The current sense circuit of FIG. 2 is generally indicated by the numeral 26 and senses the magnitude of the current supplied to the towed vehicle's brakes through MOSFETS Q8 and Q9 of power switching circuit 24. The current sense circuit is connected to the 12-volt battery supply voltage and supplies current to the drain of MOSFETS Q8 and Q9, the magnitude of which is sensed across resistor R30. The resulting signal is amplified by amplifiers U3b and U3c and their corresponding resistive networks, with potentiometer V4 providing calibration for the current sensing. In the preferred embodiment, V4 is a 5 KOhm potentiometer, and R30, R28, R29, R34, and R33 are 0.005 Ohm, 3.3 MOhm, 45.3 KOhm, 45.3 KOhm, and 301 KOhm resistors, respectively. In the preferred embodiment, R27, R32, R26, and R24 are 301 KOhm, 470 Ohm, 150 KOhm, and 300 KOhm resistors, respectively. The amplified signal is then supplied, through resistor R25, to pin 2 of microcontroller 10 which calculates the current magnitude and displays this value by means of display circuit 22, described in detail below. Microcontroller 10 compares the current magnitude to a current threshold value stored in memory which, in the preferred embodiment, is 30 amps. If the current magnitude exceeds this value, the programming of the microcontroller (described below) shuts the current off to the towed vehicle's brakes to protect the brake controller circuitry from excessive current, and samples it again approximately every ¼ second. Zener diode Z3 is preferably a 4.7-volt Zener diode which prevents the voltage supplied to pin 2 of microcontroller 10 from exceeding 5 volts, thus preventing damage to the microcontroller. In the preferred embodiment, C10 is a 0.001 uF capacitor and R25 is a 4.7 KOhm resistor.

Current sense circuit 26 also supplies the amplified signal from amplifiers U3b and U3c to the noninverting pin of amplifier U3a. When the current across R30 exceeds 30 amps, the gain distribution of U3a causes transistor Q4 to be driven which lowers the voltage supplied to pin 9 of microcontroller 10, indicating that "overload" current conditions exist. Thus, amplifier U3a and transistor Q4 provide the analog equivalent of the threshold current sensing accomplished by means of pin 2 and programming of microcontroller 10, as described above. In the preferred embodiment, C8 is a 0.1 uF capacitor, R20 is a 47 KOhm resistor, and R19 is a 1 KOhm resistor.

The display circuit of FIG. 2 is generally indicated by the numeral 22 and consists of LEDs 2–5, a bicolored red/green LED6, and associated current limiting resistors. In the preferred embodiment, R13, R14, R15, and R16 are each 270 Ohm resistors, and R17 and R18 are each 470 Ohm resistors. LEDs 2–5 are connected to pins 10 through 13 of microcontroller 10 and are primarily used to display the magnitude of current supplied to the towed vehicle's brakes, although other applications are described below in connection with the programming of the microcontroller. Bicolored LED6 is connected to pins 16 through 18 of microcontroller 10 and has a red component and a green component. The red component of bicolored LED6 is activated whenever current is applied to the towed vehicle's brakes, with a brighter intensity corresponding to higher braking current. The green component of LED6 is activated when the decelerometer of sensor input circuit 16 is level such that pin 3 of microcontroller 10 is within a specific range. Both components of LED6 can be used in conjunction with the external control of sensor input circuit 16 to adjust the sensitivity of the decelerometer. By analysis of the point at which the output of LED6 changes from green to red upon application of the brake pedal of the towing vehicle, the towing vehicle's operator can bring the decelerometer to a threshold position whereby even a slight braking of the towing vehicle changes the state of the decelerometer from level to unbalanced and causes an immediate contribution to the towed vehicle's braking current.

Now that the circuits comprising the brake controller of the present invention have been detailed, the programming for the microcontroller, which controls and coordinates the operation of the brake controller components and the braking of the towed vehicle, is discussed below. The flow diagrams for this programming are shown in FIGS. 3–11.

Figure 3:
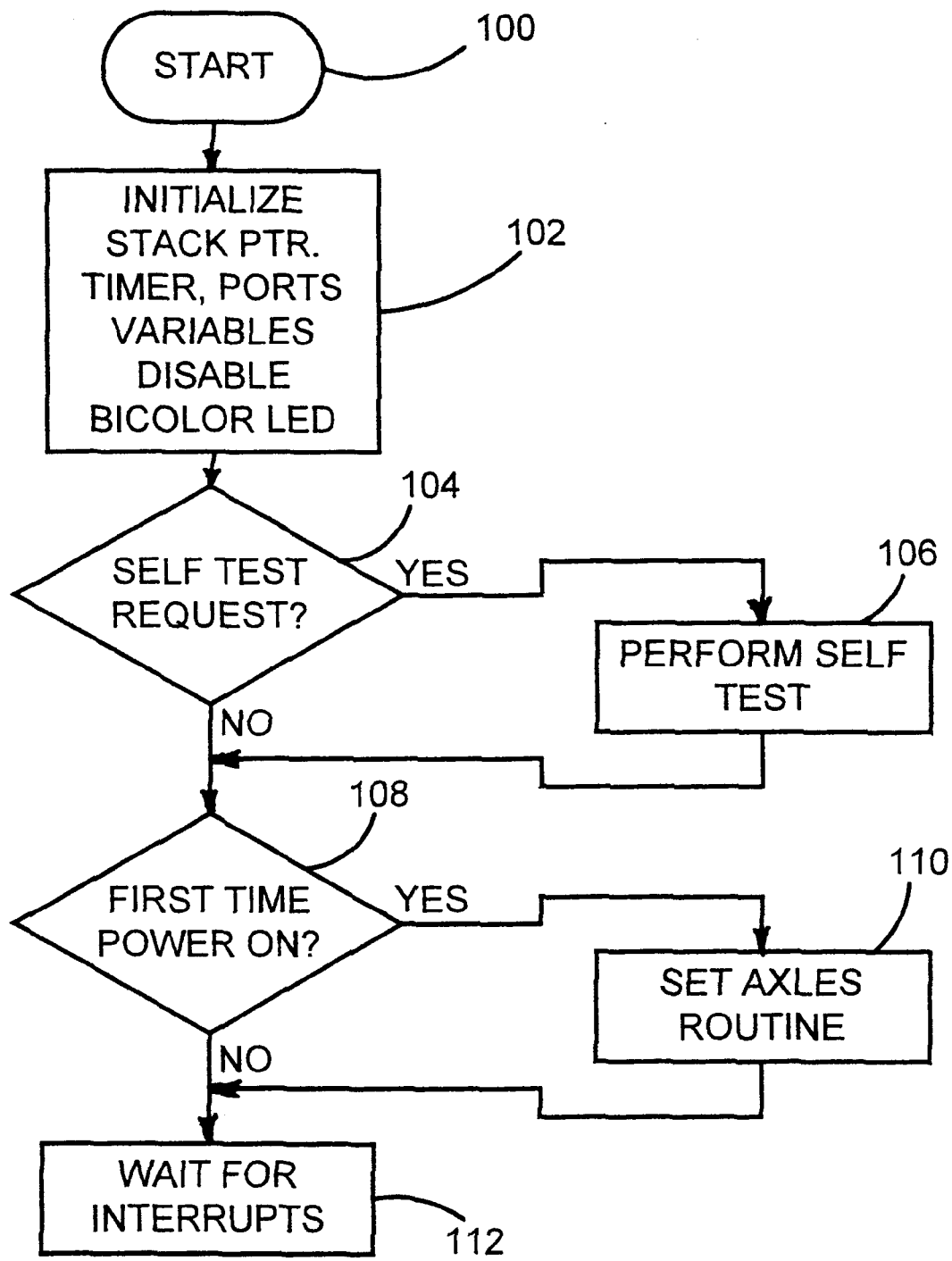
FIG. 3 is the flow diagram of the main program for the microcontroller of the present invention.

The main program for the microcontroller is shown in FIG. 3. The program begins with block 100 that signifies the beginning of the main program. Next, block 102 initializes the stack pointer for proper sequencing of the interrupts and subroutines, and initializes the microcontroller's timer, ports, and variablesand disables the bicolor LED. Block 102 also enables the interrupts INT1, INTTC1, and INTTC2, described in greater detail below in connection with FIGS. 7, 8, and 9, respectively. Next, block 104 determines whether a "self-test" request has been made by means of the grounding of pin 27 of the microcontroller. The self-test is preferably only performed by the manufacturer and tests whether the controller circuitry is functioning properly. If a self-test request has been made, the program proceeds to block 106 which calls the SELF-TEST subroutine, described in greater detail below in connection with FIG. 4. Upon return, or if a self-test request has not been made, the program proceeds to block 108 which determines whether it is the first time that the power has been turned on to the microcontroller. Block 108 makes this determination by analyzing variable firstpowerup which is reset at the time of first powerup and subsequently set during the SET AXLES subroutine, described in greater detail below in connection with FIG. 5. If variable firstpowerup is reset, the program proceeds to block 110 which calls the SET AXLES subroutine. Upon return, or if it is not the first time that the power has been turned on to the microcontroller, the program proceeds to block 112 to wait for interrupts INT1, INTC1, and INTTC2, described in greater detail below in connection with FIGS. 7, 8, and 9, respectively.

Figure 4:
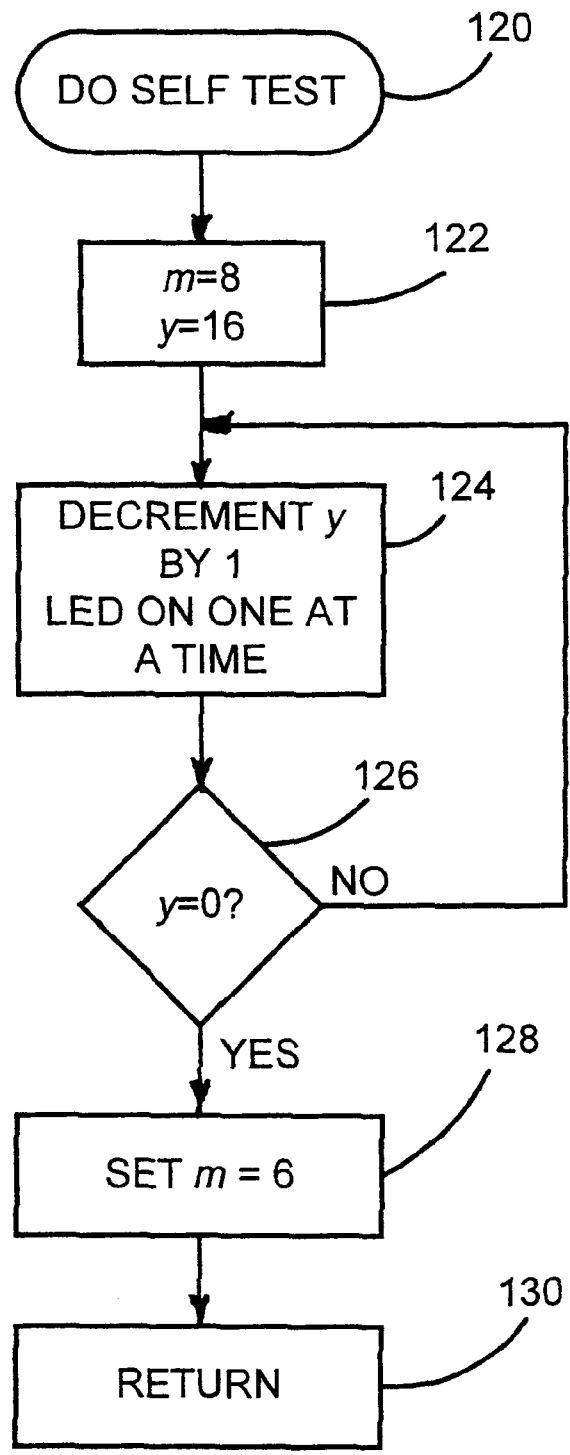
FIG. 4 is the flow diagram of the "SELF TEST" subroutine for the microcontroller of the present invention.

FIG. 4 shows the SELF-TEST subroutine for the microcontroller. This subroutine sets up the parameters to perform the self-test operation during interrupts INTTC1 and INTTC2. The self-test operation is preferably only performed by the manufacturer, and causes the PWM drive signals generated in the interrupts to continuously sweep from maximum to minimum values so that the functioning of the brake controller can be examined. The SELF-TEST subroutine begins with block 120 that signifies the beginning of the subroutine. Next, block 122 sets a loop variable Y equal to 16. Block 124 then decrements loop variable Y by one each time through the loop, and turns on and off all five LEDs of the display circuit one at a time. The timing of the interrupts, enabled in the main program, determines the timing of the delay between the flashing on and off of the LEDs. The subroutine then proceeds to block 126 that determines if loop variable Y is equal to 0. If not, the subroutine loops back to block 124. If loop variable Y is equal to 0, which would indicate that block 124 had flashed all five of the LEDs sixteen times, the subroutine proceeds to block 128 which sets variable m equal to 6. As long as this variable is not set equal to 6, interrupts INTTC1 and INTTC2 (FIGS. 8 and 9) perform a self-test of the brake controller. Next, block 130 causes the subroutine to return.

Figure 5:
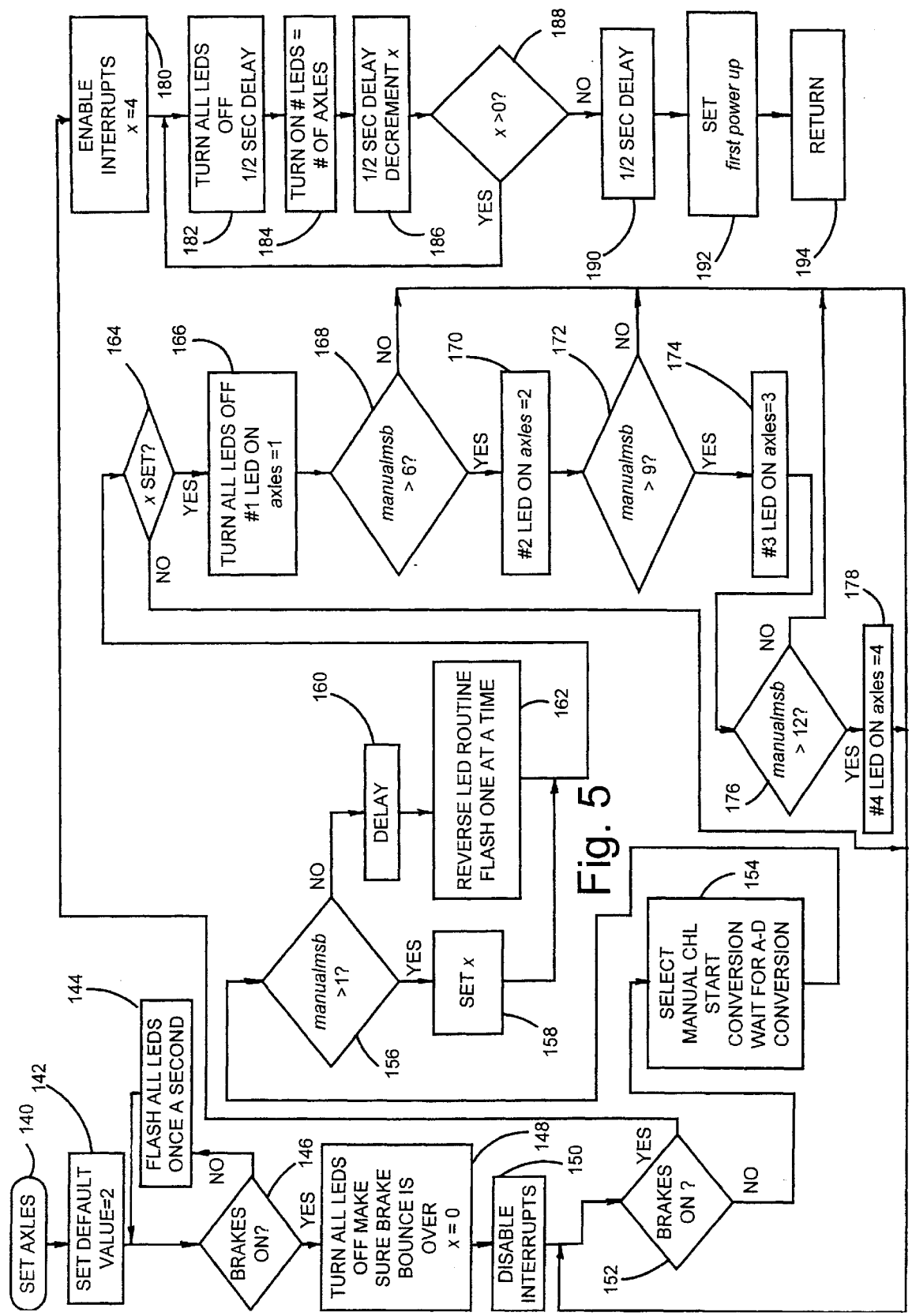
FIG. 5 is the flow diagram of the "SET AXLES" subroutine for the microcontroller of the present invention.

FIG. 5 shows the SET AXLES subroutine for the microcontroller. This subroutine enables the operator of the towing vehicle to set the number of axles of the towed vehicle which is preferably used in the DISPLAY CURRENT subroutine (FIG. 11) to properly display the magnitude of current provided to the towed vehicle's brakes. This routine uses the display to prompt the operator to manipulate the vehicle's brake pedal and the manual control to input the number of axles of the towed vehicle. As explained below, it is possible for the microcontroller to automatically determine the number of axles of the towed vehicle based upon a sensed current level detected during initialization. This subroutine begins with block 140 which signifies the beginning of the subroutine. Next, block 142 sets variable axles, indicating the number of axles of the towed vehicle, to the default value of 2. This is done for safety purposes in case variable axles is not set later in the subroutine, and two is chosen as the default value because the majority of towed vehicles will have two axles. The subroutine then proceeds to block 146 that determines if the brake pedal of the towing vehicle has been pressed. If not, block 144 causes all five of the LEDs of the display circuit to flash once a second, and loops back to block 146 to prompt an operator to press the vehicle's brake pedal. When block 146 determines that the brake pedal has been pressed, the subroutine proceeds to block 148 which turns off all of the LEDs of the display circuit, waits until the brake pedal has been released and stable, and resets variable x to 0 for use later in the subroutine. Next, block 150 disables interrupts INT1, INTTC1, and INTTC2 because of the possibility of interference with the rest of the SET AXLES subroutine. Block 152 then determines whether the brake pedal of the towing vehicle has been pressed again. If not, the subroutine proceeds to block 154 which samples the manual input circuit channel (pin 4). Next, block 156 determines if the most significant bit of the manual input circuit channel is greater than 1, indicating that the manual control has been operated such that a first threshold has been surpassed. If so, block 158 sets variable x, and the subroutine proceeds to block 164. If the most significant bit of the manual input circuit channel is not greater than 1, block 160 uses loop timing to create a delay. Next, block 162 calls the REVERSE LED subroutine (FIG. 6) which causes a different one of the LEDs of the display circuit to be turned on each time block 162 is executed. The purpose of this sequencing of LEDs is to prompt the user to operate the manual control of the manual input circuit. The delay created in block 160 keeps a particular LED on for a certain period of time such that the sequencing of LEDs can be recognized. After block 162, the subroutine proceeds to block 164.

Block 164 of the SET AXLES subroutine determines if variable x was set by operation of the manual control. If not, the subroutine loops back to block 152. If variable x is set, block 166 first turns all of the LEDs of the display circuit off, then turns LED2 on and sets variable axles equal to 1. Next, block 168 determines if the most significant bit of the manual input circuit channel is greater than 6, indicating that the manual control has been operated such that a second threshold has been surpassed. If not, the subroutine loops back to block 152. If the second threshold has been surpassed, block 170 turns LED3 on and sets variable axles equal to 2. Next, block 172 determines whether the most significant bit of the manual input circuit channel is greater than 9, indicating that the manual control has been operated such that a third threshold has been surpassed. If not, the subroutine loops back to block 152. If the third threshold has been surpassed, block 174 turns LED4 on and sets variable axles equal to 3. Next, block 176 determines if the most significant bit of the manual input circuit channel is greater than 12, indicating that the manual control has been operated such that a fourth threshold has been surpassed. If not, the subroutine loops back to block 152. If the fourth threshold has been surpassed, block 178 turns LED5 on and sets variable axles equal to 4. Next, the subroutine loops back to block 152. If block 152 determines that the brake pedal of the towing vehicle has been pressed a second time during this subroutine indicating that the variable axles has been set to a particular value, the subroutine proceeds to block 180 which enables the interrupts and sets variable x equal to 4 to be used as a loop variable. Next, block 182 turns all LEDs of the display circuit off and waits for ½ second using the timing of the interrupts to calculate the delay. Next, block 184 turns on the particular number of LEDs of LED2, LED3, LED4, and LED5 that is equal to the number of axles of the towed vehicle which is stored in variable axles. Block 186 then waits for ½ second using the timing of the interrupt to calculate the delay, and decrements loop variable x by 1. The delays provided by blocks 186 and 182 are positioned such that the LEDs are kept on and off long enough such that flashing of the LEDs can be recognized. Next, block 188 determines if the loop variable x is greater than 0 and, if so, loops back to block 182. If the loop variable is not greater than 1, indicating that the number of LEDs equal to the number of axles have been flashed four times, the subroutine proceeds to block 190 which delays for ½ second (needed for timing purposes) using the timing of the interrupts to calculate the delay. Next, block 192 sets variable firstpowerup to indicate that the first powerup of the brake controller has been completed. Block 194 then causes the subroutine to return.

Figure 6:
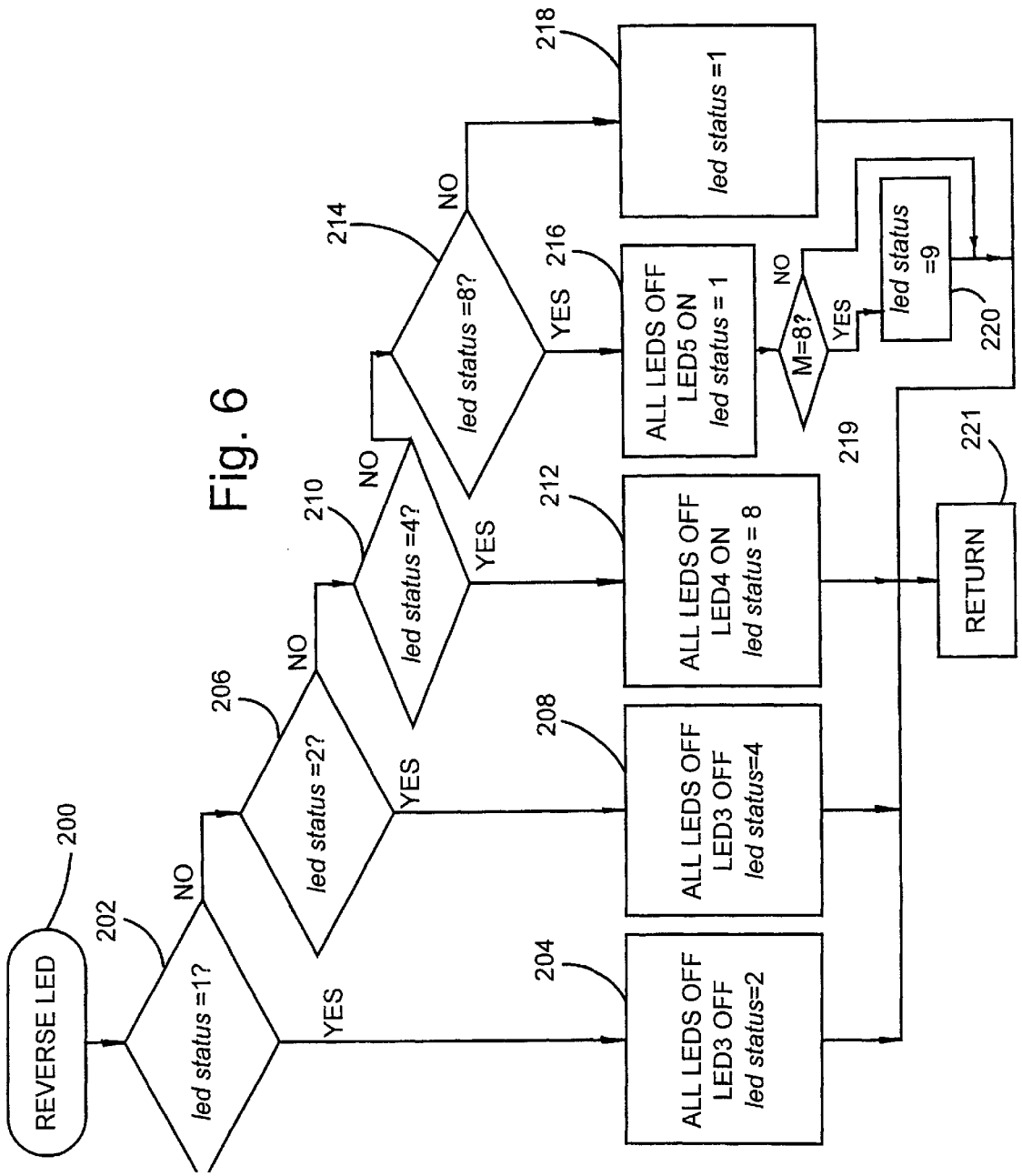
FIG. 6 is the flow diagram of the "REVERSE LED" subroutine for the microcontroller of the present invention.

FIG. 6 is the REVERSE LED subroutine for the microcontroller. This subroutine is called in block 162 of the SET AXLES subroutine to provide a sequencing of the LEDs. The subroutine begins with block 200 which signifies the beginning of the subroutine. Next, the subroutine proceeds to block 202 which determines if the variable led status is equal to 1. This variable is initialized to 1 in block 102 of the main program and is changed by means of execution of this subroutine. If variable led status is 1, the subroutine proceeds to block 204 which turns all LEDs of the display circuit off, then turns LED2 on and sets variable led status to 2 so that LED3 will be turned on the next time the subroutine is called. If variable led status is not equal to 1 in block 202, then block 206 determines if it is equal to 2. If so, block 208 turns all LEDs of the display circuit off, then turns LED3 on and sets variable led status equal to 4 so that LED4 will be turned on the next time the subroutine is called. If variable led status is not equal to 2 in block 206, then block 210 determines if it is equal to 4. If so, block 212 turns all LEDs of the display circuit off, then turns LED4 on and sets variable led status equal to 8 so that LED5 will be turned on the next time the subroutine is called. If variable led status is not equal to 4 in block 210, then block 214 determines if it is equal to 8. If so, block 216 turns all LEDs of the display circuit off, then turns LED5 on and sets variable led status equal to 1 so that LED2 will be turned on the next time the subroutine is called. Then block 219 determines whether the variable m is equal to 8. If it is, block 220 sets the variable led status equal to 9. If variable led status is not equal to 8 in block 214 indicating that the variable had somehow been set to an invalid number, then block 218 sets variable led status equal to 1 as a default value. After execution of blocks 204, 208, 212, 220, or 218, block 221 causes the subroutine to return.

There are three interrupts which control the operation of the microcontroller during normal operating conditions. Interrupt INT1 is an asynchronous interrupt having the highest priority of the three interrupts. INT1 is performed when pin 9 of the microcontroller is pulled low due to activation of transistor Q4 of the current sense circuit indicating that the sensed current exceeds 30 amps or that an open ground exists. Interrupt INTTC1 is second in priority and is performed every 4 milliseconds. Interrupt INTTC2 is last in priority and is performed at some point after each execution of the INTTC1 interrupt, the exact timing determined by the input of the gain adjustment circuit channel. Amongst other things, INTTC1 normally switches the PWM drive signal high and INTTC2 switches the signal low, the timing of INTTC2 being very important because it establishes the duty cycle of the PWM drive signal. However, there are exceptions when the INTTC1 interrupt switches the PWM drive signal low in addition to switching it high. These exceptions exist when the demand for braking current from the gain adjustment circuit exceeds a threshold limit such that the PWM drive signal's duty cycle must be extremely low. When this occurs, the PWM drive signal must be switched low soon after the INTTC1 interrupt switches it high, and the time of execution of INTTC1 is too long such that INTTC2 cannot switch it low at the appropriate time. It is during these circumstances that the INTTC1 interrupt switches the PWM drive signal both high and low. As detailed below the extent to which the demand for braking current exceeds the threshold limit determines the PWM drive signal's duty cycle and, thus, when INTTC1 switches the signal low.

Figure 7:
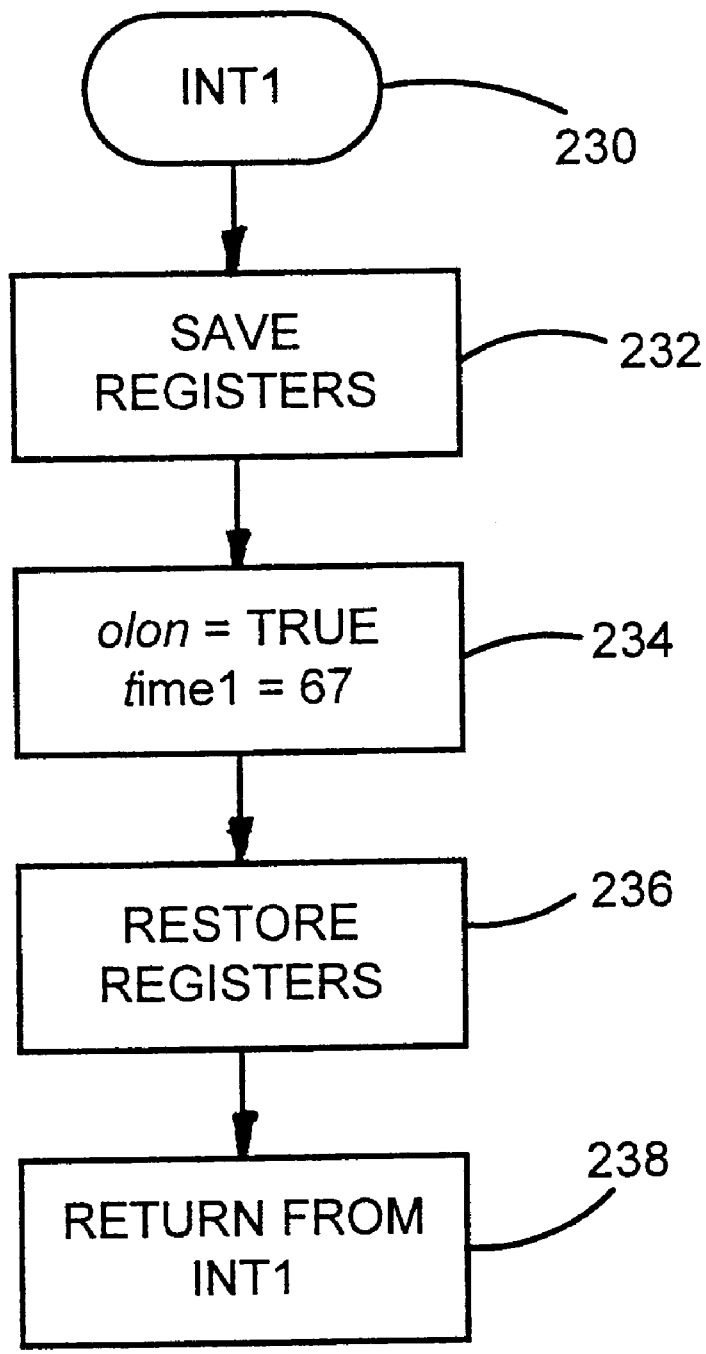
FIG. 7 is the flow diagram of the "INT1" interrupt for the microcontroller of the present invention.

Shown in FIG. 7 is the INT1 interrupt for the microcontroller. The interrupt begins with block 230 which signifies the beginning of the interrupt. Next, block 232 saves the data in the microcontroller's registers in random access memory (RAM). Block 234 then sets variable overloadon to indicate that overload current conditions exist such that the braking current should be cut off, and sets variable time1 equal to 67. Variable time1 is decremented in the INTTC1 interrupt (FIG. 8) and establishes the time at which the current is to be sampled again. Next, block 236 restores the data in the microcontroller's registers from RAM, blocks 232 and 236 thus ensuring that the microcontroller returns to exactly the same point it was at before the INT1 interrupt was performed. Block 238 then causes the interrupt to return.

Figure 8A:
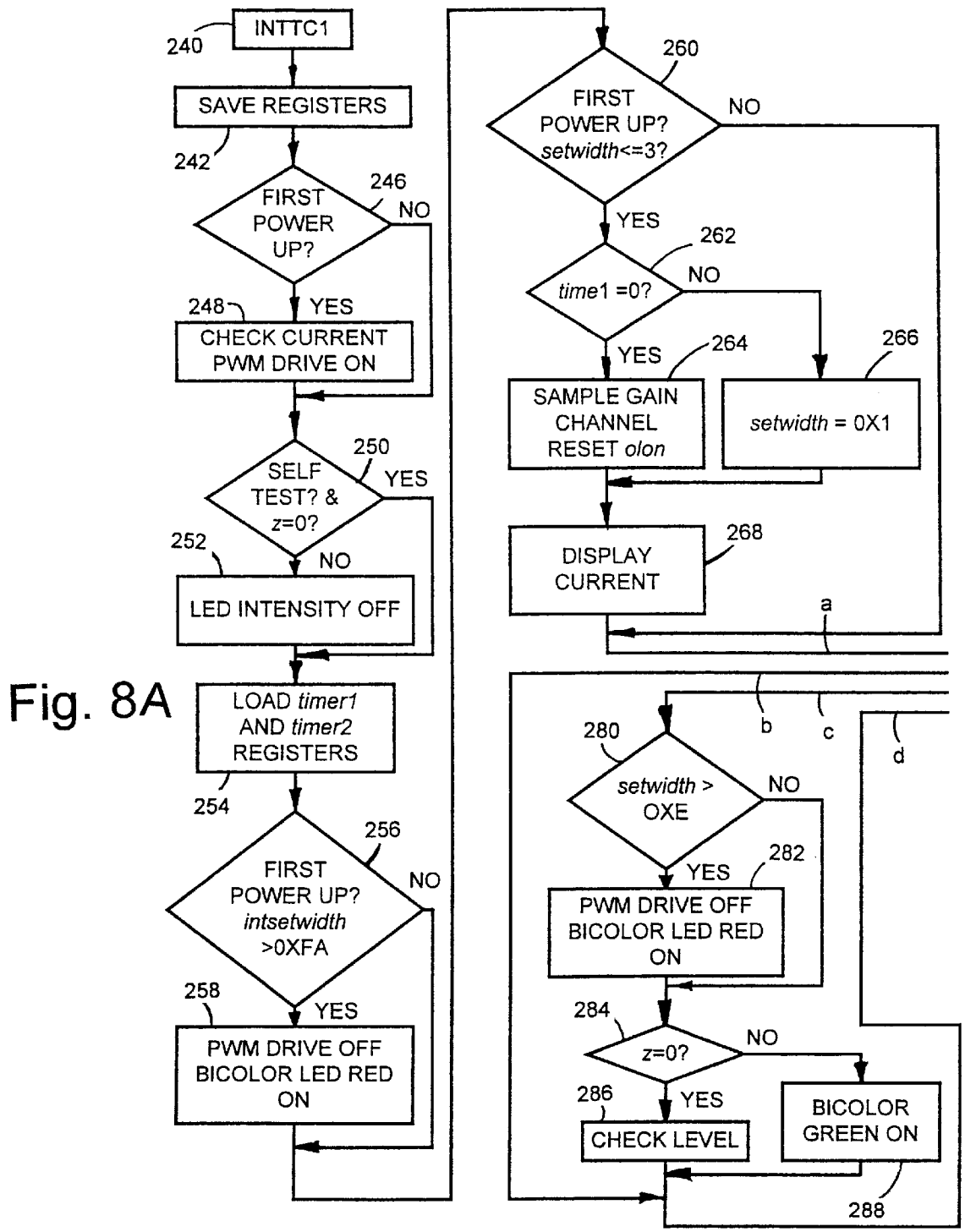
FIG. 8 is the flow diagram of the "INTTC1" interrupt for the microcontroller of the present invention.
Figure 8B:
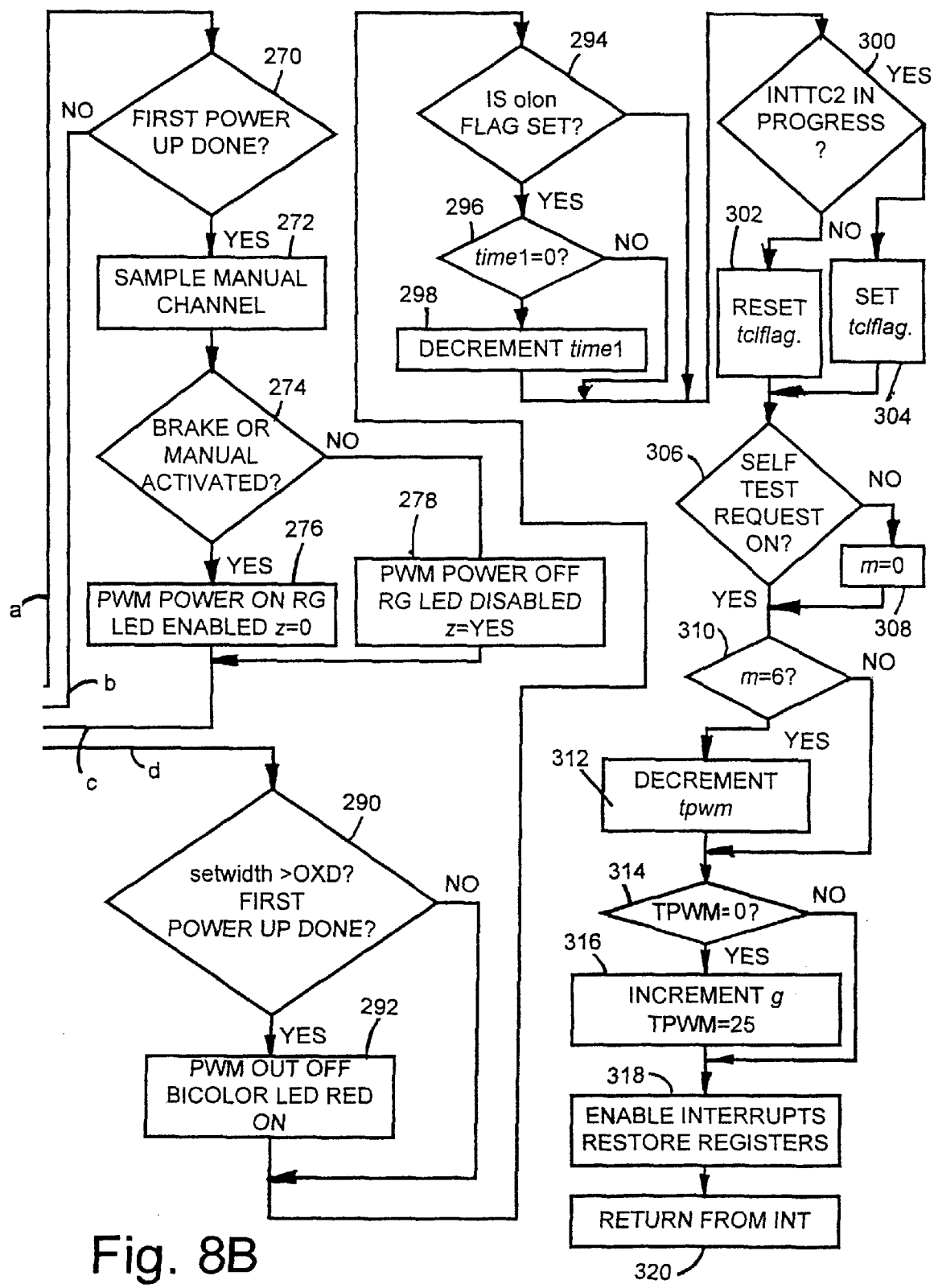

Shown in FIG. 8 is the INTTC1 interrupt for the microcontroller. INTTC1 begins with block 240 which signifies the beginning of the interrupt. Next, block 242 saves the data in the registers of the microcontroller in RAM. Block 246 then determines if the first powerup of the brake controller has been completed by checking whether the variable firstpowerup was set in the SET AXLES subroutine (FIG. 5). If variable firstpowerup is not set, this indicates that the microcontroller is currently in either the SELF-TEST subroutine or the SET AXLES subroutine during which time the interrupts, if not disabled, are used for the timing of delays. In these circumstances, it is undesirable to have the interrupts perform any braking functions, so block 248 of the subroutine is bypassed and the subroutine proceeds to block 250. If variable firstpowerup is set, then block 248 calls the CHECK CURRENT subroutine which is described in detail below in connection with FIG. 10. Block 248 also switches the PWM drive signal high such that no current is applied to the towed vehicle's brakes. Next, block 250 determines if a self-test request is present by checking whether pin 27 of the microcontroller is grounded, and whether variable z is equal to 0. Variable z is set equal to 0 in block 276 of INTTC1 when the driving voltage of the power control circuit has been turned on. If both conditions are not met in block 250, then block 252 turns off the intensity of the red component of bicolored LED6 of the display circuit. After block 252, or if both conditions are met in block 250, the interrupt proceeds to block 254 which loads the Timer1 and Timer2 registers. The Timer1 register determines when the INTTC1 interrupt is performed, and is loaded with a value causing INTTC1 to be performed every 4 milliseconds. The Timer2 register determines the exact time when the INTTC2 interrupt (FIG. 9) is performed after INTTC1 to switch the PWM drive signal low, and is loaded with variable setwidth. Variable setwidth corresponds to the value of the gain adjustment circuit channel (pin 5) sampled below in block 264. The Timer2 register causes INTTC2 to be performed sooner when variable serwidth, and thus the demand for braking current is increased. As such, the duty cycle of the PWM drive signal is lowered as the demand for braking current increases. Next, block 256 determines if variable integersetwidth is greater than hexadecimal FA, and whether variable firstpowerup is set indicating that the first powerup of the brake controller has been completed. Variable integersetwidth is an 8-bit variable which corresponds to the value of the input channel of the gain adjustment circuit (pin 5) sampled below in block 264. Variable setwidth is the most significant byte of variable integersetwidth. If variable integersetwidth is greater than hexadecimal FA, this indicates that there is an extremely high demand for braking current such that INTTC1 must switch the PWM drive signal low. Therefore, if the two conditions of block 256 are met, block 258 switches the PWM drive signal low (off) and turns bicolored LED6 intensity (red component) on. After block 258, or if the two conditions of block 256 are not met, the interrupt proceeds to block 260 which determines whether variable firstpowerup is set indicating that the first powerup of the brake controller has been completed, and whether variable setwidth is less than or equal to 2. If variable setwidth is greater than 2, then the DISPLAY CURRENT subroutine called in block 268 and the sampling of the gain adjustment channel in block 264 should be performed in INTTC2. The purpose of this is to equalize the functional loads of INTTC1 and INTTC2. If both conditions of block 260 are not met, then the interrupt proceeds to block 270. If both conditions of block 260 are met, then block 262 determines if variable time1 is equal to 0. Variable time1 is equal to 0 only when overload current conditions do not exist, or when it is time to sample the current which had previously been cut off due to overload current conditions. If variable time1 is not equal to 0, indicating that overload current conditions exist and that it is not time to sample the current, then the interrupt proceeds to block 266 which sets the variable setwidth equal to 1. By ignoring the input from the gain adjustment circuit channel and setting variable setwidth equal to 1, variable setwidth is kept beneath a threshold value such that INTTC2 (block 340) does not switch the PWM drive signal low and the current to the towed vehicle's brakes remains cut off. If variable time1 is equal to 0 in block 262, then block 264 samples the gain adjustment circuit channel and uses information therefrom to update variable integersetwidth and variable setwidth. However, if variable m is equal to 6 indicating that a self-test is requested, then the gain adjustment circuit channel is ignored and variable setwidth is set equal to variable g which is incremented in block 316 and causes sweeping of the PWM drive signal. Block 264 also sets variable overloadon to 0 indicating that overload current conditions may no longer exist. After blocks 264 and 266, the interrupt proceeds to block 268 which calls the DISPLAY CURRENT subroutine, described in more detail below in connection with FIG. 11.

Next, block 270 of INTTC1 determines if variable firstpowerup is set indicating that the first powerup of the brake controller has been completed. If not, the interrupt proceeds to block 290. If variable firstpowerup is set, then block 272 samples the manual input circuit channel (pin 4) to determine if the manual control has been operated. If so, block 272 also grounds pin 8 of the microcontroller such that the decelerometer of the sensor input circuit is disabled. Next, block 274 checks pin 24 of the microcontroller to determine if the brake pedal of the towing vehicle has been pressed. If either the brake pedal has been pressed or the manual control has been operated, the interrupt proceeds to block 276 which turns on the driving voltage of the power control circuit by means of pin 7 of the microcontroller. Block 276 also enables bicolored LED6, and sets variable z equal to 0 to indicate that the driving voltage of the power control circuit is on. If neither the brake pedal nor the manual control has been operated in block 274, then block 278 turns the driving voltage of the power control circuit off by means of pin 7 of the microcontroller, disables bicolored LED6, and sets variable z equal to 1 to indicate that the driving voltage of the power control circuit is off. After blocks 276 and 278, the interrupt proceeds to block 280 which determines if variable setwidth is greater than hexadecimal E which would indicate that there is an extremely high demand for braking current such that INTTC1 must switch the PWM drive signal low. If variable setwidth is not greater than hexadecimal E, then the interrupt proceeds to block 284. If variable setwidth is greater than hexadecimal E, then block 282 switches the PWM drive signal low and turns bicolored LED6 intensity (red component) on. Next, block 284 determines if variable z is equal to 0 which would indicate that the driving voltage of the power control circuit is on. If so, block 286 samples the sensor input circuit channel (pin 3) and turns the green component of bicolored LED6 on IF pin 3 of the microcontroller 10 is within a specific range, indicating that the decelerometer is level. If variable z is not equal to 0 in block 284, then block 288 automatically turns on the green component of bicolored LED6 indicating that the decelerometer is level. After blocks 286 and 288, the interrupt proceeds to block 290 which determines if variable setwidth is greater than hexadecimal D which would indicate that there is an extremely high demand for braking current such that INTTC1 must switch the PWM drive signal low. Block 290 also determines if variable firstpowerup is set indicating that the first powerup of brake controller has been completed. If both conditions of block 290 are met, then block 292 switches the PWM drive signal low and turns bicolored LED6 intensity (red component) on. After block 292, or it both conditions of block 290 are not met, the interrupt proceeds to block 294.

Block 294 of INTTC1 determines if variable overloadon is set indicating that overload current conditions exist. If not, then the interrupt proceeds to block 300. If variable overloadon is set, block 296 determines if variable time1 is equal to 0 which indicates that the previously cut-off current is to be sampled again. If variable time1 is equal to 0, the interrupt proceeds to block 300. If variable time1 is not equal to 0, then block 298 decrements variable time1 by 1. Because variable time1 is set to 67 in interrupt INT1 (FIG. 7) and the CHECK CURRENT subroutine (FIG. 10) if overload current conditions are detected, and because INTTC1 decrements this value by 1 every 4 milliseconds (each time the interrupt is performed), the time period during which the brake controller waits to sample the current after overload current conditions are detected is approximately 268 milliseconds. Next, block 300 determines if flag variable tc2 is set which is always set during INTTC2 and indicates here that INTTC2 was interrupted by INTTC1. If flag variable tc2 is set, then block 302 sets flag variable tc1 to later indicate to INTTC2 that it had been interrupted by INTTC1. If flag variable tc2 is not set, then block 304 resets flag variable tc1. After blocks 302 and 304, the interrupt proceeds to block 306 which determines if a self-test request is present by checking whether pin 27 of the microcontroller is grounded. If a self-test request is not present, then block 308 sets variable m equal to 0. After block 308, or if a self-test request is present, block 310 determines if variable m is equal to 6, caused by execution of the SELF-TEST subroutine. If variable m is not equal to 6, then the interrupt proceeds to block 314. If variable m is equal to 6, then block 312 decrements variable tpwm which is set to 25 in block 316. Next, block 314 determines if variable tpwm is equal to 0, and, if not, the interrupt proceeds to block 318. If variable tpwm is equal to 0, then block 316 increments variable g and variable tpwm is set to 25. Variable g is a 4-bit variable which cycles between its minimum and maximum values through incrementation in block 316, and causes a sweeping effect of the PWM drive signal if variable setwidth is set equal to variable g, in block 264 of INTTC1 or block 358 of INTTC2, because the self-test operation is being performed (when variable m is equal to 6). Next, block 318 enables the interrupts, this being a precautionary measure because the interrupts should already be enabled. Block 318 also restores the microcontroller's registers from RAM. Block 320 then causes the interrupt to return.

Shown in FIG. 9 is the INTTC2 interrupt for the microcontroller. Under normal operation conditions, this interrupt determines the pulse width of the PWM drive signal, switching the signal low and causing the driving voltage from the power control circuit 28 to be applied to the gates of MOSFETS Q8 and Q9. INTTC2 is performed at some point after each execution of the INTTC1 interrupt, the exact timing determined by the value of variable setwidth loaded into the Timer2 register during block 254 of INTTC1. As variable setwidth increases in magnitude corresponding to an increase in the demand for braking current, the sooner INTTC2 is performed such that the PWM drive signal's duty cycle is decreased. This interrupt begins with block 330 which signifies the beginning of the interrupt. Next, block 332 saves the microcontroller's registers in RAM, sets flag variable tc2 to indicate that INTTC2 is in progress if later interrupted by INTTC1, and enables the interrupts in order to allow INTTC1 to interrupt if needed (INTTC1 has higher priority). Next, block 334 determines if variable integersetwidth is greater that hexadecimal 2C, and, if so, the interrupt proceeds to block 336 which calls the PWM delay routine. This routine provides a variable delay which depends on the value of the least significant four bits of the first byte of information received from the gain adjustment circuit channel (pin 5). This delay provides a fine adjustment to the time period during which the PWM drive signal remains high before being switched low in block 344, and thus affects the PWM drive signal's duty cycle. This delay is in addition to that provided by operation of the Timer2 register, which determines when INTTC2 is performed after INTTC1, and is desirable only when the demand for braking current exceeds the threshold value in block 334. After block 336, or if variable integersetwidth is less than hexadecimal 2C in block 334, the interrupt proceeds to block 338 which determines if variable firstpowerup is set indicating that the first powerup of the brake controller has been completed. If not, such that braking functions should not be performed in the interrupt, the interrupt proceeds to block 350. If the first powerup has been completed, then block 340 determines if variable integersetwidth is greater than hexadecimal 4, a threshold value below which no current is to be applied to the towed vehicle's brakes. If not, the interrupt proceeds to block 350. If variable integersetwidth is greater than hexadecimal 4, then block 342 determines if flag variable tc1 is reset and if variable time1 is equal to 0. Flag variable tc1 is set in INTTC1 to indicate when the present execution of INTTC2 is a continuation after having been previously interrupted by INTTC1. If flag variable tc1 is set, it is undesirable to apply the current to the towed vehicle's brakes in INTTC2. If variable time1 is not equal to 0, then the brake controller is waiting to sample current that had been previously cut off due to overload current conditions. If both conditions of block 342 are not satisfied, then the interrupt proceeds to block 350. If both conditions of block 342 are satisfied, then block 344 switches the PWM drive signal low such that current is applied to the towed vehicle's brakes. Next, block 346 determines if variable setwidth is greater than 1, a threshold value above which the intensity (red component) of bicolored LED6 should be enabled. If not, then the interrupt proceeds to block 350. If variable setwidth is greater than 1, then block 348 enables the intensity (red component) of bicolored LED6, indicating that a threshold amount of current is being applied to the towed vehicle's brakes.

Next, block 350 of INTTC2 determines if variable firstpowerup is set, indicating that the first powerup of the brake controller has been completed, and if variable setwidth is greater than 2. If it is the first powerup of the brake controller, then no braking functions should be performed in INTTC2. If variable setwidth is less than 2, then the DISPLAY CURRENT subroutine called in block 352 and the sampling of the gain adjustment circuit channel of block 358 should be performed in INTTC1. The purpose of this is to equalize the functional loads of INTTC1 and INTTC2. If both conditions of block 350 are not satisfied, then the interrupt proceeds to block 360. If both conditions of block 350 are satisfied, then block 352 calls the DISPLAY CURRENT subroutine, described in detail below in connection with FIG. 11. After block 352, the interrupt proceeds to block 354 that determines if variable time1 is equal to 0. Variable time1 is equal to 0 only when overload current conditions do not exist, or when it is time to sample the current which hid previously been cut off due to overload current conditions. If variable time1 is not equal to 0, indicating that overload current conditions exist and that it is not time to sample the current, then the interrupt proceeds to block 356 which sets the variable setwidth equal to 1. By ignoring the input from the gain adjustment circuit channel and setting variable setwidth equal to 1, variable setwidth is kept beneath a threshold value such that INTTC2 does not switch the PWM drive signal low and the current to the towed vehicle's brakes remains cut off. If variable time1 is equal to 0 in block 354, then block 358 samples the gain adjustment circuit channel and uses information therefrom to update variable integersetwidth and variable setwidth. However, if variable m is equal to 6 indicating that a self-test is requested, then the gain adjustment circuit channel is ignored and variable setwidth is set equal to variable g which is incremented in block 316 of INTTC1 and causes sweeping of the PWM drive signal. Block 358 also sets variable overloadon to 0 indicating that overload current conditions may no longer exist. After blocks 356 and 358, the interrupt proceeds to block 360 which resets flag variables tc1 and tc2, indicating that INTTC2 is no longer in progress. Next, block 362 restores the microcontroller's registers from RAM, and block 364 ensures that the interrupts are enabled. Block 366 then causes the interrupt to return.

Figure 10:
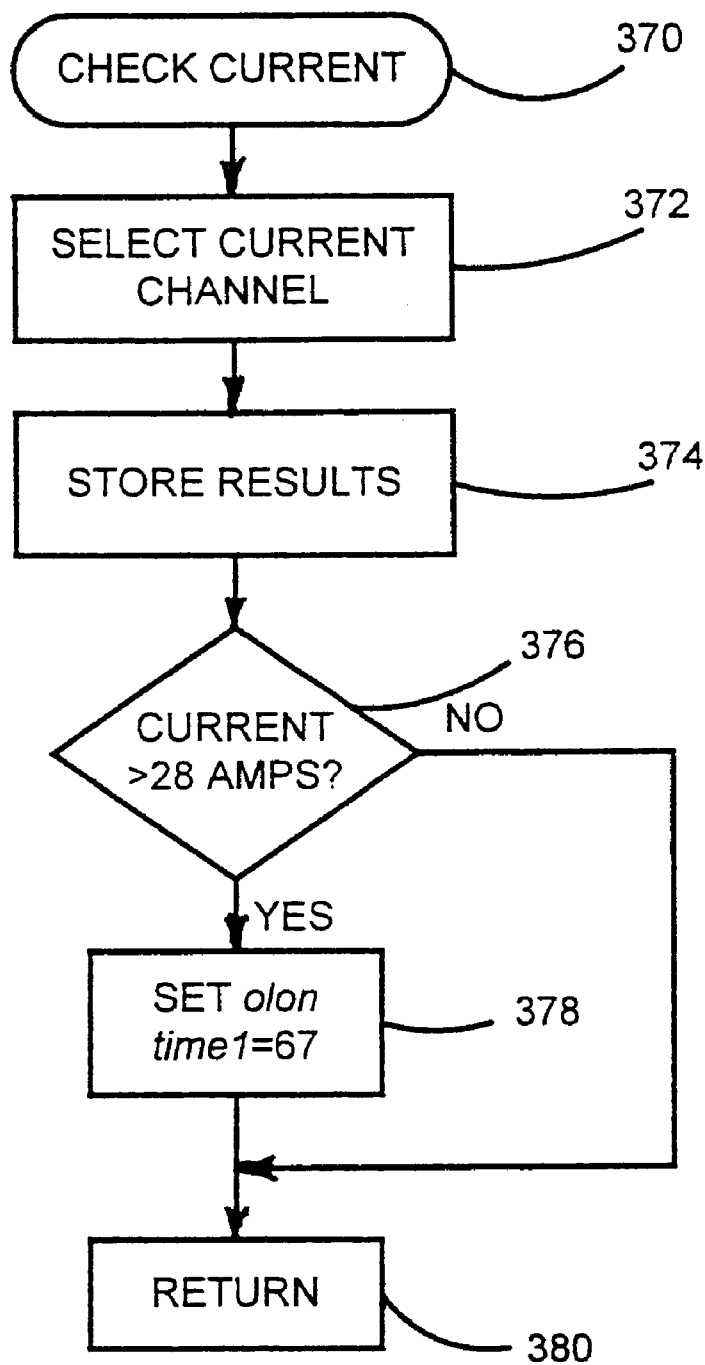
FIG. 10 is the flow diagram of the "CHECK CURRENT" subroutine for the microcontroller of the present invention.

Shown in FIG. 10 is the CHECK CURRENT subroutine for the microcontroller. This subroutine is called during the INTTC1 interrupt (FIG. 8) to sample the braking current sensed by the current sense circuit and to store its magnitude in memory for display by the display circuit. This subroutine also determines, by means of microcontroller programming, whether overload current conditions exist. The subroutine begins with block 370 which signifies the beginning of the subroutine. Next, block 372 samples the current channel which is pin 2 of the microcontroller. The subroutine then proceeds to block 374 which stores the results of the sampled current channel in RAM. Next, block 376 determines if the stored current value is greater than 30 amps, a threshold limit stored in memory. If not, the subroutine proceeds to block 380 that causes the subroutine to return. If the stored current value is greater than 30 amps, then block 378 sets the variable overloadon to indicate that overload current conditions exist such that the braking current should be cut off, and sets the variable time1 equal to 67. Variable time1 is decremented in the INTTC1 interrupt (FIG. 8) and establishes the time at which the current is to be sampled again. Block 380 then causes the subroutine to return.

Figure 11:
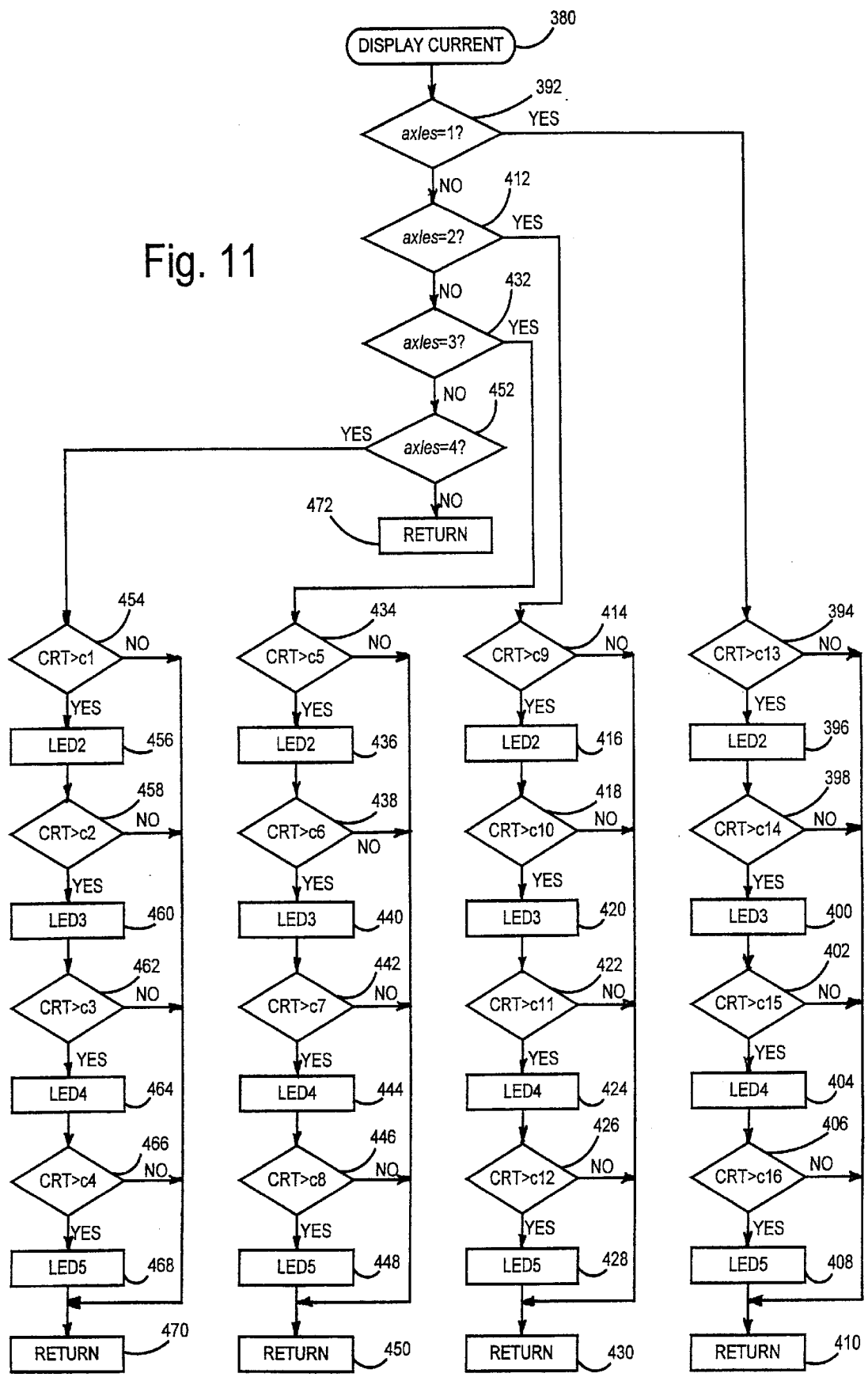
FIG. 11 is the flow diagram of the "DISPLAY CURRENT" subroutine for the microcontroller of the present invention.

Shown in FIG. 11 is the DISPLAY CURRENT subroutine for the microcontroller. This subroutine displays, by means of the LEDs of the display circuit, the magnitude of the sensed braking current stored in memory during the CHECK CURRENT subroutine (FIG. 10). The subroutine begins with block 390 which signifies the beginning of the subroutine. Next, block 392 determines if variable axles, set in the SET AXLES subroutine (FIG. 5), is equal to 1. If so, the subroutine proceeds to block 394 which determines if the voltage corresponding to the braking current stored in memory during the CHECK CURRENT subroutine is greater than constant c13. If not, then the subroutine proceeds to block 410 which causes the subroutine to return. If the voltage corresponding to the braking current is greater than constant c13, then block 396 turns LED2 on, and proceeds to block 398 that determines if the voltage corresponding to the braking current is greater than constant c14. If not, then the subroutine proceeds to block 410 that causes the subroutine to return. If the voltage corresponding to the braking current is greater than constant c14, then block 400 turns on LED3, and proceeds to block 402 which determines if the braking current is greater than constant c15. If not, then the subroutine proceeds to block 410 which causes the subroutine to return. If the voltage corresponding to the braking current is great than constant c15, then block 404 turns on LED4, and proceeds to block 406 which determines if the voltage corresponding to the braking current is greater than constant c16. If not, then the subroutine proceeds to block 410 which causes the subroutine to return. If the voltage corresponding to the braking current is greater than constant c16, then block 408 turns on LED5, and proceeds to block 410 which causes the subroutine to return. In the preferred embodiment of the present invention, constants c13, c14, c15, and c16 correspond to 0.3, 2.5, 3.75, and 5 (amps), respectively. The remaining blocks of the DISPLAY CURRENT subroutine are similar to those described above. If block 412 determines that variable axles is equal to 2, then the subroutine progressively turns on LEDs 2–5 by comparing the voltage corresponding to stored braking current to constants c9, c10, c11, and c12 which, in the preferred embodiment, correspond to 0.3, 3.3, 6.6, and 10 (amps), respectively. If block 432 determines that variable axles is equal to 3, then the subroutine progressively turns on LEDs 2–5 by comparing the voltage corresponding to stored braking current to constants c5, c6, c7, and c8 which, in the preferred embodiment, corresponding to 0.1, 5, 10, and 15 (amps), respectively. If block 452 determines that variable axles is equal to 4, then the subroutine progressively turns on LEDs 2–5 by comparing the voltage corresponding to stored braking current to constants c1, c2, c3, and c4 which, in the preferred embodiment, corresponding to 0.1, 6.6, 13.3, and 20 (amps), respectively. If variable axles is not equal to 1, 2, 3, or 4, then block 472 causes the subroutine to return.

To summarize the operation of the brake controller of the present invention during normal operating conditions, the signal causing braking of the towed vehicle originates from either the sensor input circuit or the manual input circuit. If the brake pedal of the towing vehicle is pressed, then the brake light circuit provides the voltage necessary to drive LED1 which drives Q1 if a sufficient deceleration force is experienced by the decelerometer of the sensor input circuit. The resulting signal is then sent to the gain adjustment circuit. If the manual control of the manual input circuit is operated, then this signal is supplied to the gain adjustment circuit and pin 4 of the microcontroller, and the microcontroller grounds pin 8 such that LED1 and the sensor input circuit are disabled. Whether the input signal supplied to the gain adjustment circuit is from the sensor input circuit or the manual input circuit, the gain adjustment circuit gradually causes a signal to be supplied to pin 5 of the microcontroller. This signal is limited by the setting of the gain adjustment potentiometer. The microcontroller generates a PWM drive signal based on the magnitude of the input received from the gain adjustment circuit, and this signal is supplied to transistor Q7 of the power switching circuit. Transistor Q7 is driven when the PWM drive signal is high, causing the driving voltage provided by the power control circuit to not be applied to the gates of MOSFETS Q8 and Q9. When the PWM drive signal is low, transistor Q7 is not driven and the driving voltage provided by the power control circuit is applied to the gates of Q8 and Q9. This voltage drives the MOSFETS and allows current from the current sense circuit to be applied to the brakes of the towed vehicle. The magnitude of braking current is dependent on the duty cycle of the PWM drive signal, with more current applied when the duty cycle is low. The current sense circuit senses the magnitude of braking current across resistor R30 and supplies this signal to pin 2 of the microcontroller. Using either software threshold sensing via pin 2 or hardware threshold sensing via pin 9, the microcontroller shuts the braking current off if its magnitude exceeds a threshold limit, and samples it again approximately every ¼ second. The microcontroller displays the magnitude of braking current by means of LEDs 2–5 of the display circuit. The red component of LED6 of the display circuit is activated whenever current is supplied to the towed vehicle's brakes, and the green component is activated whenever the decelerometer of the sensor input circuit is level.

Figure 12A:
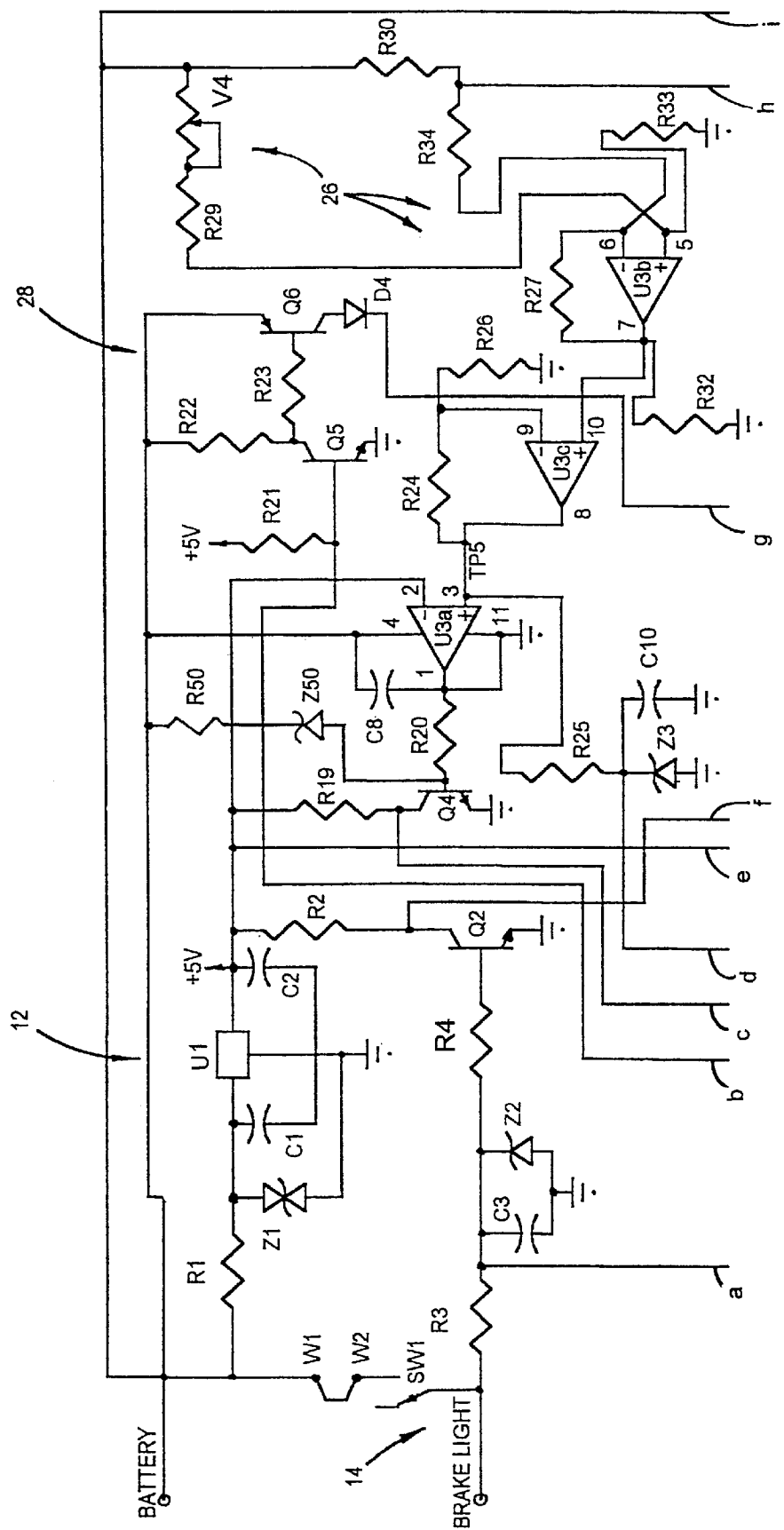
FIG. 12 is a schematic circuit diagram showing a second embodiment of the brake controller of the present invention.
Figure 12B:
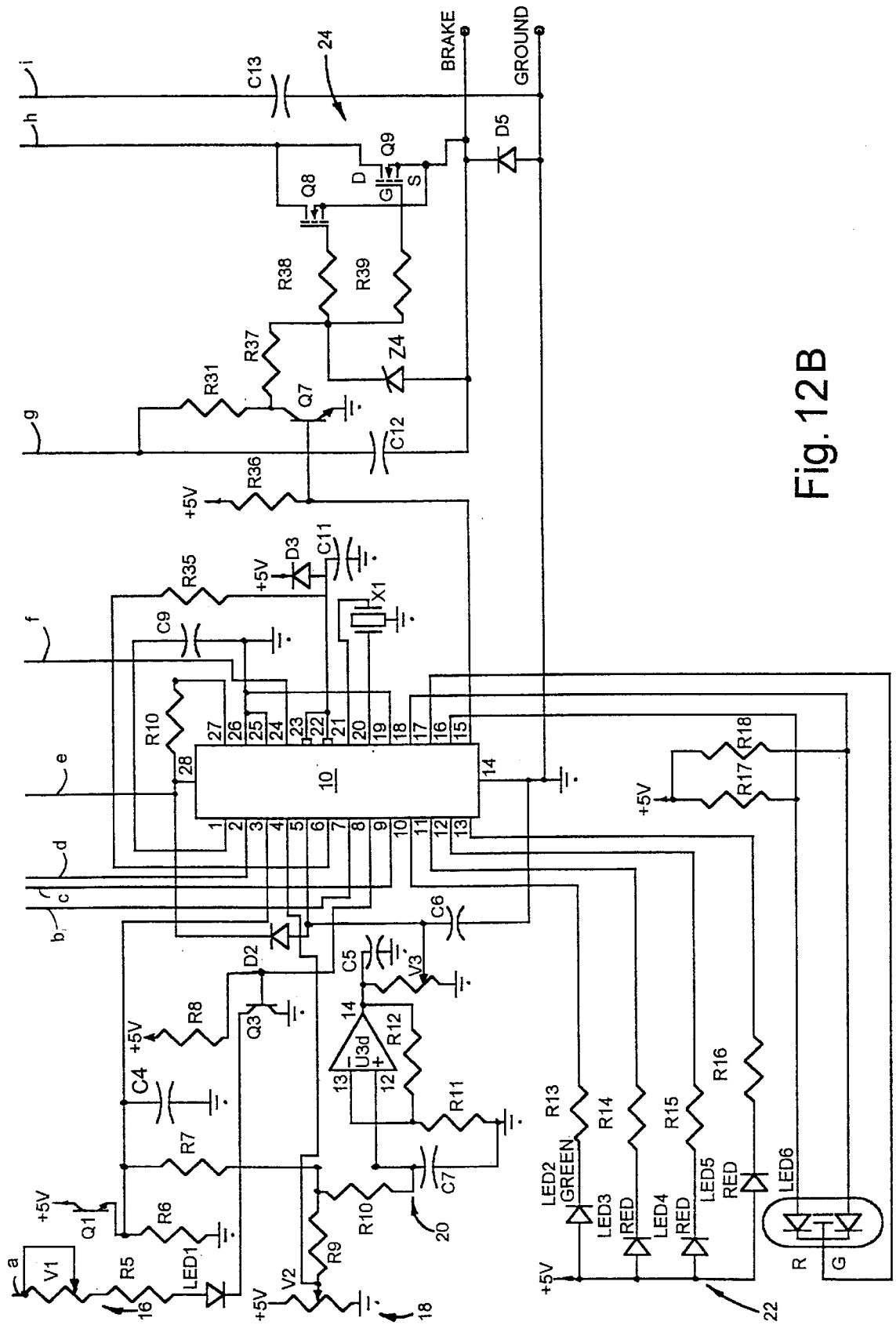
Figure 13A:
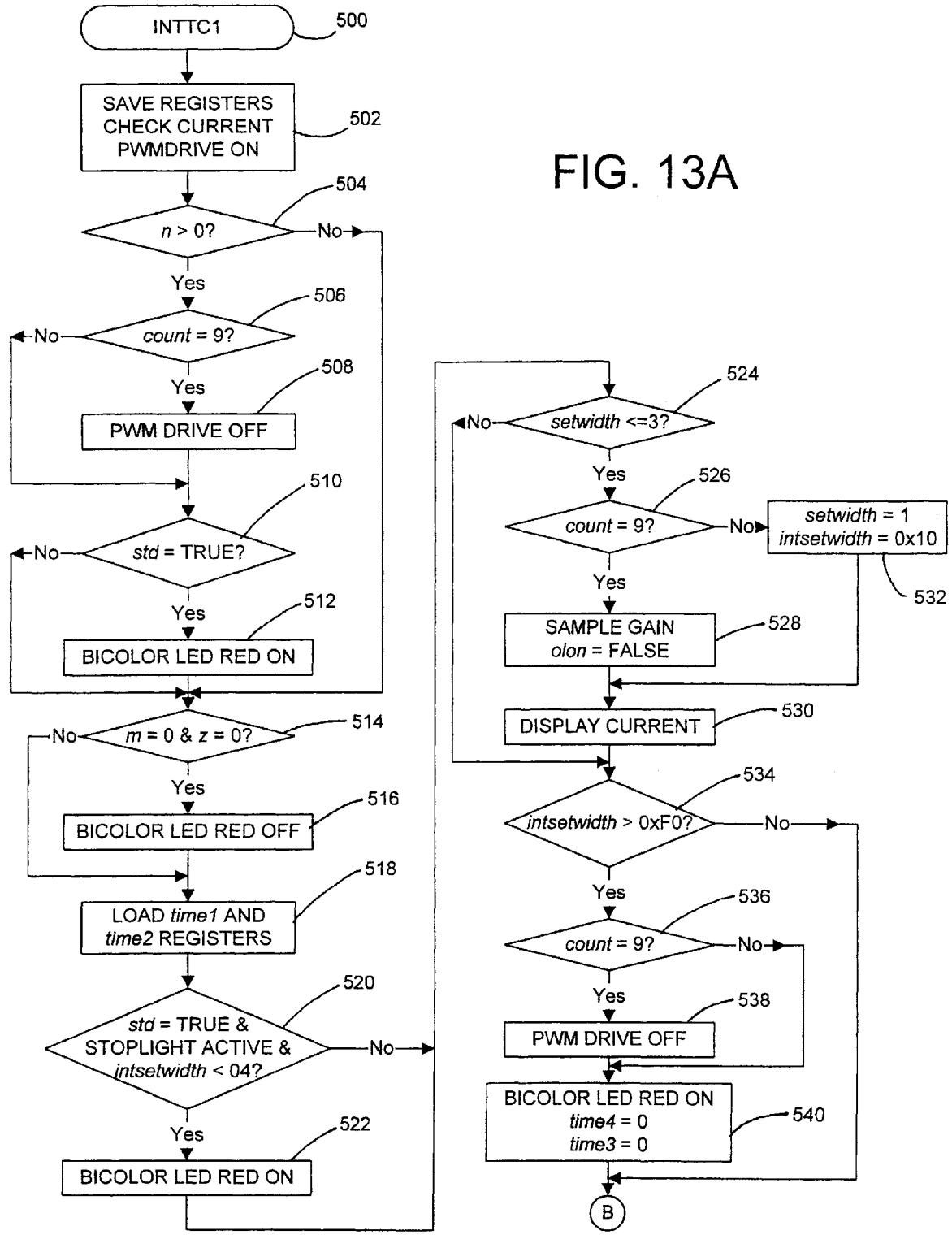
FIGS. 13A–13E are the flow diagrams of the "INTTC1" interrupt for the microcontroller of the second embodiment of the present invention.
Figure 13B:
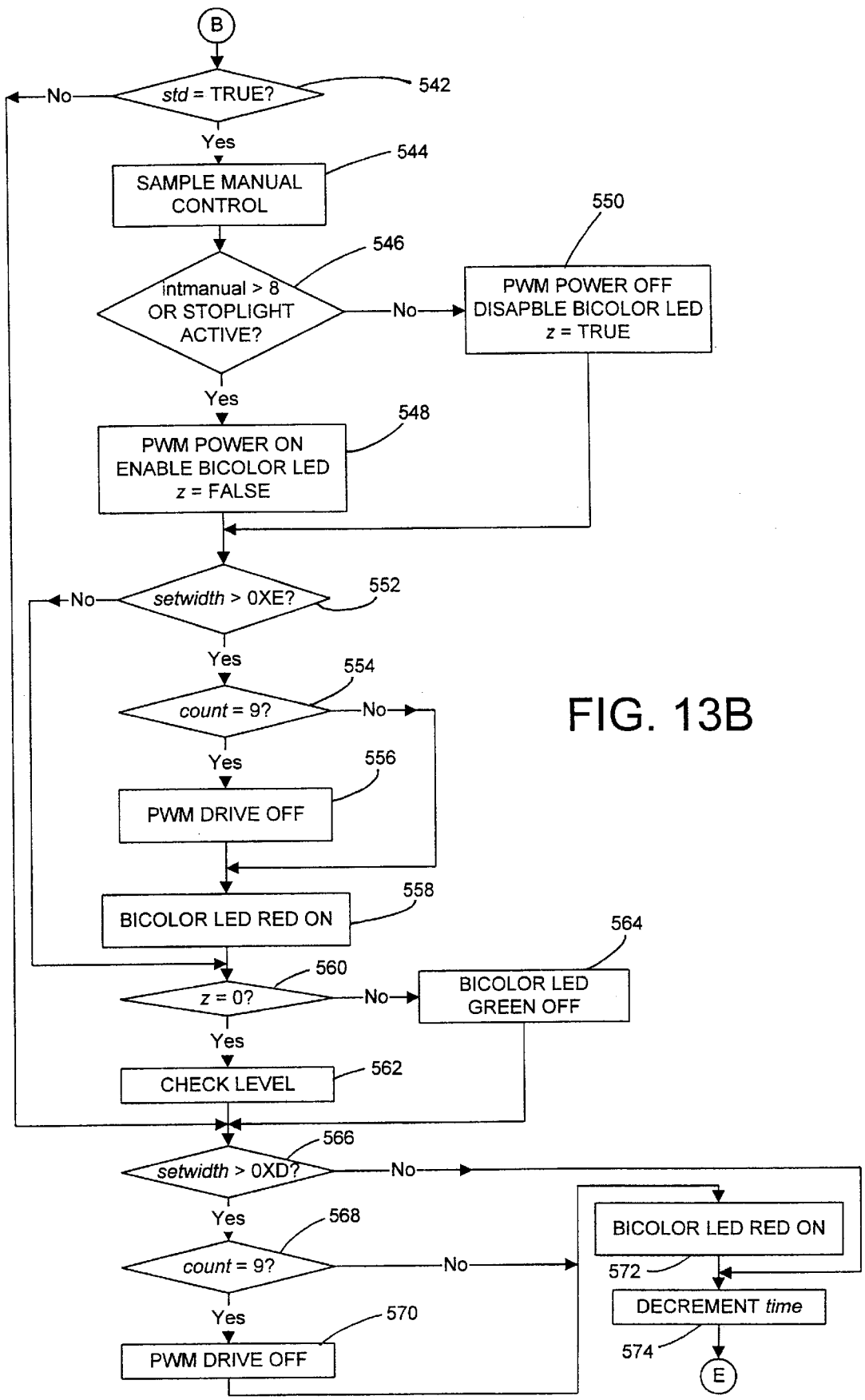
Figure 13C:
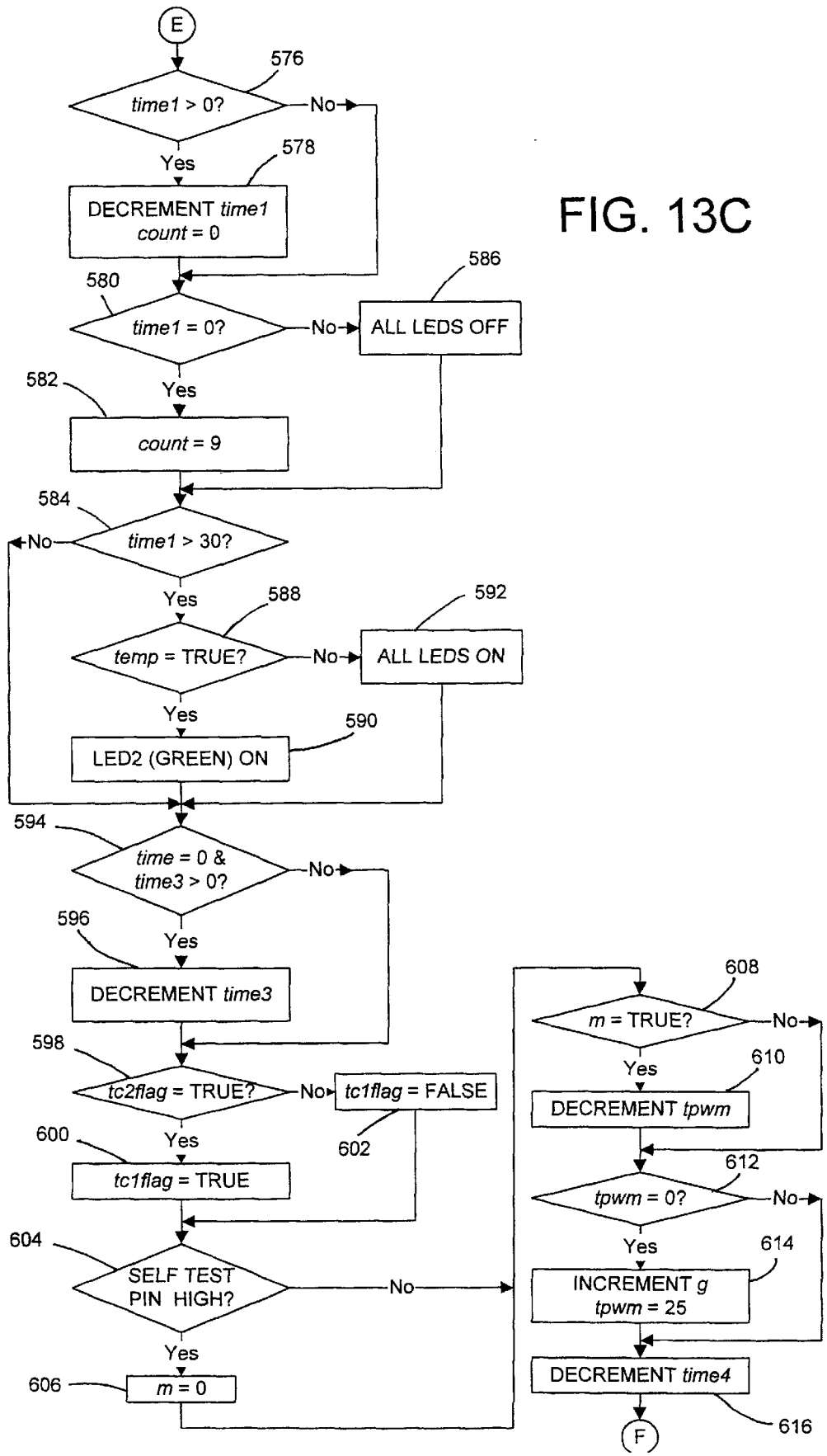
Figure 13D:
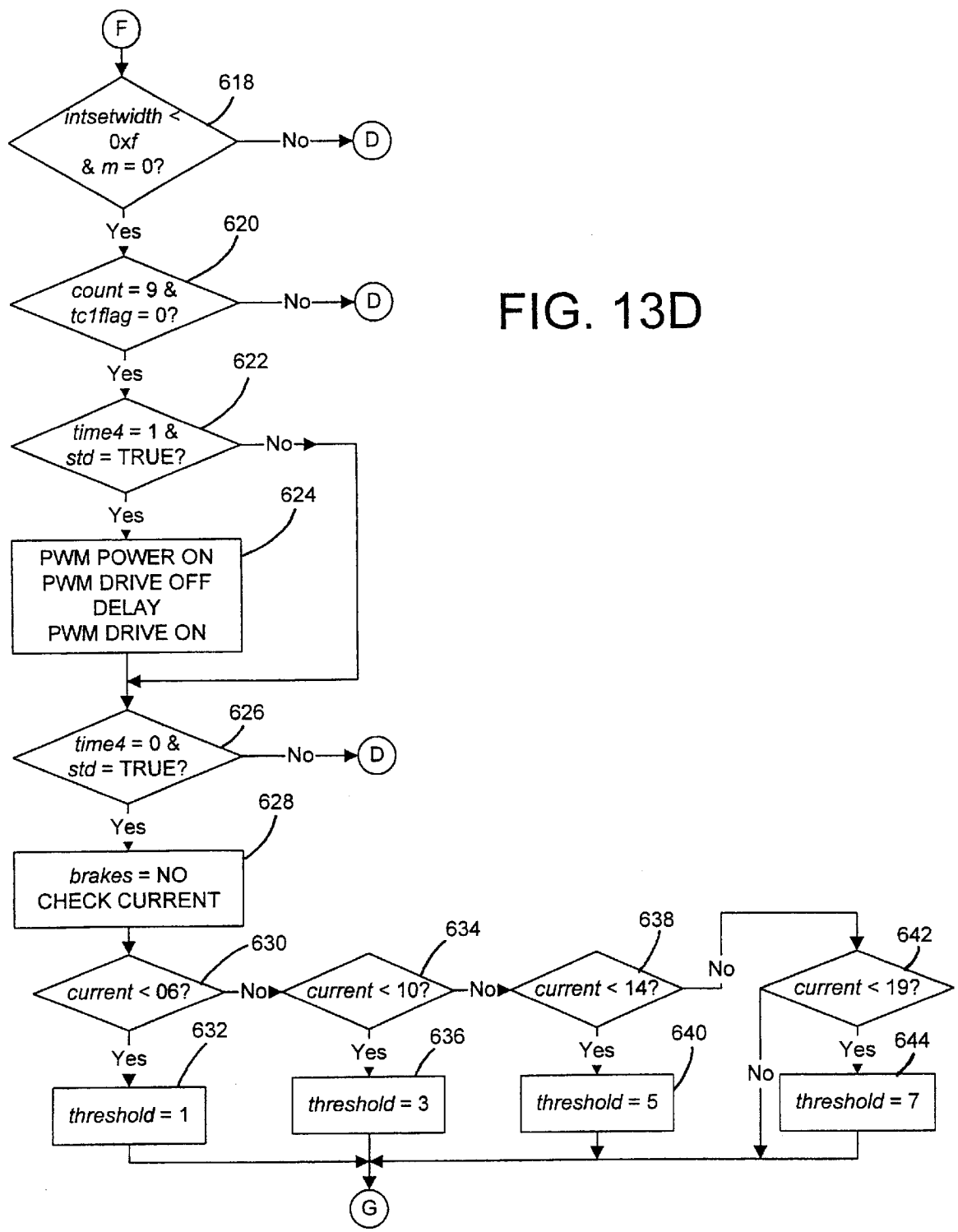
Figure 13E:
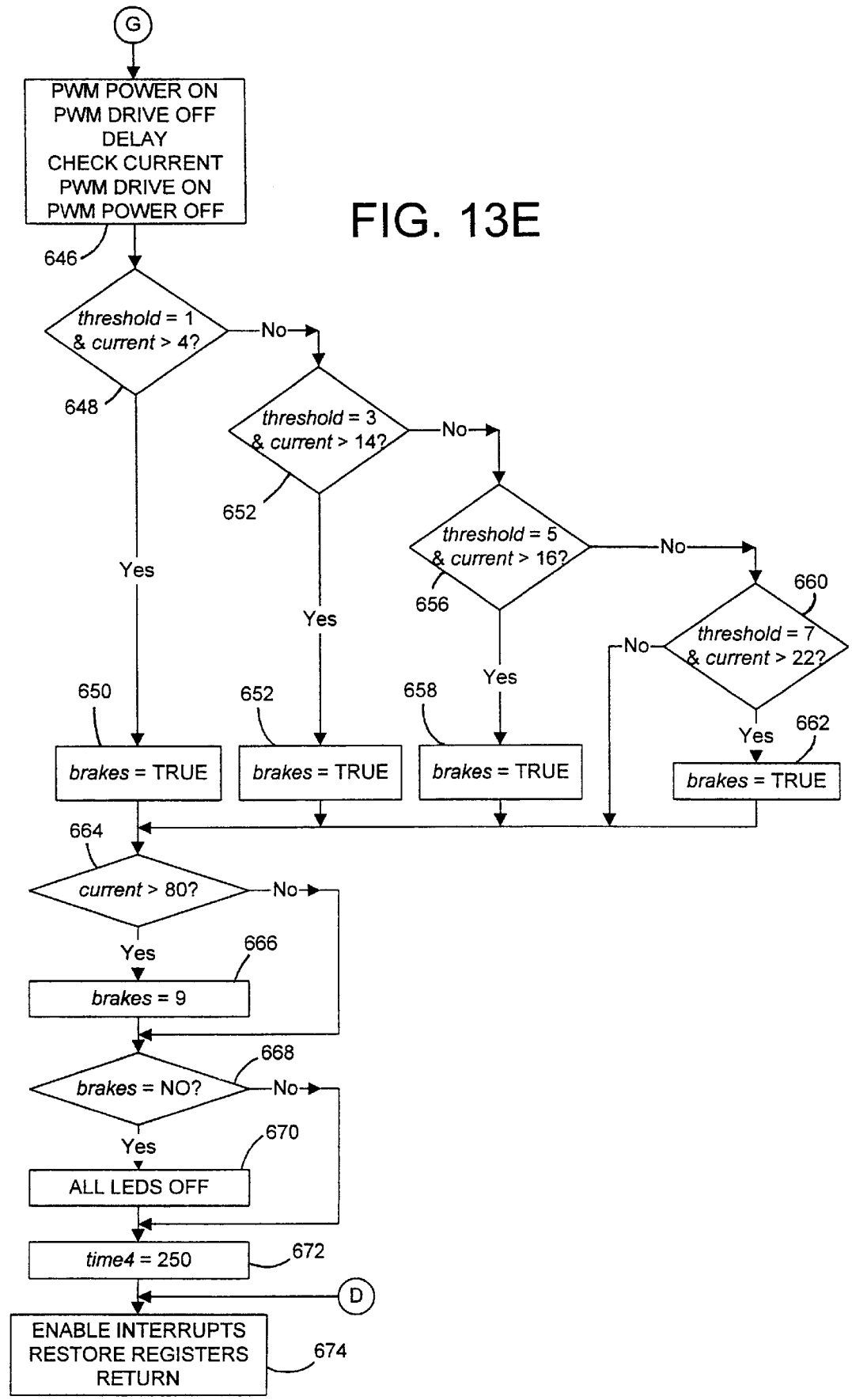

In an alternate embodiment of the brake controller of the present invention, an additional feature is provided to enable the operator of the towing vehicle to verify that the brakes of the towed vehicle are electrically connected to the brake controller without requiring the operator to attempt to activate the brakes. This verification is desirable because it provides assurance to the operator that he or she is in control, thus promoting increased driving confidence. To implement this additional feature, a green-colored LED is preferably used for LED2 instead of the conventional red, as shown in FIG. 12. Furthermore, additional programming is provided for microcontroller 10, as described in greater detail below.

To verify that the brakes of the towed vehicle are electrically connected to the brake controller, microcontroller 10 of the alternate embodiment is programmed to periodically determine if current is able to flow through MOSFETS Q8 and Q9. Current will be able to flow only if the brakes are connected because, otherwise, an open circuit will be present at the source of Q8 and Q9. To determine if current is able to flow, the programming of microcontroller 10 periodically provides driving voltage to the gates of Q8 and Q9. This is achieved by periodically supplying a low signal, via pin 7, to transistor Q5 such that power control circuit 28 supplies driving voltage to power switching circuit 24, and by supplying pulses to transistor Q7, via pin 15, at the same time. In the preferred embodiment, driving voltage is provided to the gates of Q8 and Q9 every four seconds, with pin 15 supplying two pulses, 4 milliseconds apart, for each four-second interval of time. When the driving voltage is thus being provided, a small amount of current will flow through Q8 and Q9 for a very short duration of time if the brakes are connected. This current, although incapable of noticeably activating the brakes, is sensed across resistor R30 of current sense circuit 26. As described above in connection with circuit 26, this signal is amplified by amplifiers U3b and U3c and their corresponding resistive networks, and is supplied to pin 2 of microcontroller 10 through resistor R25. Microcontroller 10 then compares the current magnitude to a verification threshold value stored in memory and, if the threshold is exceeded, sets a variable brakesyes to indicate that the towed vehicle's brakes are connected.

Verification that the brakes are connected is indicated to the operator of the vehicle by activation of LED2 if variable brakesyes is set. Such activation only occurs when the towed vehicle is idle so that LED2 can perform its other functions which are described above. Preferably, microcontroller 10 has two modes of operating LED2 to indicate that the brakes are connected. The first mode maintains LED2 in a dim state, when variable brakesyes is set, by sending repetitive signal pulses thereto with a low duty cycle. The second mode of operation flashes LED2 every 8 seconds when variable brakesyes is set. The operator of the vehicle can select the preferred mode of operation at the time of installation of the brake controller when the power is first turned on. The second mode, or flashing mode, is selected if the manual control of manual input circuit 18 is operated at the time of installation of the brake controller. Otherwise, the first mode, or dim mode, is implemented by default. The mode of operation of LED2 then remains the same for the life of the brake controller unless the controller or battery is disconnected, in which case the mode may again be selected when power is returned.

In another alternate embodiment, the verification feature described above also provides a means of detecting whether "overload" current conditions exist without requiring the operator to attempt to activate the brakes. As before, the brake current generated by the periodic supply of driving voltage to the gates of Q8 and Q9 is sensed by current sense circuit 26, and the resulting signal is supplied to microcontroller 10. In this embodiment, however, microcontroller 10 compares the current magnitude to two threshold values. In addition to the verification threshold value which establishes the minimum current required to verify that the brakes of the towed vehicle are connected, the current magnitude is also compared to a second maximum current threshold value which determines whether "overload" current conditions exist. This second maximum current threshold value is preferably 10 amps which, due to the very short duration of applied current, provides an indication of overload current conditions similar to the 28- or 30-amp threshold of the preferred embodiment. If the current exceeds this second maximum current threshold value, then microcontroller 10 shuts the current off to the towed vehicle's brakes and samples it again approximately once every four seconds. To indicate to the operator that overload current conditions have been detected by the verification feature, microcontroller 10 causes LED2 to flash approximately once every ¼ second. This is in contrast to the previously-discussed situation where overload current conditions are detected when activation of the towed vehicle's brakes is attempted. In this previously-discussed situation, microcontroller 10 of the alternate embodiment notifies the operator by flashing LEDs 2–5, similar to the preferred embodiment. However, unlike the preferred embodiment, the flashing occurs once every ¼ second and is not dependent on the shape of the current waveform or the time it takes to reach overload current conditions.

In another alternate embodiment of the present invention, an additional feature is provided to prevent current from being sent to the towed vehicle's brakes if the "circuit ground" somehow becomes disconnected from actual battery ground. Notification is also provided to the operator of the vehicle of such an event. This feature is desirable because such a disconnection, referred to as an open ground, may prevent proper operation of the brake controller and may be indicative of a serious problem with the towing or towed vehicle. To implement this additional feature, a resistor R50 and a Zener diode Z50, in series, are connected between the positive battery terminal and the base of transistor Q4 of current sense circuit 26, as shown in FIG. 12. Preferably, R50 is a 47 KOhm resistor and Z50 is a 20-volt Zener diode. Additional programming is not required for microcontroller 10, as is evident by the following description of the operation of the alternate embodiment.

Normally, when current is discontinued to the brakes after a period of activation, the energy remaining in the brakes attempts to discharge through diode D5 to circuit ground. However, if an open ground exists because the circuit ground terminal is disconnected from battery ground, these pulses of voltage attempt to discharge through capacitor C13. Because of its connection to capacitor C13, the battery positive terminal then receives these pulses of voltage which cause the battery supply voltage to rise. Because voltage pulses generated by an open ground are relatively large, this increase in the battery voltage is typically substantial. If the battery supply voltage exceeds a voltage supply threshold, then resistor R50 and Zener diode Z50 supply driving voltage to the base of transistor Q4 which causes pin 9 of microcontroller 10 to go low. As described above, when overload current conditions exist, this causes microcontroller 10 to perform interrupt INT1 and to shut the current off to the towed vehicle's brakes. In addition, LEDs 2–5 will flash, due to the sampling of current approximately every 250 milliseconds, such that the operator of the towing vehicle will know that either overload current conditions or an open ground exists. The voltage supply threshold associated with resister R50 and Zener diode Z50 is preferably established at a certain tolerance above the maximum normal battery supply voltage so that small voltage pulses generated from sources other than an open ground, such as from the ignition of the towing vehicle, do not cause the brake current to be cut off.

The above-noted changes in the operation of the brake controller of the most preferred alternate embodiment can be seen in connection with the additional flowcharts provided in FIGS. 13–16 and described in detail below. It should be noted that the flowcharts of FIGS. 3–7, 9, and 11 of the original embodiment have been retained in this alternate embodiment, with detailed descriptions thereof provided above.

FIGS. 13A–13E show the INTTC1 interrupt for the microcontroller. Block 500 signifies the beginning of the interrupt. Next, block 502 then executes the CHECK CURRENT subroutine, and switches the PWM drive signal high such that no current is applied to the towed vehicle's brakes. Next, block 504 determines if variable n is greater than 0 which would indicate that close to the maximum level of braking is being demanded. If not, then the program proceeds to block 514. If block 504 determines that variable n is greater than 0, then block 506 determines if variable count is equal to 9 which would be the case if overload conditions do not exist. If the condition of block 506 is not satisfied, then the program proceeds to block 510. If the condition of block 506 is satisfied, then block 508 switches the PWM drive signal low such that current is applied to the towed vehicle's brakes. After block 508, block 510 determines if variable std is set equal to TRUE which would indicate that the self-test has been performed. If not, then the program proceeds to block 514. If the self-test has been performed, then block 512 turns the bicolored LED's red component on.

Next, block 514 determines if variable m is equal to 0 (indicating that the self-test is not being performed) and if variable z is equal to 0 (indicating that the brake controller is to provide brake current). If both conditions of block 514 are not met, then the program proceeds to block 518. If both conditions of block 514 are met, then block 516 turns the bicolored LED's red component off. Next, block 518 loads the timer1 and timer2 registers which determine when the interrupts are executed. Then block 520 determines if variable insetwidth is less than 4, if the brake lights of the towing vehicle are not lit, and if the self-test is completed.

Basically, the first two conditions just noted are to determine whether there is an appreciable brake demand. If the conditions of block 520 are not satisfied, then the program proceeds to block 524. If the conditions of block 520 are satisfied, then block 522 turns the bicolored LEI)'s red component on. After block 522, then the program proceeds to block 524 which determines if variable setwidth is less than or equal to 3. If not, then the program proceeds to block 534. If block 524 determines that variable setwidth is less than or equal to 3, then block 526 determines if variable count is equal to 9 which would indicate normal (not overload) conditions. If not, then block 532 sets variable setwidth equal to 1 and variable integersetwidth equal to hexadecimal 13, and the program proceeds to block 530. If block 526 determines that variable count is equal to 9, then block 528 samples the gain channel. Next, block 530 executes the DISPLAY CURRENT subroutine. The program then proceeds to block 534.

Block 534 of the INTTC1 interrupt determines if variable integersetwidth is greater than hexadecimal F0 which would indicate a very high demand for braking current. If not, then the program proceeds to block 542. If a very high demand for braking current is determined to be present in block 534, then block 536 determines if variable count is equal to 9, which would indicate normal (not overload) conditions. If not, then the program proceeds to block 540. If block 536 determines that variable count is equal to 9, then block 538 turns the PWM drive signal low. Next, block 540 turns the bicolored LED's red component on and sets the timer3 and timer4 registers to zero. Next, block 542 determines if the self-test is completed and, if not, then the program proceeds to block 566. If the self-test is completed, then block 544 samples the manual gain channel. Next, block 546 determines if variable intmanual is greater than 8 or if the brake lights of the towing vehicle are lit. If neither condition is met, then the program proceeds to block 550. If at least one of the conditions in block 546 is met, then the program proceeds to block 548. Block 550 turns the PWM power off, disables the bicolored LED, and sets variable z equal to TRUE to indicate that the brake controller is not active. Block 548 turns on the PWM power, enables the bicolored LED, and sets variable z equal to FALSE (or 0) to indicate that the brake controller is to be active. The program then proceeds to block 552.

Block 552 of the INTTC1 interrupt determines if variable setwidth is greater than hexadecimal E, and, if not, the program proceeds to block 560. If variable setwidth is greater than hexadecimal E, then block 554 determines if variable count is set equal to 9 indicating normal (not overload) conditions. If not, then the program proceeds to block 558. If it is, then block 556 turns the PWM drive signal low. Block 558 then turns the bicolored LED red component on. Next, block 560 determines if variable z is equal to 0 which would indicate the brake controller is to be active. If not, then block 564 turns the bicolor green off to reduce (current, and the program proceeds to block 566. If block 560 determines that variable z is equal to 0, then block 562 checks the sensor level, and the program proceeds to block 566.

Block 566 of the INTTC1 interrupt determines if variable setwidth is greater than hexadecimal D, and, if not, the program proceeds to block 574. If it is, then block 568 determines if variable count is equal to 9. If count is equal to 9, then block 570 turns the PWM drive signal low. Alter block 570, or if count is not equal to 9, the program proceeds to block 572 which turns the bicolored LED's red component on. Block 574 decrements the variable time. Next, block 576 determines if variable time1 is greater than 0. Variable time1 keeps track of the 250 millisecond timing for overload conditions. If variable time1 is not greater than 0, then the program proceeds to block 580. If it is, then block 578 decrements variable time1 and sets variable count equal to 0. Next, block 580 determines if variable time1 is equal to 0. If not, then the program proceeds to block 586. Block 586 turns all of the LEDs off. If the condition of block 580 is met, then block 582 sets variable count equal to 9 which indicates normal (not overload) conditions. Next, block 584 determines if variable time1 is greater than 30, which is equivalent to 120 milliseconds. If not, then the program proceeds to block 594. If block 584 determines that variable time1 is greater than 30, then block 588 determines if variable temp is TRUE. If block 588 determines that variable temp is TRUE, then the program proceeds to block 590 which turns on LED2 (green). If block 588 determines that variable temp is not TRUE, then block 592 turns all LEDs on for flashing purposes. Next, block 594 determines if variable time is equal to 0 and if variable time3 is greater than 0. If both conditions are not met, the program proceeds to block 598. If either condition is met, block 596 decrements variable time3 prior to proceeding to block 598. Next, block 598 determines if variable tc2flag is TRUE which would indicate that interrupt INTTC2 was in execution and had been interrupted by the current execution of interrupt INTTC1. If the condition of block 598 is not satisfied, then block 602 sets variable tc1flag equal to FALSE, and the program proceeds to block 604. If the condition of block 598 is satisfied, then block 600 sets variable tc1flag equal to TRUE. Block 604 then determines if the self-test mode has not been selected. If it has, then the program proceeds to block 608. If the self-test mode has not been selected, then block 606 sets variable m equal to 0 to indicate that a self-test has not been requested. The program then proceeds to block 608.

Block 608 determines if variable m is TRUE, caused by execution of the SELF-TEST subroutine. If variable m is not TRUE, then the interrupt proceeds to block 612. If variable m is TRUE, then block 610 decrements variable tpwm which is set to 25 in block 614. Next, block 612 determines if variable tpwm is equal to 0, and, if not, the interrupt proceeds to block 616. If variable tpwm is equal to 0, then block 614 increments variable g and variable tpwm is set to 25. Block 616 of the interrupt decrements variable time4 which is used to determine when to sample current to ensure that the brakes are connected.

In block 618, the interrupt determines whether the variable intsetwidth is less than hexadecimal F and whether variable m is equal to 0. If both of these conditions are not met, the interrupt routine proceeds to block 674 where the interrupt routine is ended. If both of the conditions tested in block 618 are met, the interrupt routine then determines whether the variable count is equal to 9 and whether the variable tc1flag is equal to 0 in block 620. If both of these conditions are not met, interrupt routine is ended by proceeding to block 674. If both of the conditions in block 620 are met, block 622 determines whether the variable time4 is equal to 1 and whether the variable std is TRUE. If both of these conditions ire not met, the interrupt proceeds to block 626, otherwise block 624 first turns the PWM power on, turns the PWM drive off for a predetermined delay and then turns the PWM drive on. In block 626, the interrupt determines whether variable time4 is equal to 0 and whether the variable std is TRUE. If both of these conditions are not met, the interrupt routine is ended by advancing to block 674. If both of these conditions in block 626 are met, block 628 sets the variable brakes equal to NO and checks the brake current. Next, block 630 determines whether current is less than 6. If so, block 632 sets the variable threshold equal to 1 prior to proceeding to block 646. If the variable current is not less than 6, routine proceeds to block 634 where it determines whether the variable current is less than 10. If the variable current is less than 10, block 636 sets the variable threshold equal to 3 before proceeding to block 646. If the variable current is not less than 10, the routine proceeds to block 638 where it is determined whether the variable current is less than 14. If the variable current is less than 14, block 640 sets the variable threshold equal to 5 and proceeds to block 646. If the variable current is not less than 14, the routine proceeds to block 642 where it is determined whether the variable current is less than 19. If the variable current is less than 19, block 644 sets the variable threshold equal to 7 and the routine advances to block 646. If the variable current is not less than 19, the routine proceeds directly to block 646 without affecting the variable threshold.

In block 646, the routine turns the PWM power on, turns the PWM drive off for a predetermined delay, checks the current, turns the PWM drive on, and turns the PWM power off. Then, block 648 determines whether the variable threshold equals 1 and the current is less than 4. If both of these conditions are met, the routine sets the variable brakes to TRUE in block 650 before proceeding to block 664. If, both of the conditions in block 648 are not met, the routine advances to block 652 where it determines whether the variable threshold is equal to 3 and the current is greater than 14. If both of these conditions are met, the routine advances to block 654 where its sets the variable brakes to TRUE before advancing to block 664. If both of the conditions in block 652 are not met, the interrupt proceeds to block 656, where it determines whether the variable threshold is equal to 5 and the current is greater than 16. If both of these conditions are met, the interrupt proceeds to block 658 where it sets the variable brakes to TRUE before advancing to block 664. If neither of the conditions set forth in block 656 are met, the interrupt proceeds to block 660 where it determines whether the variable threshold is equal to 7 or the current is greater than 22. If both of the conditions in block 660 are met, the routine sets the variable brakes to TRUE in block 662 before proceeding to block 664, otherwise, the routine proceeds directly to block 664 without changing the variable brakes.

Block 664 determines whether the current is greater than 80. If the current is not greater than 80, the routine advances to block 668. If the current is greater than 80, the variable brakes is set equal to 9, which indicates overload condition when brake current is not being demanded. Then, in block 668, the interrupt determines whether the variable brakes is set at NO. If it is not, the routine advances to block 672. If brakes is NO, the routine advances to block 670 where it turns all the LEDs off before proceeding to block 672 where the interrupt sets the variable time4 equal to 250. Next, in block 674, the interrupts are enabled and the registers are restored prior to executing a return from the INTTC1 interrupt routine.

Figure 14:
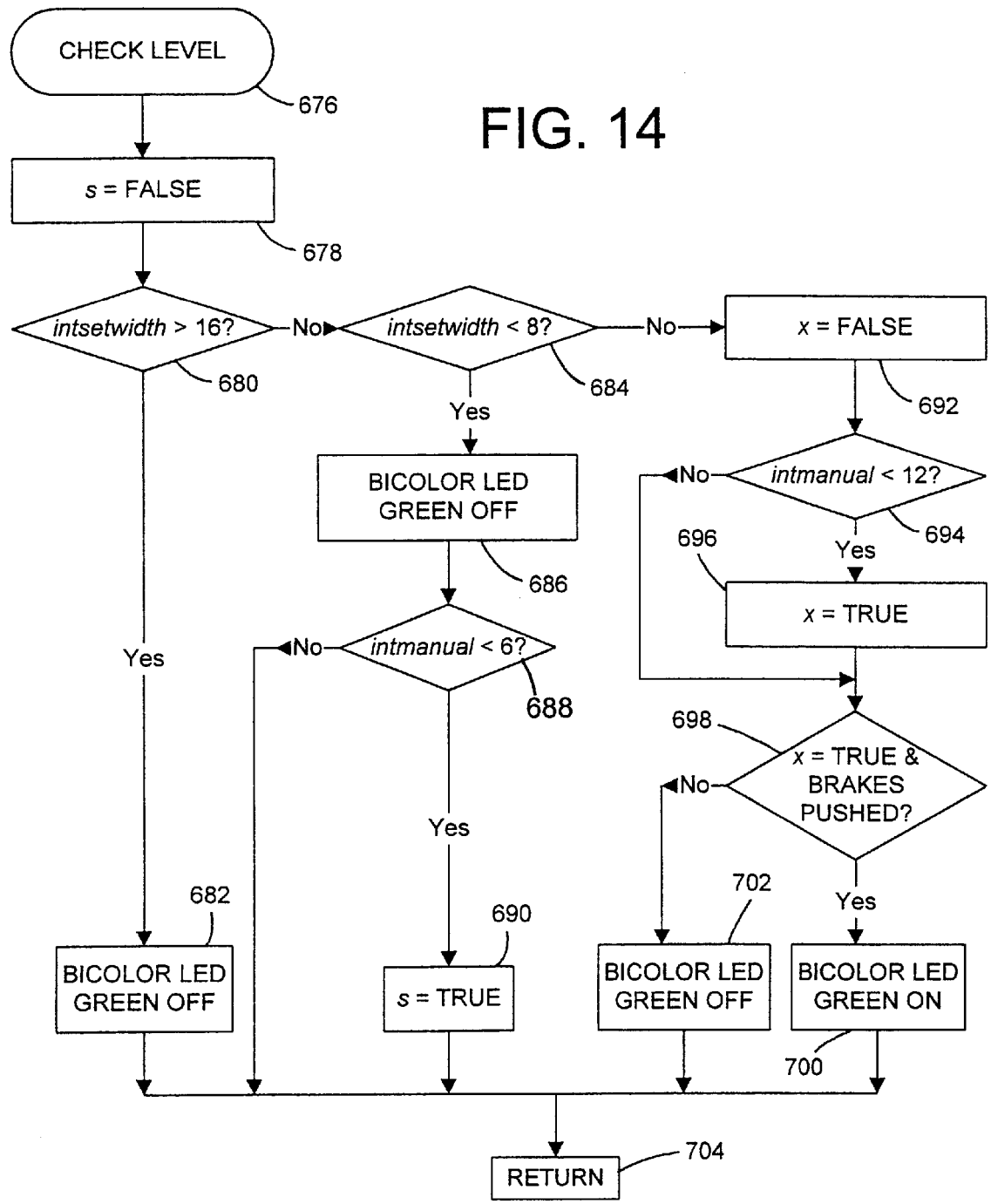
FIG. 14 is the flow diagram of the "CHECK LEVEL" subroutine for the microcontroller of the second embodiment of the present invention.

FIG. 14 illustrates a flow diagram for the CHECK LEVEL routine 676 according to the second embodiment of the invention. CHECK LEVEL routine 676 begins in block 678 where the variable s is set to FALSE. Then, in block 680, the routine checks whether the variable intsetwidth is greater than 16. If this variable is not greater than 16, the routine advances to block 684. If, on the other hand, the variable intsetwidth is greater than 16, the routine advances to block 682 where it turns the bicolor green off prior to ending the routine by advancing to return block 704.

In block 684, the routine determines whether the variable intsetwidth is less than 8. If this variable is not less than 8, the routine advances to block 692, otherwise, the routine advances to block 686 where it turns the bicolor green off. After block 686, the routine determines whether the variable intmanual is less than 6. If this variable is less than 6, the routine advances to 690 where it sets the variable s to TRUE prior to ending the routine by proceeding to block 704, otherwise, the routine directly advances from block 688 to block 704. In block 692, the routine sets the variable x to FALSE and then proceeds to block 694 where it determines whether the variable intmanual is less than 12. If it is not, the routine advances directly to block 698, otherwise, it first advances to block 696 where it sets the variable x to TRUE. In block 698, the routine determines whether x is TRUE and whether the brakes have been pushed. If both of these conditions are TRUE, block 700 of the routine turns the bicolor green on, to indicate level condition prior to ending the routine by advancing to block 704. If either of the conditions in block 698 are not met, the routine turns the bicolor green off in block 702 before ending the routine by advancing the block 704.

Figure 15:
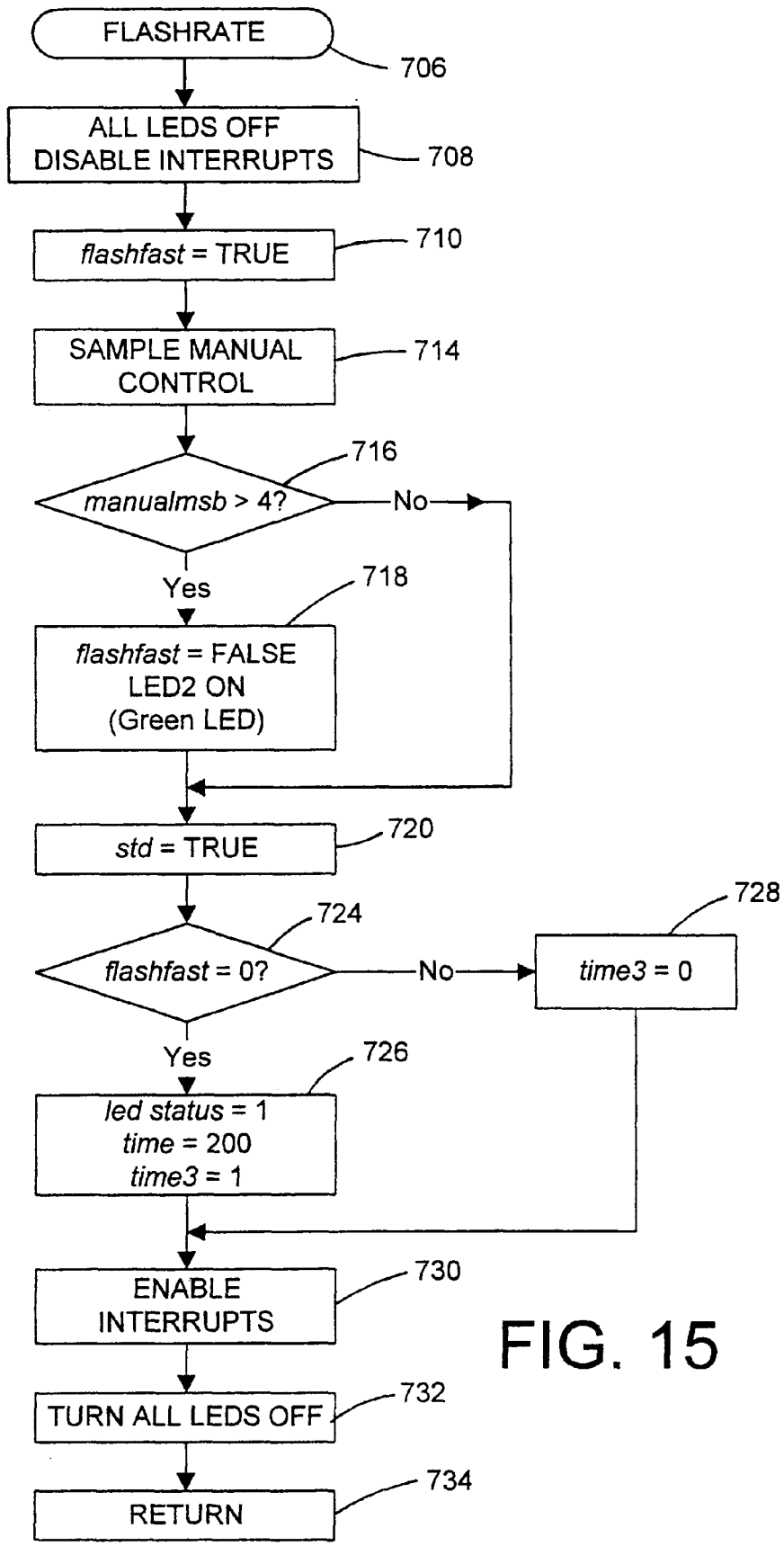
FIG. 15 is the flow diagram of the "FLASHRATE" subroutine for the microcontroller of the second embodiment of the present invention.

FIG. 15 shows the FLASHRATE routine 706 according to the second embodiment of the present invention. This routine begins in block 708, where all LEDs are turned off, and the interrupts are disabled. Next, in block 710, the routine sets the variable flashfast equal to TRUE before advancing to block 714 where it samples the manual control. Then, in block 716, the routine determines whether the variable manualmsb is greater than 4. If it is not, the routine advances to block 720, otherwise, the routine first executes block 718 where the variable flashfast is set to FALSE and LED2 (green) is turned on. Then, in block 720, the variable std is set equal to TRUE. Then, the routine advances to block 724.

Then, in block 724, the routine checks whether the variable flashfast is equal to 0. If not the routine proceeds to block 728, otherwise the routine advances to block 726. In block 726, the routine sets the variable led status equal to 1, sets the variable time equal to 200, and sets the variable time3 equal to 1 before proceeding to block 730. Block 728 sets the variable time3 equal to 0 before proceeding to block 730. In block 730, the routine enables the interrupts. Then, in block 732, the routine turns all the LEDs off prior to returning to the point in the program where this routine was called as shown in block 734.

Figure 16A:
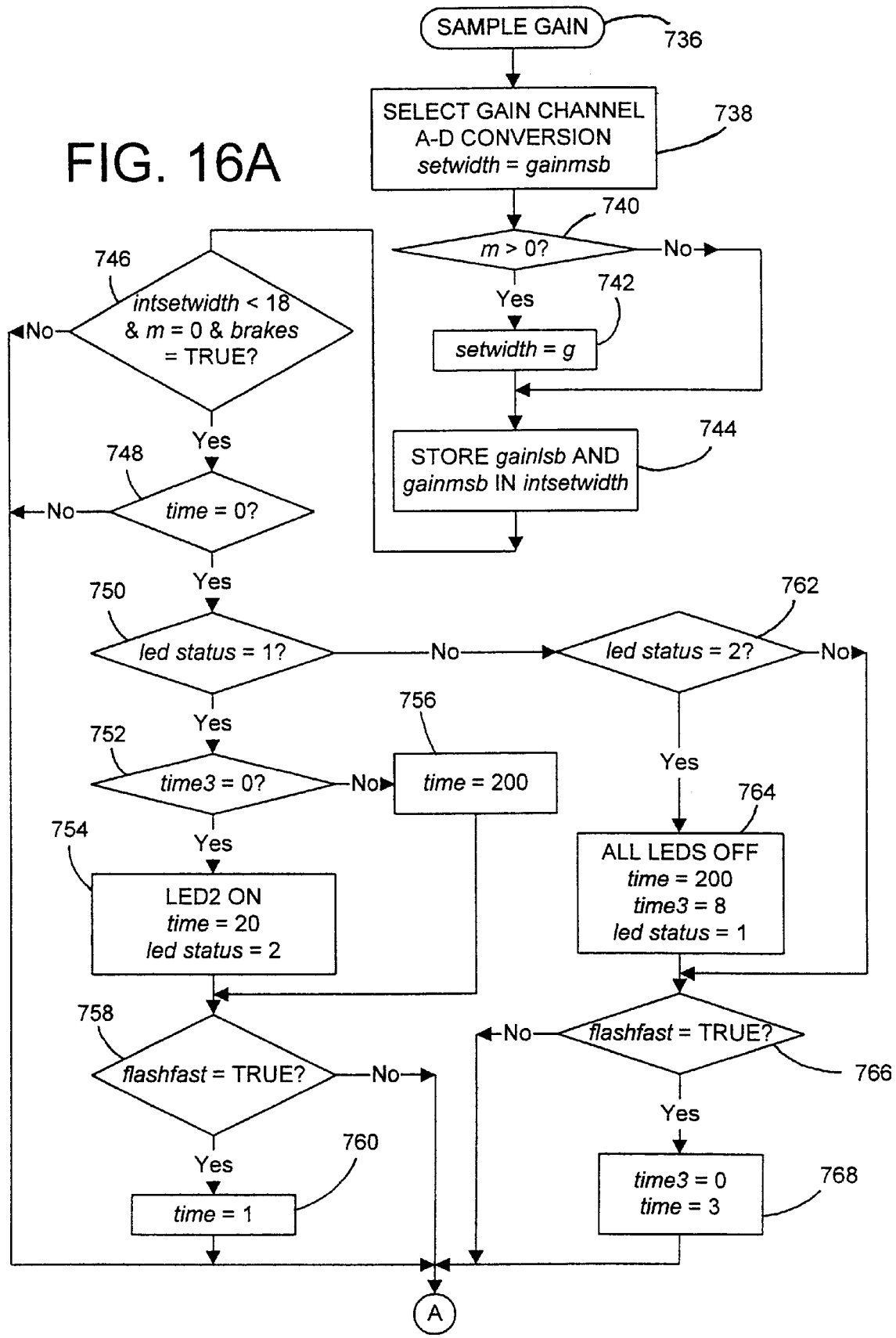
FIGS. 16A and 16B are the flow diagrams of the "SAMPLE GAIN" subroutine for the microcontroller of the second embodiment of the present invention.
Figure 16B:
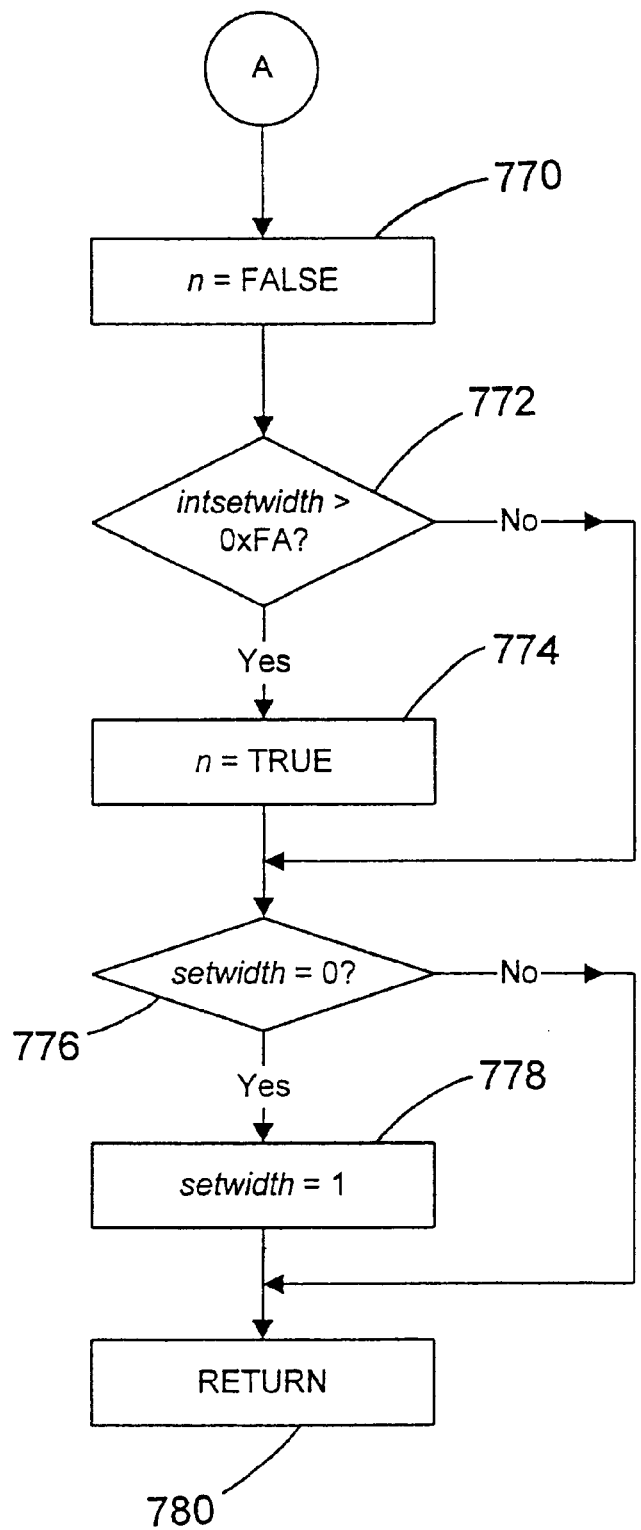

FIGS. 16A and 16B show the SAMPLE GAIN routine 736 that is implemented in the second embodiment of the present invention. SAMPLE GAIN routine 736 begins in block 738 where the routine selects a gain channel, performs analog to digital conversion and sets the variable setwidth equal to the variable gainmsb. Next, in block 740, the routine checks to determine where the variable m is greater than 0. If so, the routine sets the variable setwidth equal to the variable g in block 742 prior to advancing to block 744, otherwise, the routine advances directly from block 740 to block 744. In block 744, the routine stores the levels for the variables gainmsb, and gainmsb in the variable intsetwidth. Next, in block 746, the routine determines whether the variable intsetwidth is less than 18 and whether the variable m is equal to 0, and whether the variable brakes is set to TRUE. If anyone of these conditions is not met, the routine advances directly to block 770. If all of these conditions in 746 are met, the routine advances to block 748 where the routine determines whether the variable time is equal to 0. If not, the routine advances directly to block 770, otherwise the routine advances to block 750 where the routine determines whether the variable led status is equal to 1. If not, the routine advances to block 762 otherwise, the routine advances to block 752. In block 752, the routine then determines whether the variable time3 is equal to 0. If it is, the routine advances to block 754 where it turns LED2 on, sets the variable time equal to 20, and sets the variable led status equal to 2 prior to advancing to block 758. In block 756, the routine sets the variable time equal to 200 prior to advancing to block 758. In block 758, the routine determines whether the variable flashfast is equal to TRUE. If so, the routine sets the variable time equal to 1 in block 760 prior to advancing to block 770, otherwise the routine advances directly to block 770 from block 758.

In block 762, the routine checks to determine whether the variable led status is equal to 2. If so, the routine advances to block 764 where it turns off all the LEDs, such the variable time equal to 200, sets the variable time3 equal to 8, and sets the variable led status equal to 1 before proceeding to block 766. If, in block 762, that the variable led status is not equal to 2, the routine advances directly from block 762 to block 766. In block 766, the routine determines whether the variable flashfast is set equal to TRUE. If so, the routine advances to block 768 where it sets the variable time3 equal to 0 and sets the variable time equal to 3 prior to advancing to block 770. If the variable flashfast is not equal to TRUE in block 766, the routine advances directly to block 770.

In block 770, the routine sets the variable n equal to FALSE prior to advancing to block 772 where it determines whether the variable intsetwidth is greater than hexadecimal FA. If so, the routine sets the variable n equal to TRUE in block 774 prior to advancing to block 776, otherwise, the routine proceeds directly from block 772 to block 776. In block 776, the routine determines where the variable setwidth is equal to 0. If so, the routine advances to block 778 where it sets the variable setwidth equal to 1 before ending the routine by proceeding to block 780. Alternatively, if the variable setwidth is determined to be a value other than 0 in block 776, the routine advances directly to block 780 where the routine is ended.

Figure 17A:
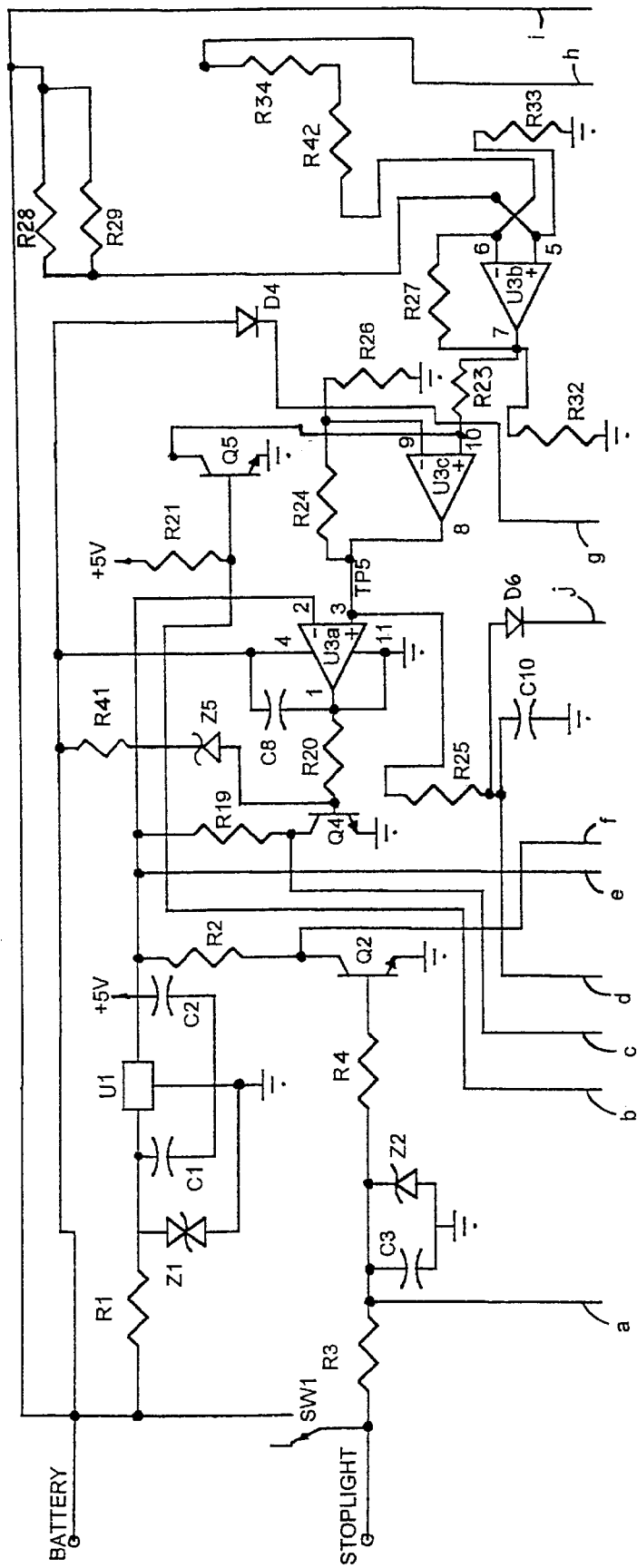
FIG. 17 is a schematic circuit diagram showing a third embodiment of the brake controller of the present invention.
Figure 17B:
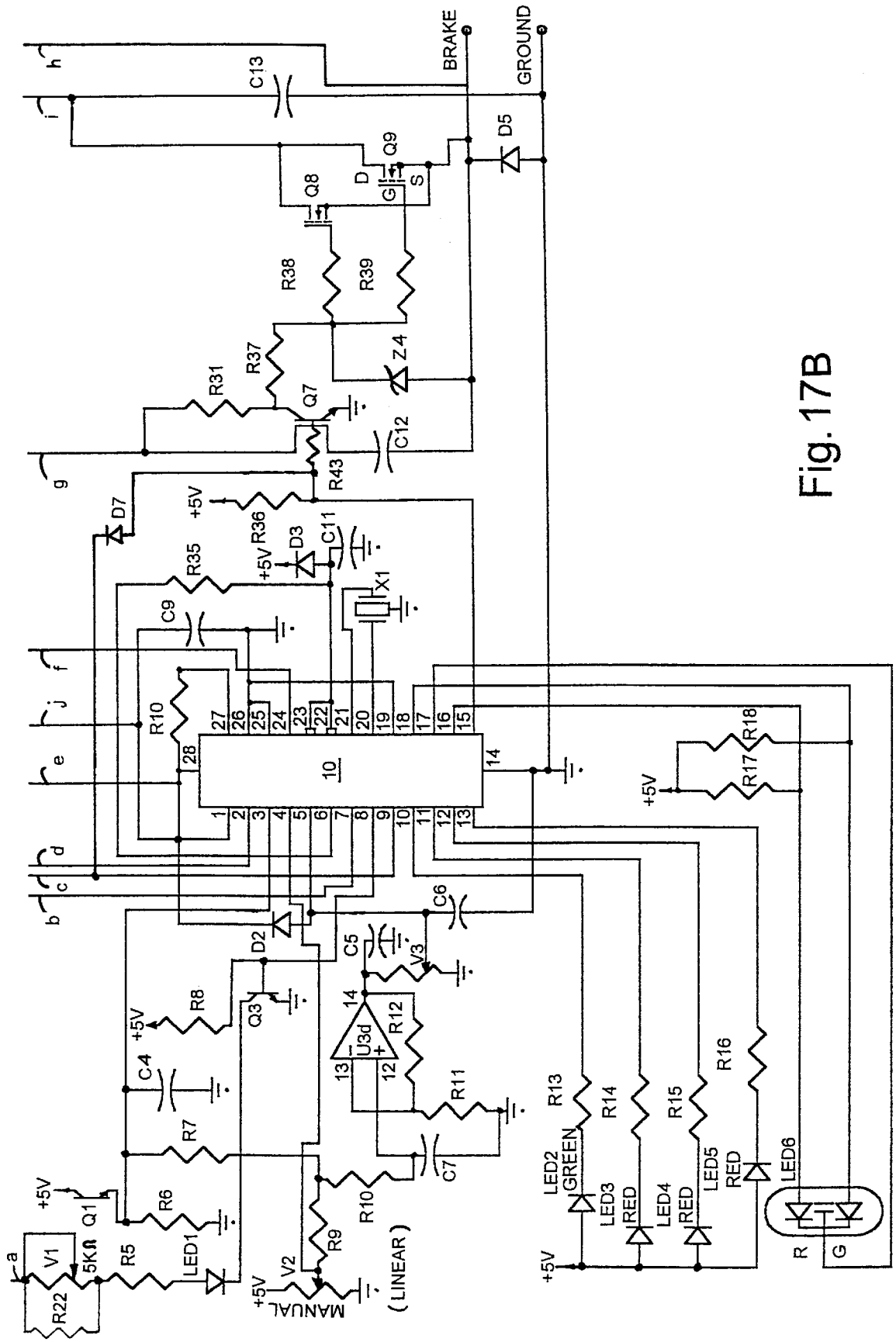

As presently contemplated, a most preferred alternate embodiment of the present invention is shown in the schematic diagram of FIG. 17, with the operation thereof being the same as the original embodiment discussed above unless indicated otherwise. Analysis of FIG. 17 shows that the output current sampling is no longer performed across resistor R30 of FIGS. 2 and 12. Instead, current sampling is done using the Rds/on "on" resistance of the output MOSFETS (Rds/on). The benefits of this arrangement are many. First, the use of the MOSFET's Rds/on saves cost and space on the circuit board. Second, the heat that was generated by resistor R30 is eliminated. Finally, using the internal MOSFET Rds/on helps prevent the brake controller from overheating and entering a thermal runaway situation. This is because the temperature of the MOSFET increases with increasing current flow, resulting in an increase in its Rds/on. With such an increased internal resistance, a smaller current is required to develop the voltage across the MOSFET which indicates overload current conditions, resulting in increased protection to the brake controller at elevated operating temperatures. A typical combined internal MOSFETS resistance of Q8 and Q9 is of the order of 15 milliohms which corresponds to a 0.45-volt drop when an output current of 30 amps is present.

FIG. 17 also show that the power control circuit has been removed in an effort to save cost. However, transistor Q5 is still implemented as follows. As before, an operational amplifier circuit is used to sense the sampled current by amplifying the differential mode signal that is developed across its terminals. But with the circuit arrangement of FIG. 17, in which the drain of the MOSFET is connected to the battery supply voltage, a very large differential mode signal is present when there is no flow of current to the brakes. This signal would incorrectly indicate a very large current, which would cause the current sense circuit to register overload current conditions. In order to prevent this situation from occurring, transistor Q5 is used by the microcontroller to disable the current sensing when there is no flow of current to the brakes. Pin 7 of the microcontroller drives the base of Q5. When on, Q5 pulls the output of amplifier U3b low, which disables the current sensing. The microcontroller turns Q5 on every time the pin 15 PWM drive signal is switched high (when there is no brake current), with Q5 remaining high for a precautionary period of time after the PWM drive signal is switched low in order to accommodate the rise time of the turn-on transient.

Another change to the circuit is the inclusion of a resistor R43 (preferably, 1 KOhm) coupled in series to the base of transistor Q7, and a diode D7 having its anode coupled between resistors R36 and R43 and its cathode connected to the collector of transistor Q4. Whenever there is an open ground condition, a high voltage is generated on the 12 volt battery line. This in turn generates an overload condition through R41 and Z5, which provides a drive to the base of Q4 and the collector of Q4 goes low thereby generating an interrupt. This causes the cathode of diode D7 to also go low at that time. When the cathode goes low it cuts the drive of the base of Q7 causing its collector to go high. When the collector of Q7 is high MOSFETS Q8 and Q9 are turned on to allow the voltage transients to dissipate in the brake magnets without damaging MOSFETS Q8 and Q9 as a result of high voltage.

As before, one of the purposes of the current sampling is to detect whether any magnets are connected. This is done by providing a low PWM (pin 15) pulse every 4 seconds, at times when braking is not being demanded, to verify that a current above a particular threshold level is established. This applied pulse is very short so as to make any braking action very minimal and unnoticeable to the operator of the vehicle. If the braking connection is so detected, then the green LED, LED2, will be in a dim state or will flash once every 8 seconds, depending on which mode of indication was initially selected by the vehicle's operator. If the brake connection is determined to not be present, then the green LED, LED2, will be off. If the current that is established by the short pulse exceeds a predetermined higher threshold value which corresponds to overload current conditions being present, then this condition can also be indicated to the operator of the vehicle.

With the requirement to detect small currents, the design of the U3b amplifier circuit must be well-balanced in order to keep the common mode rejection high. This demands that the resistors be at one percent tolerance at minimum and have the same temperature coefficients so that they are balanced over the entire operating temperature range. However, the output of operational amplifier U3b is temperature dependent. Because of this, fixed threshold means cannot be used to sense braking currents. Instead, a baseline level must be used which is correlated to this temperature dependency and which is established when detecting whether the brakes are connected (done when there is no braking demand). Two consecutive pulses of current are supplied, with the first pulse being very short and generating a voltage at test point 5 (TP5) which is the baseline value and which is typically about 0.4 volts in the most preferred alternate embodiment. The second pulse is wider, with any difference in TP5 voltages (generated when the second pulse voltage is higher) indicating that the brakes are connected. The baseline value is stored and is also used to display the current magnitude. This is accomplished by subtracting off the baseline value from the sampled current magnitude (voltage resulting therefrom) to establish the true level of current flowing to the brakes. Also, by establishing a baseline current in this fashion, the microcontroller may automatically determine the number of axles on the towed vehicle without requiring an operator to manually input the number of axles in the event that the brake controller utilizes the number of axles in any manner.

Another change in the most preferred alternate embodiment is that the display of the level of braking current via LEDs is now done by analyzing the duty cycle of the PWM drive signal instead of using the current values actually calculated by the current sense circuit, as provided above.

Another change in the most preferred alternate embodiment is that, after the first 250 millisecond period is over following the detection of overload current conditions, the PWM drive signal will be adjusted so that only seventy percent (in the preferred embodiment) of the maximum voltage demand will then be applied. If this lowered level of excitation does not cause overload current conditions again, then the brakes will function accordingly. As such, this method is useful for providing a reduced level of braking current in the response to a braking demand by the operator of the vehicle when marginal overload current conditions were originally present.

The most preferred alternate embodiment also enables the brake controller to detect when a lamp load is mistakenly connected to a brake magnet terminal. In such a situation, the filament load will cause the baseline current value to be higher than normal, which may cause operational problems. To solve this problem, the microcontroller compares the baseline value to a threshold level that would be surpassed if a lamp load is present. If this new threshold level is exceeded, then overload current conditions are indicated to the vehicle's operator.

Another change in the most preferred alternate embodiment is that software watchdogs are implemented in both the INTTC1 and INTTC2 interrupts which reset the microcontroller if one of the interrupts is not executed in the appropriate period of time4 milliseconds in the preferred embodiment. This prevents the microcontroller's programming from getting hung up due to a malfunction.

Still another change in the most preferred alternate embodiment is that, after the self-test is completed, the microcontroller automatically enters normal brake controller operation even if a voltage is maintained at the microcontroller's self-test pin.

The above-noted changes in the operation of the brake controller of the most preferred alternate embodiment can be seen in connection with the additional flowcharts provided in FIGS. 18–24 and described in detail below. It should be noted that the flowcharts of FIGS. 3–6 and 15 of the original embodiment have been retained in this alternate embodiment, with detailed descriptions thereof provided above.

Figure 18:
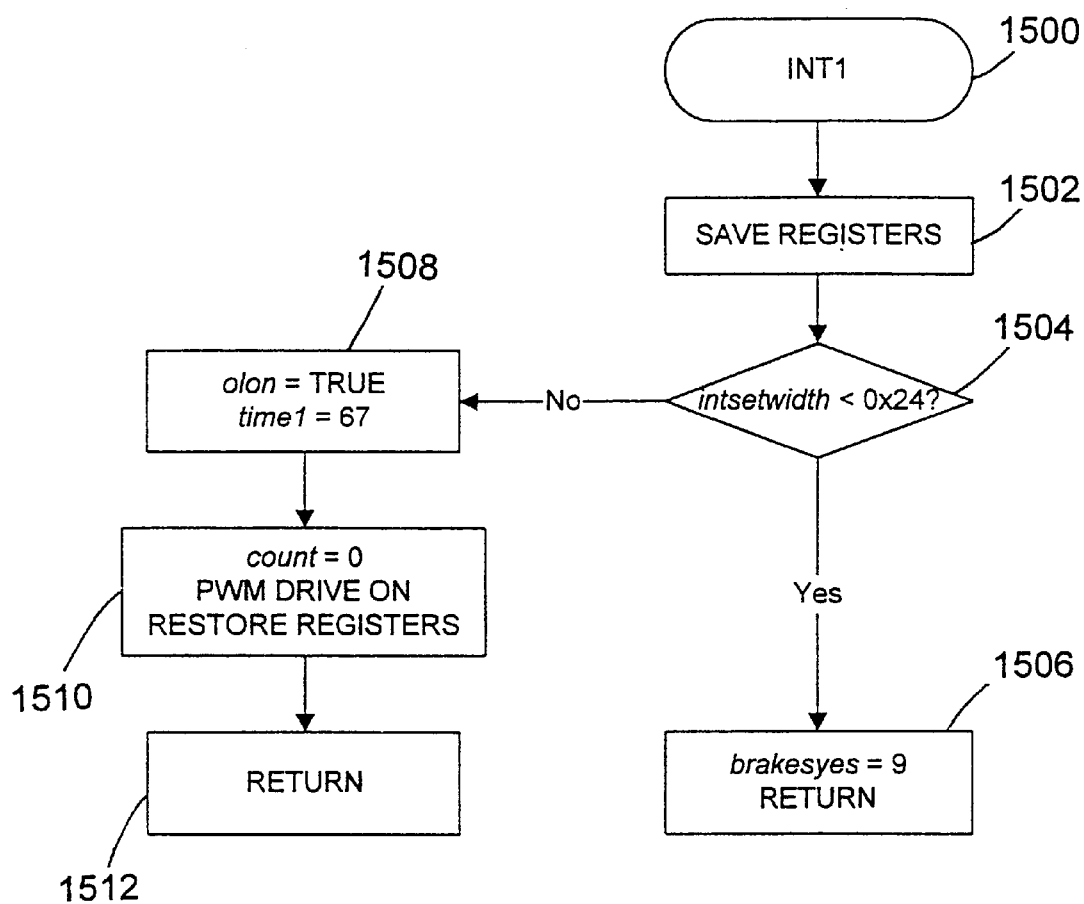
FIG. 18 is the flow diagram of the "INT1" interrupt for the microcontroller of the of the third embodiment of the present invention.

Shown in FIG. 18 is the INT1 interrupt for the microcontroller of the most preferred alternate embodiment. This interrupt begins with block 1500 which signifies the beginning of the interrupt. Next, block 1502 saves the microcontroller's registers in RAM. Block 1504 then determines if variable integersetwidth is less than hexadecimal 24 which would indicate that effectively no brake demand is present. If this condition is satisfied, then block 1506 sets variable brakes equal to 9 and the program returns from the interrupt. If block 1504 determines that some brake demand is present, then block 1508 sets variable overloadon equal to TRUE and variable time1 equal to 67. Next, block 1510 sets variable count equal to 0, turns the PWM drive off, and restores the microcontroller's registers from RAM. Block 1512 then causes the interrupt to return.

FIGS. 19A–19F show the INTTC1 interrupt for the microcontroller. Block 1514 (FIG. 19A) signifies the beginning of the interrupt. Next, block 1516 sets the watchdog control registers to certain values which, if exceeded, cause the microcontroller to be reset. Block 1518 then executes the CHECK CURRENT subroutine, and switches the PWM drive signal high such that no current is applied to the towed vehicle's brakes. Next, block 1520 determines if variable n is greater than 0 which would indicate that close to the maximum level of braking is being demanded. If not, then the program proceeds to block 1532. If block 1520 determines that variable n is greater than 0, then block 1522 determines if variable count is equal to 9 which would be the case if overload conditions do not exist. If the condition of block 1522 is not satisfied, then the program proceeds to block 1528. If the condition of block 1522 is satisfied, then block 1524 determines if variable overloadon is not set such that overload current conditions are not present. If overload conditions are present, then the program proceeds to block 1528. If block 1524 determines that variable overloadon is not set, then block 1526 switches the PWM drive signal (drive) low such that current is applied to the towed vehicle's brakes. After block 1526, block 1528 determines if variable std is set equal to YES which would indicate that the self-test has been performed. If not, then the program proceeds to block 1532. If the self-test has been performed, then block 1530 turns the bicolored LED's red component on.

Figure 19A:
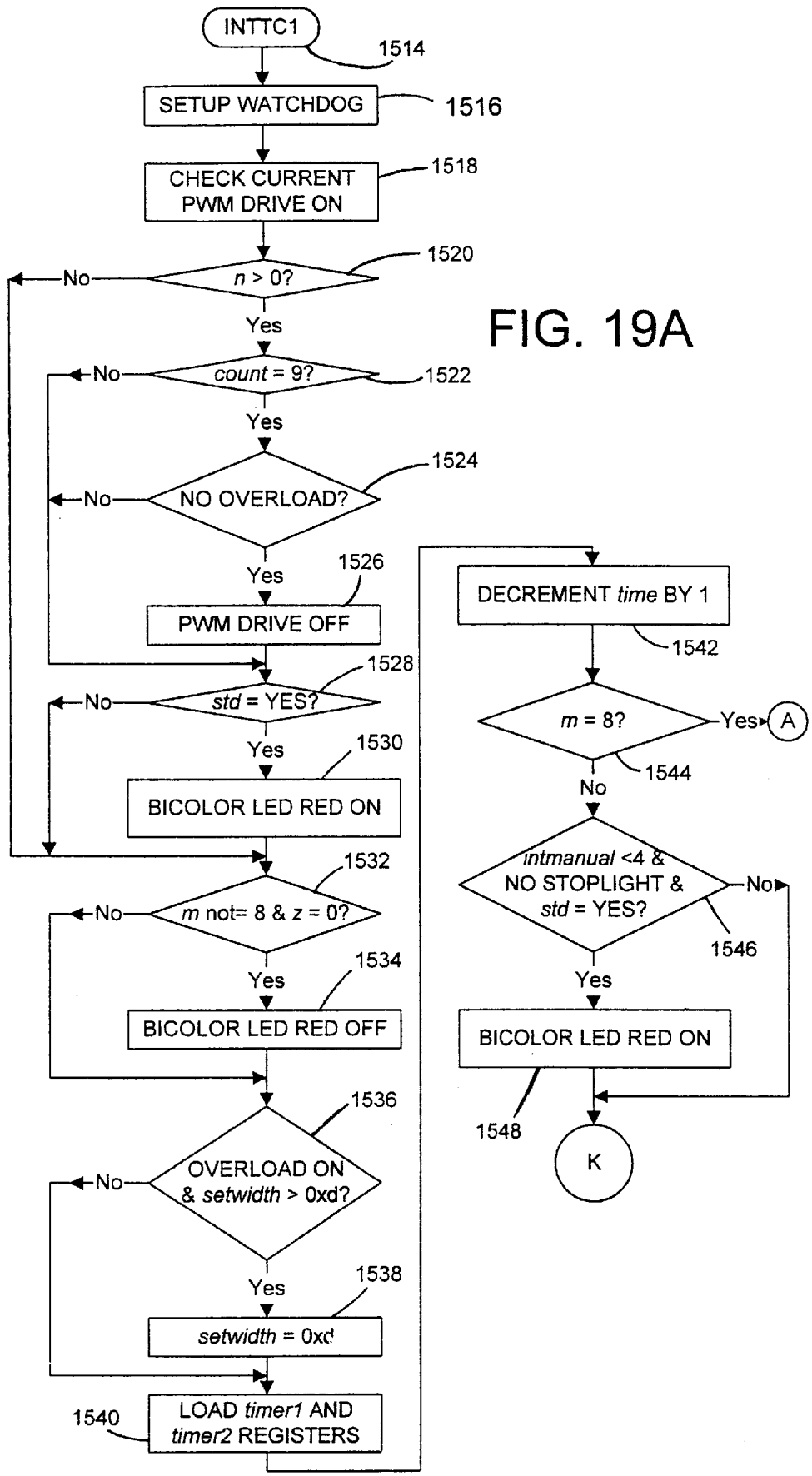
FIGS. 19A–19F are the flow diagrams of the "INTTC1" interrupt for the microcontroller of the third embodiment of the present invention.
Figure 19B:
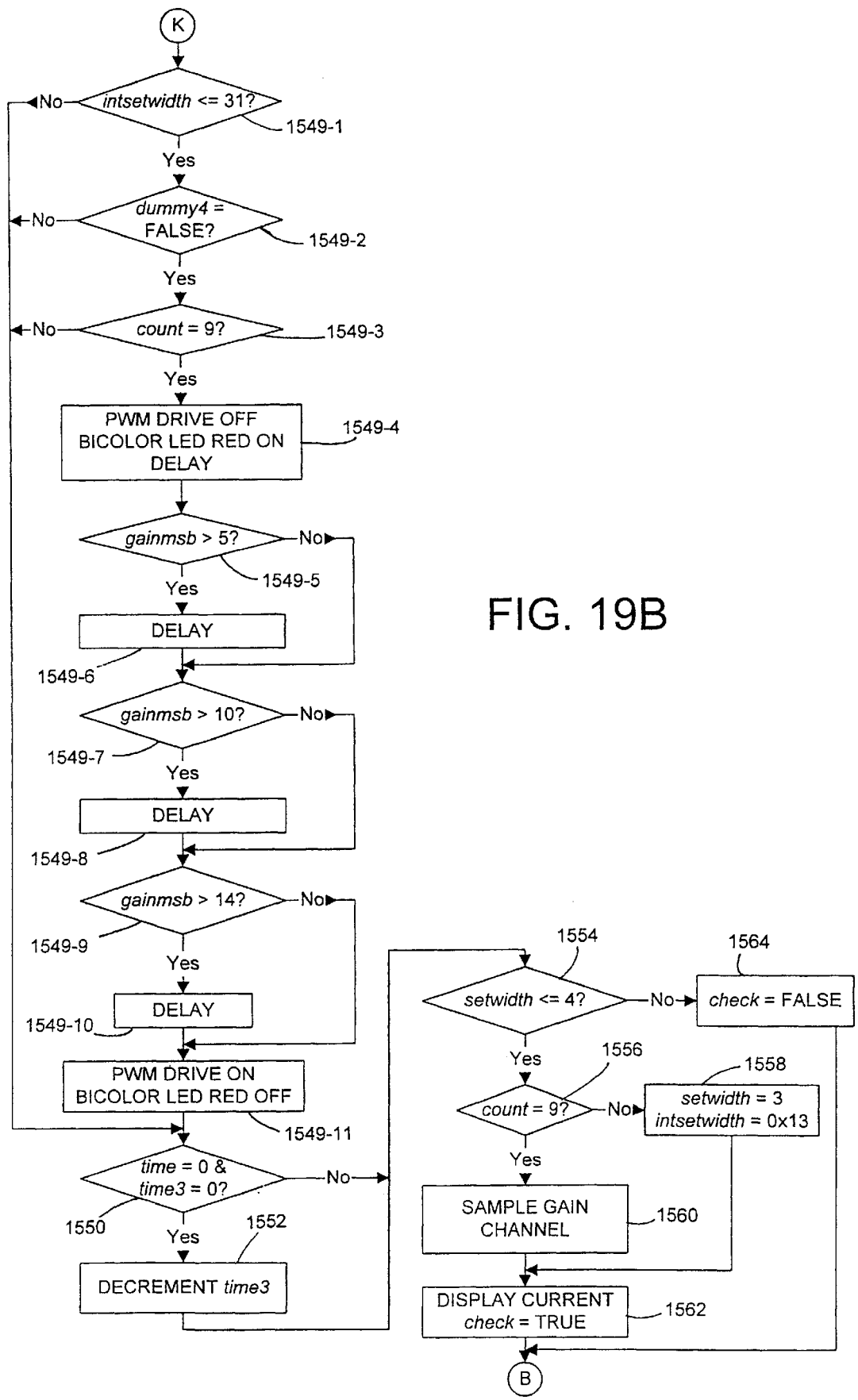
Figure 19C:
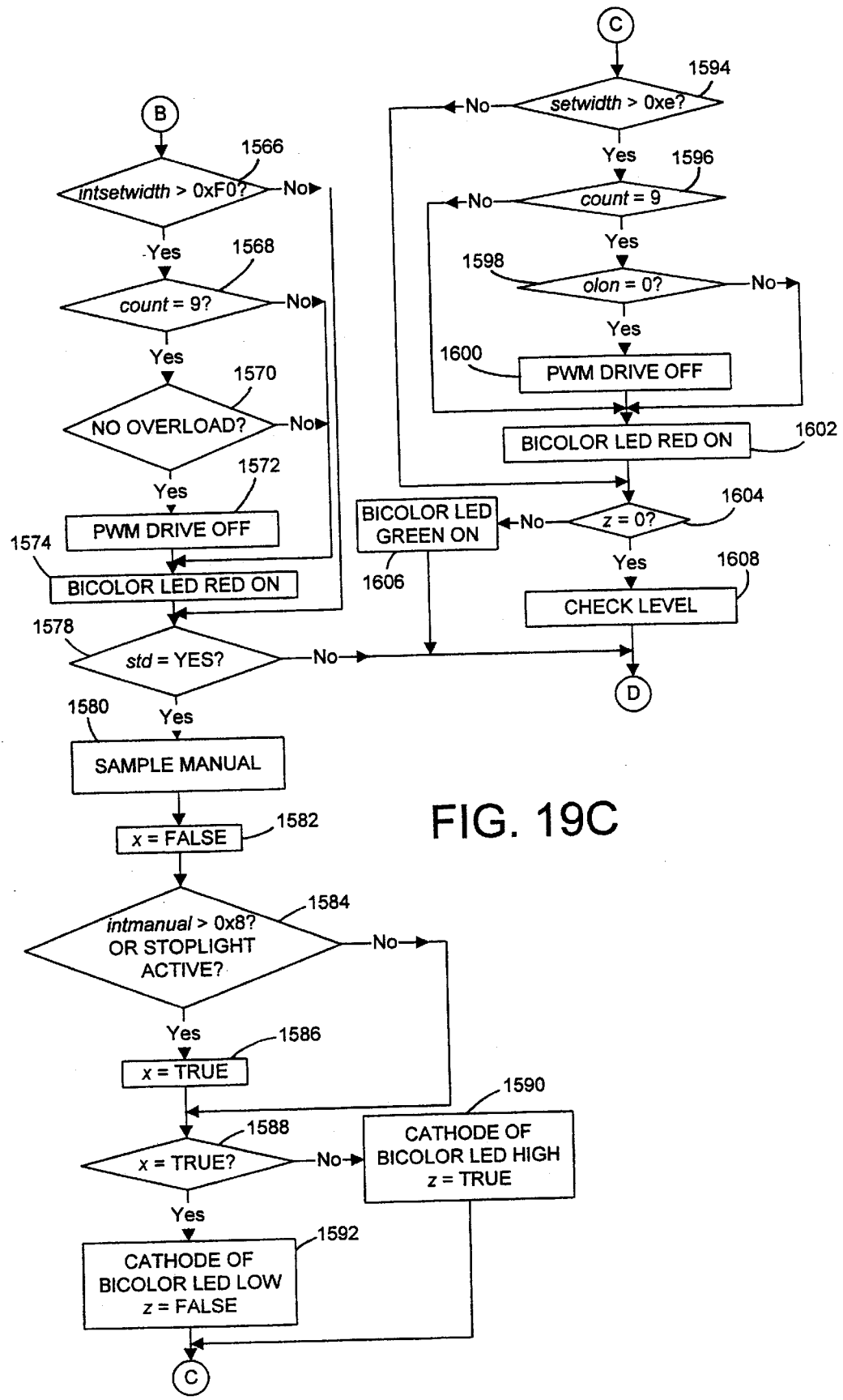
Figure 19D:
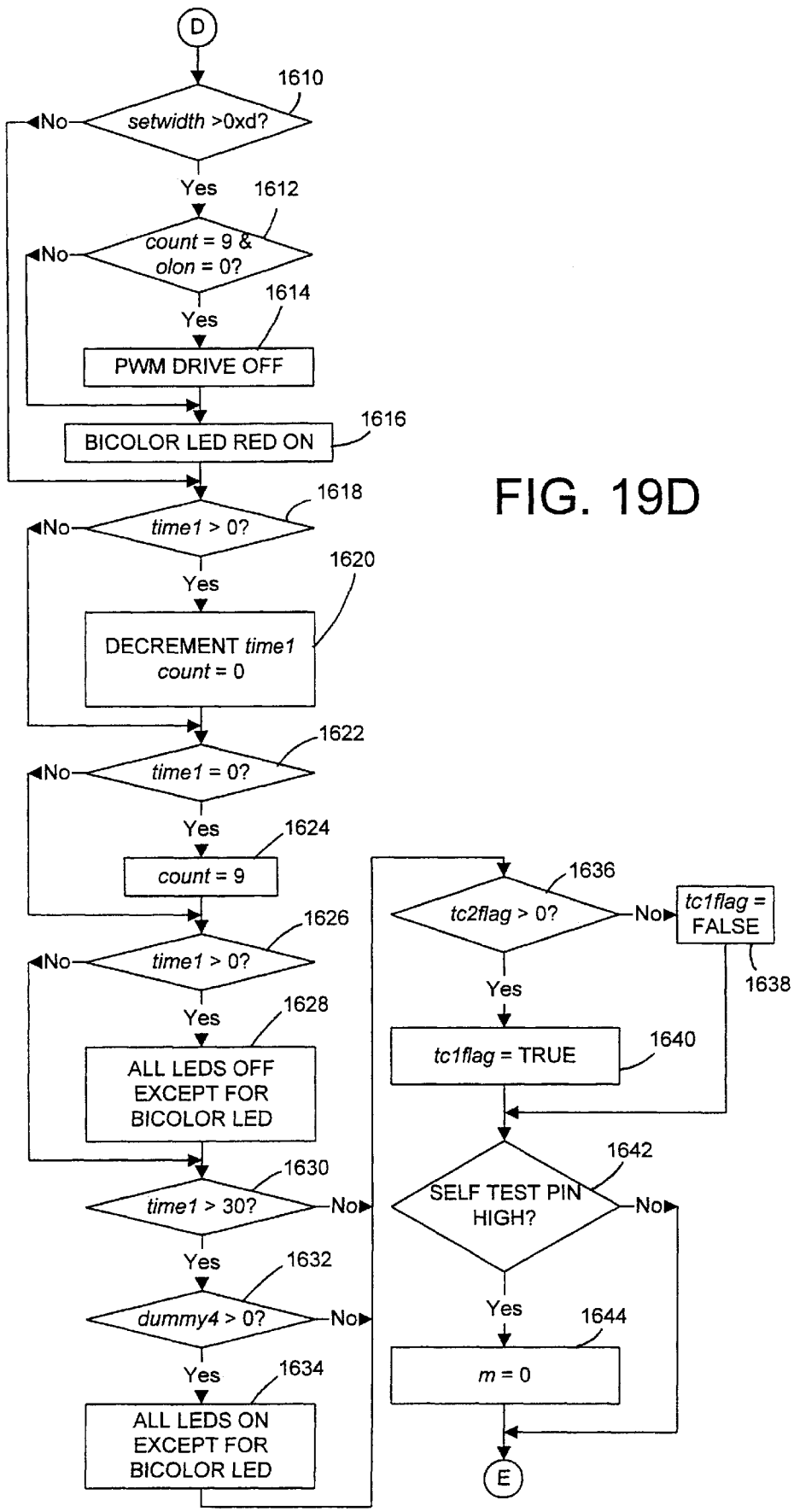
Figure 19E:
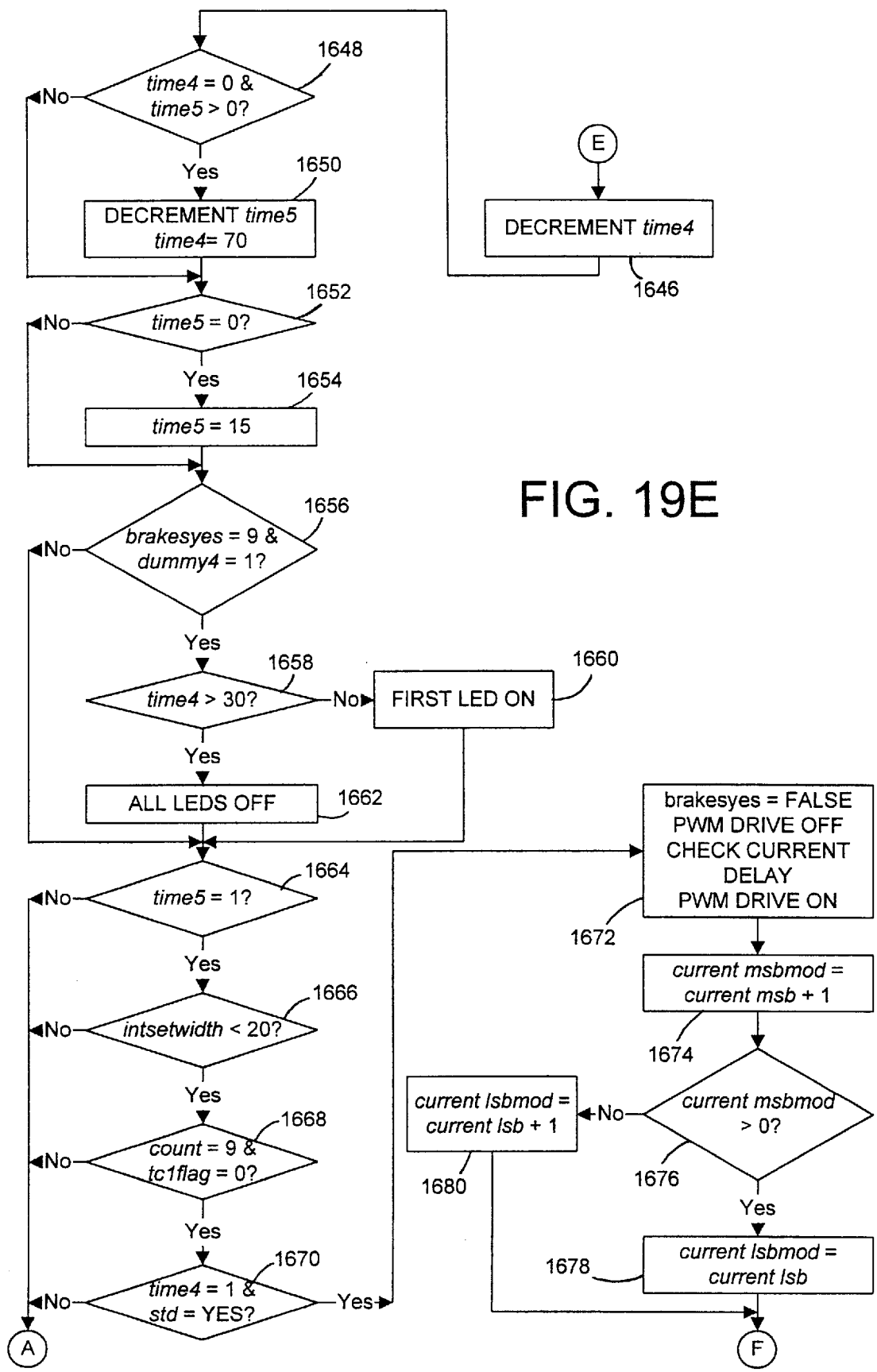
Figure 19F:
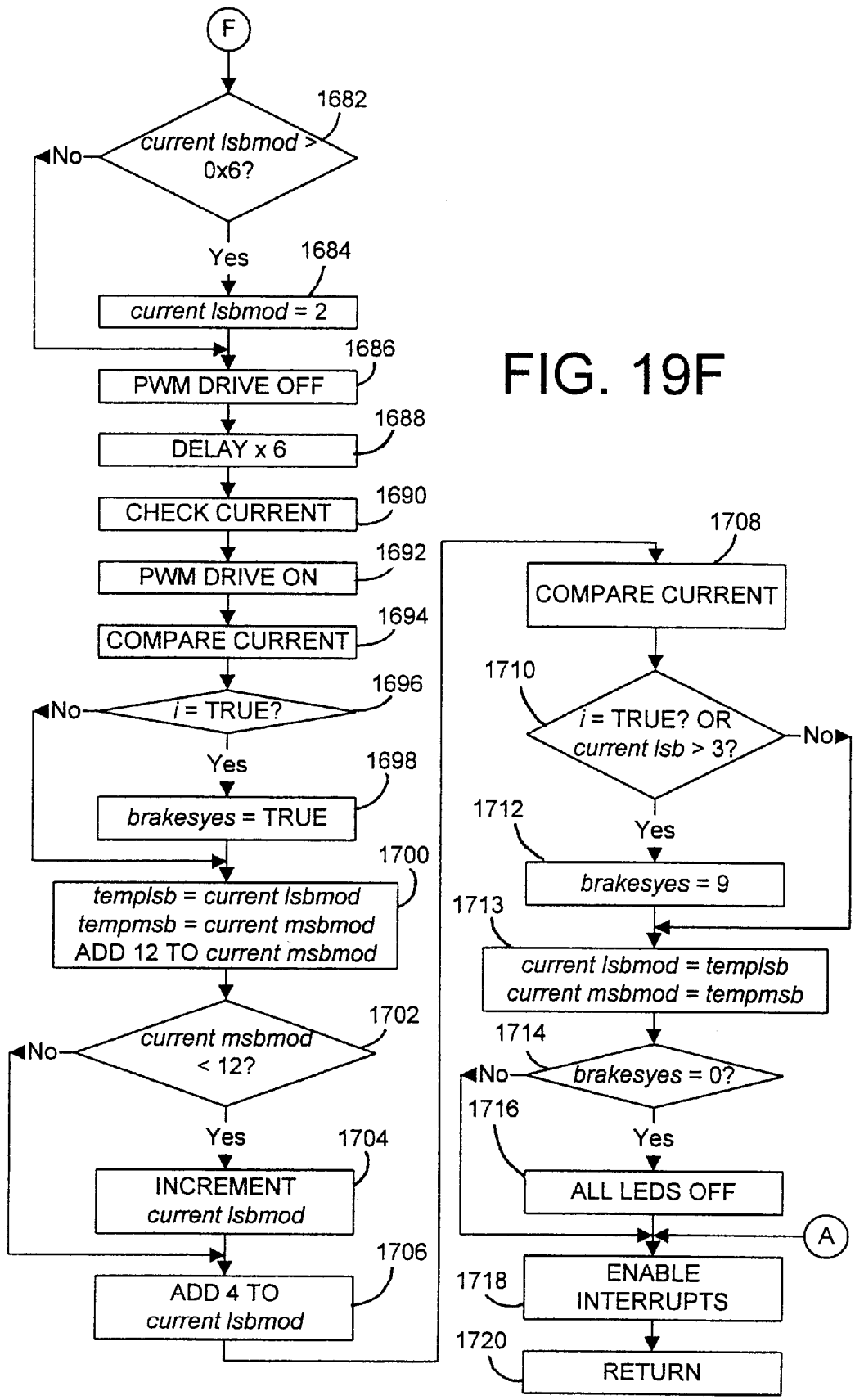

Next, block 1532 determines if variable m is not equal to 8 (indicating that the self-test is not being performed) and if variable z is equal to 0 (indicating that the brake controller is to provide brake current). If both conditions of block 1532 are not met, then the program proceeds to block 1536. If both conditions of block 1532 are met, then block 1534 turns the bicolored LED's red component off. Next, block 1536 determines if variable overloadon is set and if variable setwidth is greater than hexadecimal D. If not, then the program proceeds to block 1540. If both conditions of block 1536 are met, then block 1538 sets variable setwidth equal to hexadecimal D in order to limit the braking current level to seventy percent (in the preferred embodiment) of its maximum value. Next, block 1540 loads the timer1 and timer2 registers which determine when the interrupts are executed. Block 1542 then decrements variable time by 1 which is used in the timing of the turning on and off of the LEDs. Next, block 1544 determines if variable m is not equal to 8 which would indicate that the microcontroller is not in its self-test mode. If the microcontroller is in the self-test mode, then the program proceeds to block 1718 (FIG. 19F). If not, then block 1546 determines if variable intmanual is less than 4, if the brake lights of the towing vehicle are not lit, and if the self-test is completed.

Basically, the first two conditions just noted are to determine whether there is an appreciable brake demand. If the conditions of block 1546 are not satisfied, then the program proceeds to block 1550. If the conditions of block 1546 are satisfied, then block 1548 turns the bicolored LED's red component on. The section of the INTTC1 interrupt generally labelled 1549 in FIG. 19B takes care of the fine steps when the PWM duty cycle is low. Block 1549-1 checks to determine if the variable intsetwidth is less than 31. If it is not, then the program proceeds to block 1550. Otherwise, the block 1549-2 determines if the variable dummy4 is FALSE or 0. If it is not, then the program proceeds to block 1550. Otherwise, the block 1549-3 checks to see if the variable count is equal to 9. If not, the program proceeds to block 1550. Otherwise, operation in block 1549-4 is carried out. Block 1549-4 turns the PWM drive OFF, the bicolor LED red component ON and provides a fixed delay. Then block 1549-5 provides a fixed delay if variable gainmsb is greater than 5. This delay is implemented in block 1549-6. Block 1549-7 checks if the variable gainmsb is greater than 10. If it is, then a fixed delay implemented by block 1549-8 is provided. If the variable gainmsb is not greater than 10, then the block 1549-8 is skipped and consequently the delay is bypassed. The program then flows to block 1549-9, wherein a decision is made whether the variable gainmsb is greater than 14. If the decision is positive, meaning that gainmsb is greater than 14, then a fixed delay implemented by block 1549-10 is executed. Otherwise this delay is bypassed. It will be apparent from this discussion that a means is thus provided for providing a variable delay based on the value of the variable gainmsb, which is the least significant nibble of the sampled value of the gain channel.

Following the delay as discussed above, the PWM drive is turned ON to remove the current from the brake actuator magnets, and the drive to the red part of the bicolored LED turned OFF (block 1549-11). The program then proceeds to block 1550.

Next, block 1550 determines if variable time is set equal to 0 and variable time3 is greater than 0. Both of these variables are used for timing functions. If the conditions of block 1550 are satisfied, then block 1552 decrements variable time3. After block 1552, or if block 1550 determines that its two conditions are not satisfied, then the program proceeds to block 1554 which determines if variable setwidth is less than or equal to 4. If not, then block 1564 sets variable check equal to FALSE, and the program proceeds to block 1566 (FIG. 19C). If block 1554 determines that variable serwidth is less than or equal to 4, then block 1556 determines if variable count is equal to 9 which would indicate normal (not overload) conditions. If not, then block 1558 sets variable setwidth equal to 3 and variable integersetwidth equal to hexadecimal 13, and the program proceeds to block 1562. If block 1556 determines that variable count is equal to 9, then block 1560 samples the gain channel. Next, block 1562 executes the DISPLAY CURRENT subroutine and sets variable check equal to TRUE. The program then proceeds to block 1566.

Block 1566 of the INTTC1 interrupt determines if variable integersetwidth is greater than hexadecimal F0 which would indicate a very high demand for braking current. If not, then the program proceeds to block 1578. If a very high demand for braking current is determined to be present in block 1566, then block 1568 determines if variable count is equal to 9, which would indicate normal (not overload) conditions. If not, then the program proceeds to block 1574. If block 1568 determines that variable count is equal to 9, then block 1570 determines if the overloadon flag is not set indicating overload conditions are not present. If the condition of block 1570 is not met, then the program proceeds to block 1574. If the condition of block 1570 is met, then block 1572 turns the PWM drive signal low. Next, block 1574 turns the bicolored LED's red component on. Next, block 1578 determines if the self-test is completed and, if not, then the program proceeds to block 1610 (FIG. 19D). If the self-test is completed, then block 1580 samples the manual gain channel, and block 1582 sets variable x equal to FALSE. Next, block 1584 determines if variable intmanual is greater than 8 or if the brake pedal of the towing vehicle is pushed. If neither condition is met, then the program proceeds to block 1588. If at least one of the conditions in block 1584 is met, then block 1586 sets variable x equal to TRUE. Block 1588 then determines if variable x is equal to TRUE and, if not, the program proceeds to block 1590 which disables the bicolored LED and sets variable z equal to YES to indicate that the brake controller is not active. If block 1588 determines that variable x is equal to TRUE, then block 1592 enables the bicolored LED and sets variable z equal to FALSE (or 0) to indicate that the brake controller is to be active. The program then proceeds to block 1594.

Block 1594 of the INTTC1 interrupt determines if variable setwidth is greater than hexadecimal E, and, if not, the program proceeds to block 1604. If variable setwidth is greater than hexadecimal E, then block 1596 determines if variable count is set equal to 9 indicating normal (not overload) conditions. If not, then the program proceeds to block 1602. If it is, then block 1598 determines if variable overloadon is equal to 0 which would indicate non-overload conditions. If the condition of block 1598 is not met, then the program proceeds to block 1602. If the condition of block 1598 is met, then block 1600 turns the PWM drive signal low. Block 1602 then turns the bicolored LED red component on. Next, block 1604 determines if variable z is equal to 0 which would indicate the brake controller is to be active. If not, then block 1606 turns the bicolor green on to reduce power, and the program proceeds to block 1610. If block 1604 determines that variable z is equal to 0, then block 1608 checks the sensor level, and the program proceeds to block 1610.

Block 1610 of the INTTC1 interrupt determines if variable setwidth is greater than hexadecimal D, and, if not, the program proceeds to block 1618. If it is, then block 1612 determines if variable count is equal to 9 and if variable overloadon is equal to 0. If both conditions are satisfied, then block 1614 turns the PWM drive signal low. After block 1614, or if both conditions of block 1612 are not met, the program proceeds to block 1616 which turns the bicolored LED's red component on. Next, block 1618 determines if variable time1 is greater than 0. Variable time1 keeps track of the 250 millisecond timing for overload conditions. If variable time1 is not greater than 0, then the program proceeds to block 1622. If it is, then block 1620 decrements variable time1 and sets variable count equal to 0. Next, block 1622 determines if variable time1 is equal to 0. If not, then the program proceeds to block 1626. If the condition of block 1622 is met, then block 1624 sets variable count equal to 9 which indicates normal (not overload) conditions. Next, block 1626 determines if variable time1 is greater than 0. If not, the program proceeds to block 1630. If it is, then block 1628 turns all of the LEDs off except for the bicolor LED, and the program proceeds to block 1630. Block 1630 determines if variable time1 is greater than 30, which is equivalent to 120 milliseconds. If not, then the program proceeds to block 1636. If block 1630 determines that variable time1 is greater than 30, then block 1632 determines if variable dummy4 is equal to 0 which means the brake controller is required to provide braking current. If block 1632 determines that variable dummy4 is equal to 0, then the program proceeds to block 1636. If block 1632 determines that variable dummy4 is not equal to 0, then block 1634 turns all LEDs on for flashing purposes except for the bicolor LED. Next, block 1636 determines if variable tc2flag is greater than 0 which would indicate that interrupt INTTC2 was in execution and had been interrupted by the current execution of interrupt INTTC1. If the condition of block 1636 is not satisfied, then block 1638 sets variable tc1flag equal to FALSE, and the program proceeds to block 1642. If the condition of block 1636 is satisfied, then block 1640 sets variable tc1flag equal to TRUE. Block 1642 then determines if the self-test mode has not been selected. If it has, then the program proceeds to block 1646 (FIG. 19E). If the self-test mode has not been selected, then block 1644 sets variable m equal to 0 to indicate that a self-test has not been requested. The program then proceeds to block 1646.

Block 1646 of the INTTC1 interrupt decrements variable time4 which is used to determine when to sample current to ensure that the brakes are connected. Next, block 1648 determines if variable time4 is equal to 0 and if variable time5 is greater than 0. If both conditions are not met, then the program proceeds to block 1652. If both conditions of block 1648 are met, then block 1650 decrements variable time5 and sets variable time4 equal to 70. Next, block 1652 determines if variable time5 is equal to 0. If not, then the program proceeds to block 1556. If it is, then block 1654 sets variable time5 to 15. Block 1656 then determines if variable brakesyes is equal to 9 (indicating overload conditions when brake current is not being demanded) and if variable dummy4 is equal to 1 (indicating no brake current demand). If both conditions are not satisfied, then the program proceeds to block 1664. If both conditions of block 1656 are satisfied, then block 1658 determines if variable time4 is greater than 30. If not, then block 1660 turns the first LED on, and the program proceeds to block 1664. If block 1658 determines that variable time4 is greater than 30, then block 1662 turns all LEDs off except the bicolor. Next, block 1664 determines if variable time5 is equal to 1 indicating that it is time to detect whether the brakes are connected. If not, then the program proceeds to block 1718 (FIG. 19F). If it is, then block 1666 determines if variable integersetwidth is less than 20 which would indicate no brake current demand. If the condition of block 1666 is not met, then the program proceeds to block 1718 (FIG. 19F). If it is, then block 1668 determines if variable count is equal to 9 and if variable tc1flag is equal to 0 (indicating that interrupt INTTC2 had not been interrupted by the current execution of interrupt INTTC1). If both conditions are not satisfied, then the program proceeds to block 1718. If both conditions are satisfied, then block 1670 determines if variable time4 is equal to 1 and if variable std is equal to YES (indicating that the self-test was completed). If both conditions are not satisfied, then the program proceeds to block 1718. If both conditions are satisfied, then block 1672 sets variable brakesyes equal to FALSE, turns the PWM drive signal low, executes subroutine CHECK CURRENT, delays a predetermined period of time, and then switches the PWM drive signal high. Next, block 1674 sets variable current msbmod equal to variable current msb+1 in order to establish the threshold level of current used to sense that the brakes are connected. Block 1676 then determines if variable current msbmod is greater than 0. If not, then block 1680 sets variable current lsbmod equal to variable current lsb+1, and the program proceeds to block 1682 (FIG. 19F). If the condition of block 1676 is satisfied, then block 1678 sets variable current lsbmod equal to variable current lsb, and the program proceeds to block 1682.

Block 1682 of the INTTC1 interrupt determines if variable current lsbmod is greater than 6 which would indicate that the baseline value of voltage corresponding to current is too high. If not, then the program proceeds to block 1686. If it is, then block 1684 sets variable current lsbmod equal to 2. Next, block 1686 switches the PWM drive signal low, and block 1688 delays for a predetermined period of time that is eight times that of before. Block 1690 then executes the CHECK CURRENT subroutine, and block 1692 switches the PWM drive signal high. Block 1694 executes the COMPARE CURRENT subroutine. Next, block 1696 determines if variable i is equal to TRUE which would be the case if the threshold is exceeded such that the connection of the brakes is confirmed. If not, then the program proceeds to block 1700. If the condition of block 1696 is satisfied, then block 1698 sets variable brakesyes equal to TRUE. Block 1700 then sets variable templsb equal to variable current lsbmod, sets variable tempmsb equal to variable current msbmod, and adds 12 to variable current msbmod to establish the lamp load threshold for current. Next, block 1702 determines if variable current msbmod is less than 12. If not, then the program proceeds to block 1706. If it is, then block 1704 increments variable current lsbmod. Block 1706 then adds 4 to variable current lsbmod, and block 1708 executes the COMPARE CURRENT subroutine. Block 1710 then determines if variable i is equal to TRUE or if variable current lsb is greater than 3. If neither condition is true, then the program proceeds to block 1713. If at least one of the conditions of block 1710 is true, then block 1712 sets variable brakesyes equal to 9 (indicating overload current, conditions when no brake current is being demanded). Block 1713 sets variable current lsbmod equal to variable templsb (to restore it), and sets variable current msbmod equal to variable tempmsb (to restore it). Block 1714 then determines if variable brakesyes is equal to 0 indicating that no brakes are present. If the condition of block 1714 is not satisfied, then the program proceeds to block 1718. Otherwise, block 1716 turns all of the LEDs off. Block 1718 then enables the interrupts, and the program returns from the interrupt via block 1720.

Figure 20A:
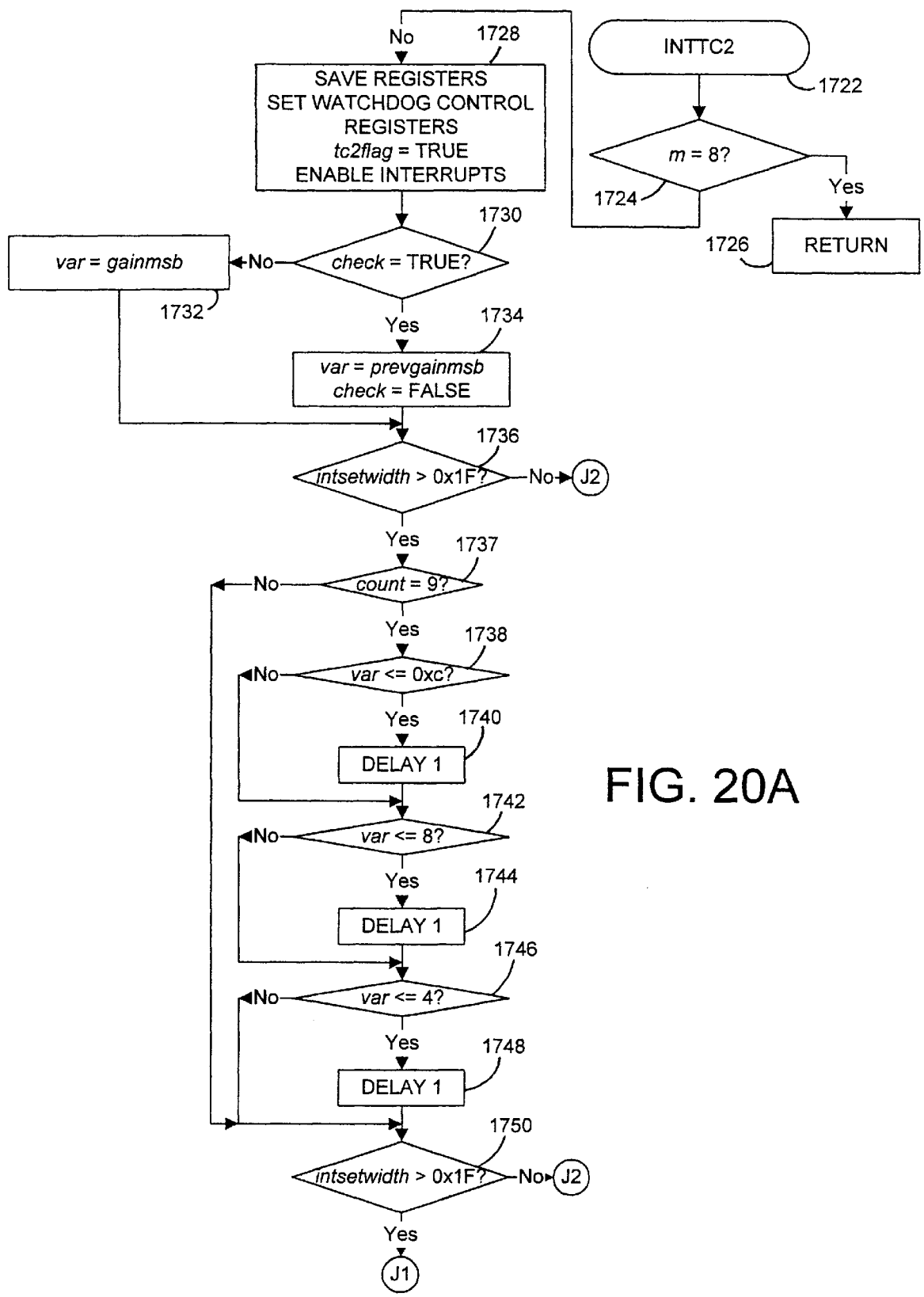
FIGS. 20A and 20B are the flow diagram of the "INTTC2" interrupt for the microcontroller of the third embodiment of the present invention.
Figure 20B:
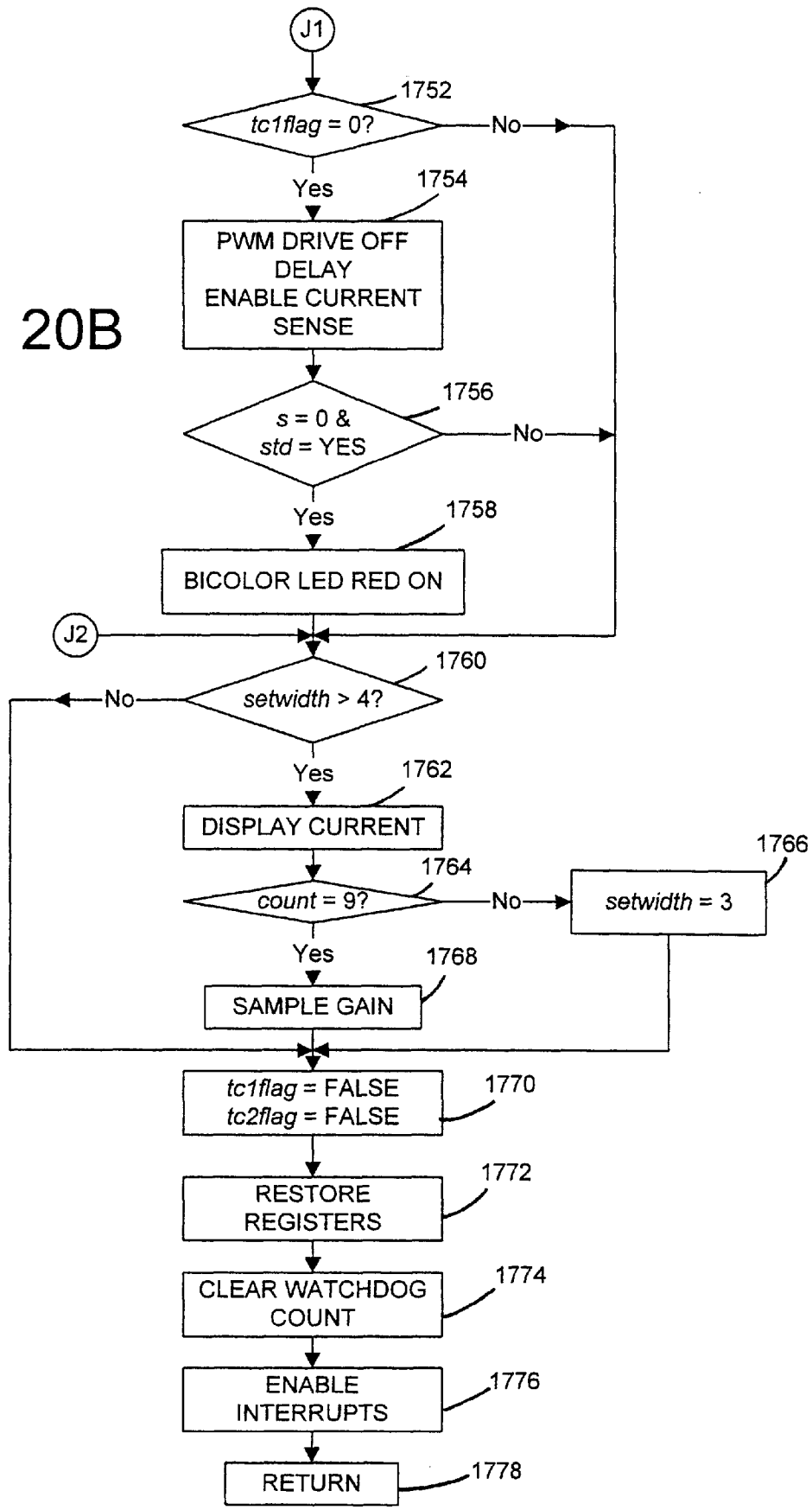

Shown in FIGS. 20A and 20B is the INTTC2 interrupt for the microcontroller. This interrupt begins with block 1722 which signifies the beginning of the interrupt. Next, block 1724 determines whether variable m is not equal to 8. If it is not, the INTTC2 routine is completed in block 1726. If m is equal to 8, block 1728 of the routine sets the watchdog control registers to certain values which, if exceeded, causes the microcontroller to be reset. Block 1728 also sets variable tc2flag equal to TRUE to indicate that interrupt INTTC2 is active if ultimately interrupted by INTTC1. Additionally, block 1728 enables the interrupts, and block 1730 determines if variable check is equal to TRUE which would indicate that the gain was sampled in interrupt INTTC1 and that variable setwidth is less than or equal to 4. If the variable check is not TRUE as determined in block 1730, then the variable var is set to equal the variable gainmsb, which is the least significant nibble of the sampled value of the gain channel. If the variable check is TRUE, then the block 1734 sets the variable var to equal the variable prevgainmsb which is the same as the gainmsb during last sample. Block 1736 checks to see if the variable intsetwidth is greater than hexadecimal 1F. If the condition of the block 1736 is not satisfied, the routine advances to block 1760 (FIG. 20B) otherwise it advances to block 1737. Block 1737 checks to see if the variable count is equal to 9. If the condition of the block 1737 is not satisfied, then the program proceeds to block 1750. If the condition of block 1737 is satisfied, then the blocks 1738 through 1748 add a variable delay based on the value of variable var. This provides an additional resolution to the PWM drive signal. If the variable var is less than or equal to hexadecimal 12 as determined by the block 1738, then a delay of approximately 60 microseconds is provided in block 1740. If the variable var is greater than hexadecimal 12, then this delay is bypassed.

Similarly, block 1742 determines if variable var is less than or equal to 8. If it is, then another delay of 60 microseconds is added in the program as implemented by block 1744. If the variable var is not equal to or less than 8, then the delay of block 1744 is bypassed. Similarly, block 1746 determines if variable var is less than or equal to 4. If so, then another delay of 60 microseconds is added via block 1748. If variable var is greater than 4, then this delay provided by block 1748 is bypassed. Block 1750 determines if variable setwidth is greater than hexadecimal 1F. If so, the routine proceeds to block 1752 (FIG. 20B), otherwise it proceeds to block 1760. If, in block 1752, the variable tc1flag is equal to 0, then the program proceeds to block 1754, otherwise it goes to block 1760. Then three events happen in sequence, as shown in block 1754. First, PWM drive signal is turned OFF so that the current to the brakes is turned on. Second, a delay is implemented. Third, the current sense is enabled. This sequence is necessary because of the exponential rise of the current in the brakes.

After executing the block 1754, the program flows to block 1756. This block checks if variable s is equal to 0 and variable std is equal to constant YES. If both conditions are true, then the block 1758 turns the red bicolored LED on, so that it shows the intensity proportional to the braking action. The program then proceeds to check the condition in block 1760. This condition checks if variable setwidth is greater than 4. If not, the program proceeds to block 1770. If condition in block 1760 is TRUE, then the program proceeds to block 1762. The routine DISPLAY CURRENT is implemented in this block. One or more or none of the four LEDs are lighted, depending on the duty cycle of the PWM. Block 1764 determines if the variable count equals 9. If it does, then the gain channel is sampled. If the variable count does not equal 9 in block 1764, then the variable setwidth is set equal to 3. In block 1770, the variables tc1flag and tc2flag are reset to FALSE. In block 1772, the registers are restored to the same values that they had before entering the interrupt subroutine INTTC2. Arrival of the program to block 1774 indicates proper operation, hence the watchdog count is cleared. The interrupts are enabled in block 1776 and the program returns from interrupt in block 1778, which is the end of the interrupt subroutine INTTC2.

Figure 21A:
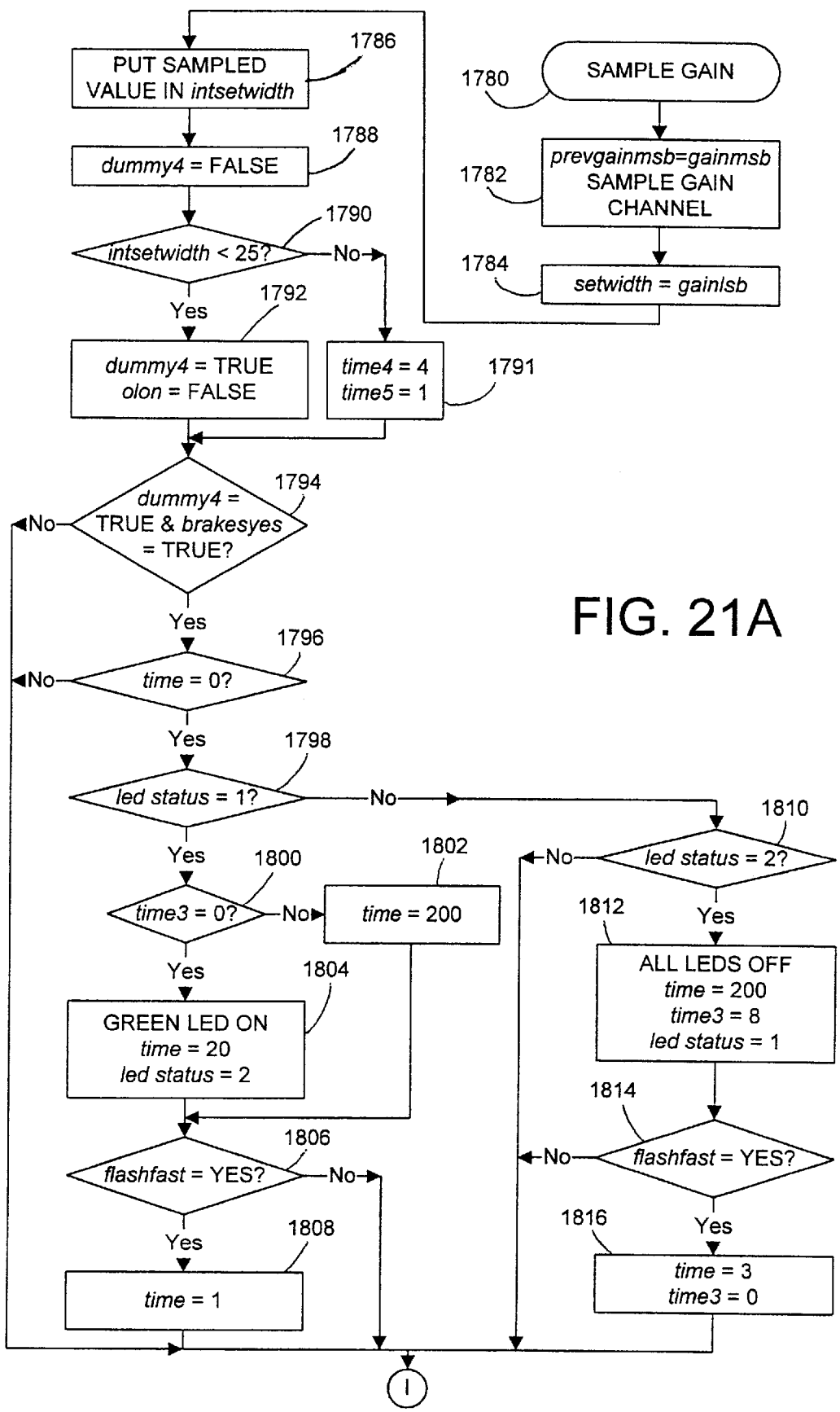
FIGS. 21A and 21B are the flow diagrams of the "SAMPLE GAIN" subroutine for the microcontroller of the third embodiment of the present invention.
Figure 21B:
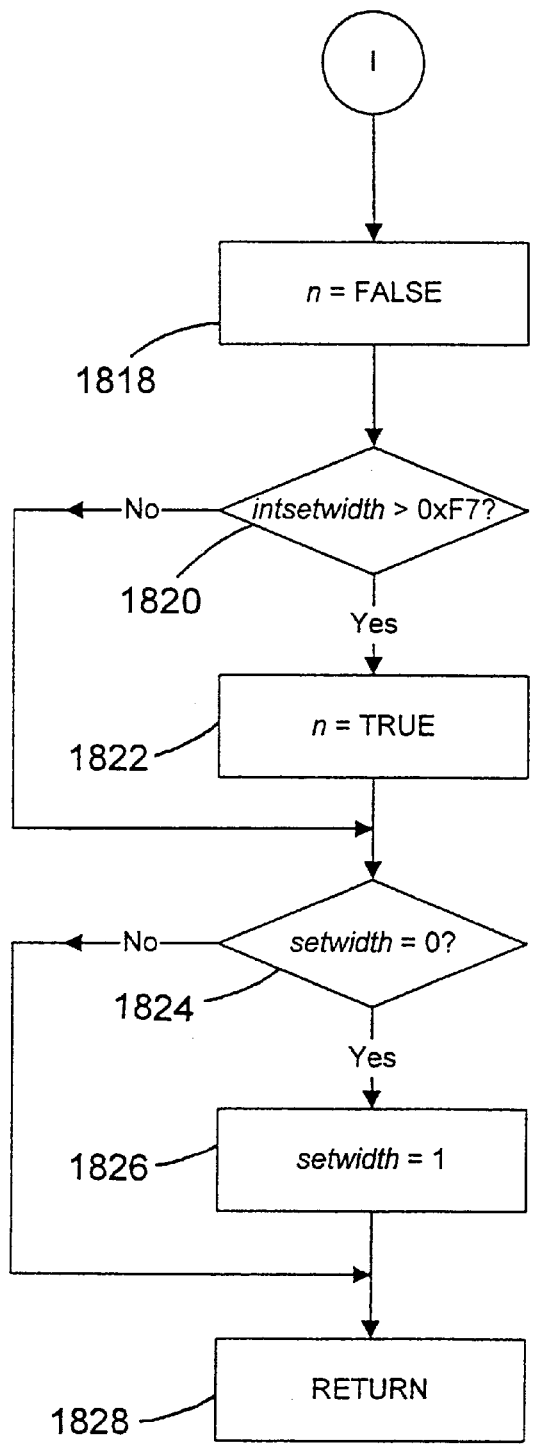

FIG. 21 shows the SAMPLE GAIN subroutine for the microcontroller that begins with block 1780. Block 1782 sets previous variable gainmsb (which keeps track of where the gain is sampled) equal to variable gainmsb in order to initialize it to the last value of the sampled gain, and samples the gain channel for a new value. Next, block 1784 sets variable setwidth equal to variable gainlsb. Block 1786 then stores the newly sampled gain into variable integersetwidth. Block 1788 sets variable dummy4 equal to FALSE to initialize it for the subsequent programming blocks. Next, block 1790 determines if variable integersetwidth is less than 25 which would indicate that there is no demand for braking current. If the condition of block 1790 is not satisfied, then the program proceeds to block 1791, which sets variable time4 equal to 4, sets variable time5 equal to 1 and then advances the program to block 1794 (noted below) bypassing block 1792. If block 1790 is satisfied and thus determines that there is no demand for braking current, the program proceeds to block 1792 which sets variable dummy4 equal to TRUE to indicate that condition and sets variable overloadon equal to FALSE to reinitialize the overload status variable. After block 1792, block 1794 determines if variable dummy4 is set equal to TRUE and if variable brakesyes is set equal to TRUE. Variable brakesyes is TRUE if the brakes are connected. If both conditions of block 1794 are not satisfied, then the program proceeds to block 1818 (FIG. 21B). If both conditions of block 1794 are satisfied, then block 1796 determines if variable time is equal to 0. If not, then the program proceeds to block 1818. If block 1796 determines that variable time is equal to 0, then block 1798 determines if variable led status is equal to 1. If not, then blocks 1810–1816 cause the LED2 to flash every 8 seconds, and the program proceeds to block 1818. If block 1798 determines that variable led status is equal to 1, then blocks 1800–1808 cause a dimming of the LED2. Block 1818 then sets variable n equal to FALSE as a means of initialization for the subsequent blocks. Next, block 1820 determines if variable integersetwidth is greater than hexadecimal F7 which would indicate that the demand for braking is close to its maximum level. If not, then the program proceeds to block 1824. If the condition of block 1820 is satisfied, then block 1822 sets variable n equal to TRUE to indicate that close to the maximum level of braking is being demanded. Next, block 1824 determines if variable setwidth is equal to 0 indicating that there is no demand for braking. If condition of block 1824 is not satisfied, then the subroutine returns via block 1828. If the condition of block 1824 is satisfied, then block 1826 sets variable setwidth equal to 1. The subroutine then returns via block 1828.

Figure 22:
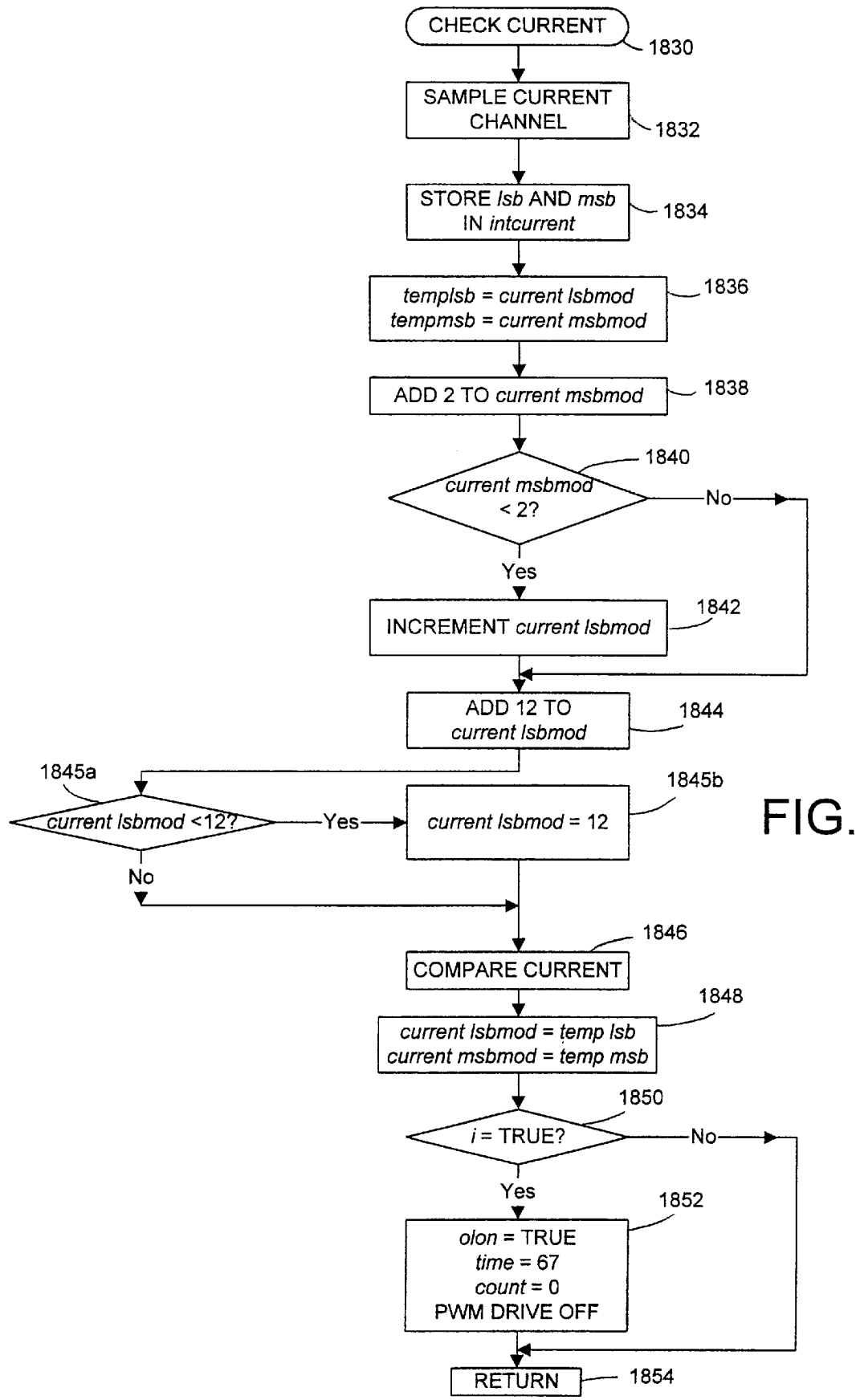
FIG. 22 is the flow diagram of the "CHECK CURRENT" subroutine for the microcontroller of the third embodiment of the present invention.

Shown in FIG. 22 is the CHECK CURRENT subroutine for the microcontroller. Block 1830 signifies the beginning of the subroutine. Next, block 1832 samples the current sensed by pin 2 of the microcontroller. Block 1834 stores the least significant and most significant bytes of the sampled current into variable integercurrent. Next, block 1836 stores the baseline current value into temporary variables by setting variable templsb equal to variable current lsbmod and variable tempmsb equal to variable current msbmod. Block 1838 then adds 2 to the baseline current value in variable current msbmod. After block 1838, block 1840 determines if variable current msbmod is less than hexadecimal 2 which would indicate overflow caused by the addition in block 1838. If so, then block 1842 increments the value of variable current lsbmod to reflect the overflow caused by the addition. After block 142, or if block 1840 determines that variable current msbmod is not less than 2, the program proceeds to block 1844, which adds 12 to the value in variable current lsbmod. Block 1836–1845 establishes the overload current condition threshold of approximately 30 amps. Next, block 1845 determines whether variable current lsbmod is less than 12. If it is, then current lsbmod is set to 12 in block 1845A otherwise block 1845A is bypassed and the program advances to block 1846, which executes the COMPARE CURRENT subroutine to compare the sampled current magnitude to the overload current condition threshold, with variable i being set to TRUE if the overload threshold is surpassed. Upon return from the COMPARE CURRENT subroutine, block 1848 restores the original baseline values by setting variable current lsbmod equal to variable templsb and variable current msbmod equal to variable tempmsb. Block 1850 then determines if variable i is set equal to TRUE indicating overload current conditions. If not, then the subroutine returns via block 1854. If overload current conditions are indicated in block 1850, then block 1852 sets variable overloadon equal to TRUE, variable time equal to 67, variable count equal to 0, and turns the PWM drive off. Block 1854 then causes the subroutine to return.

Figure 23:
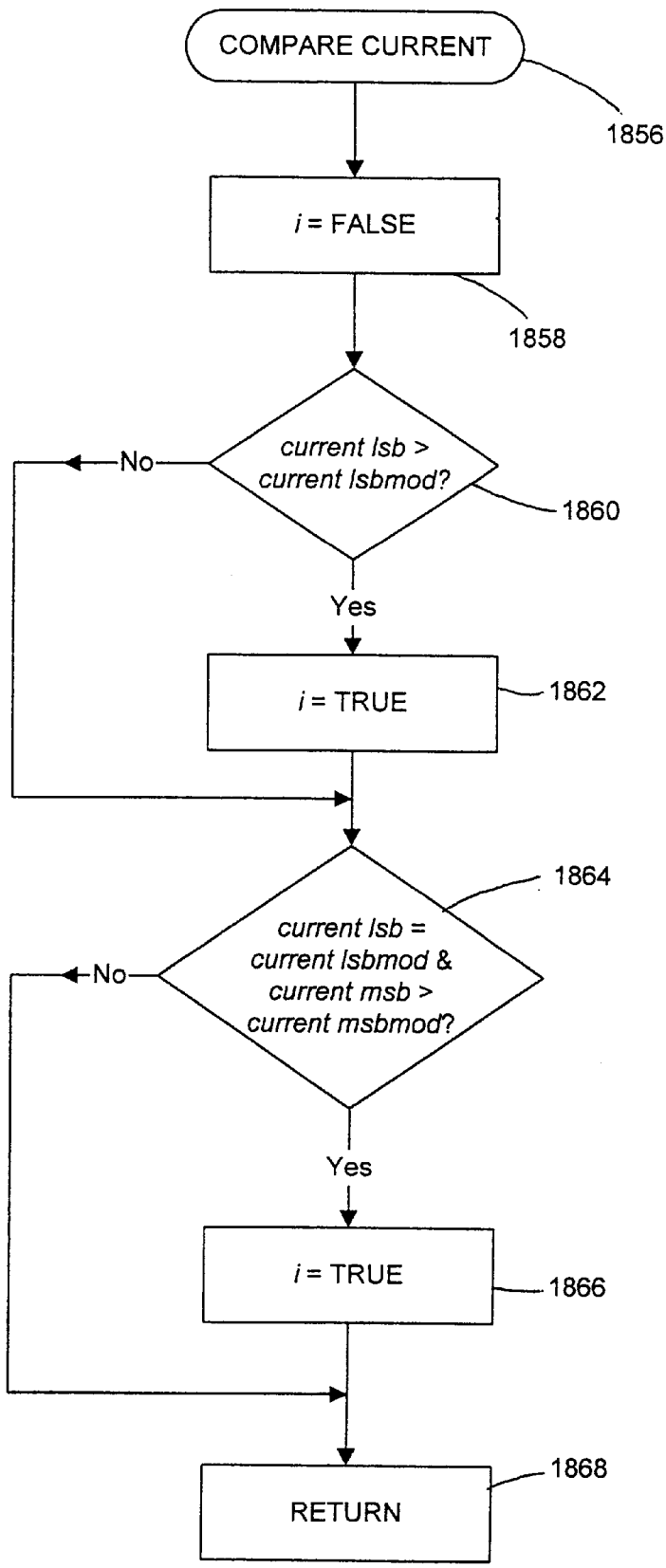
FIG. 23 is the flow diagram of the "COMPARE CURRENT" subroutine for the microcontroller of the third embodiment of the present invention.

Shown in FIG. 23 is the COMPARE CURRENT subroutine for the microcontroller. Block 1855 signifies the beginning of the subroutine. Next, block 1858 sets variable i equal to FALSE. This value of this variable at the end of this subroutine will indicate whether the sampled current magnitude is greater or lesser than a predetermined current value. After block 1858, block 1860 determines if variable current lsb (representing the least significant byte of the sample current magnitude) is greater than variable current lsbmod. If so, then block 1862 sets variable i=TRUE, and the program proceeds to block 1864. If the condition of block 1860 is not satisfied, then the program proceeds directly to block 1864. Block 1864 determines if variable current lsb is equal to variable current lsbmod and if variable current msb (representing the least significant byte of the sampled current magnitude) is greater than variable current msbmod. If both conditions are not satisfied in block 1864, then the program proceeds to block 1868. If both conditions are satisfied in block 1864, then block 1866 sets variable i equal to TRUE. Block 1868 then causes the subroutine to return.

Figure 24A:
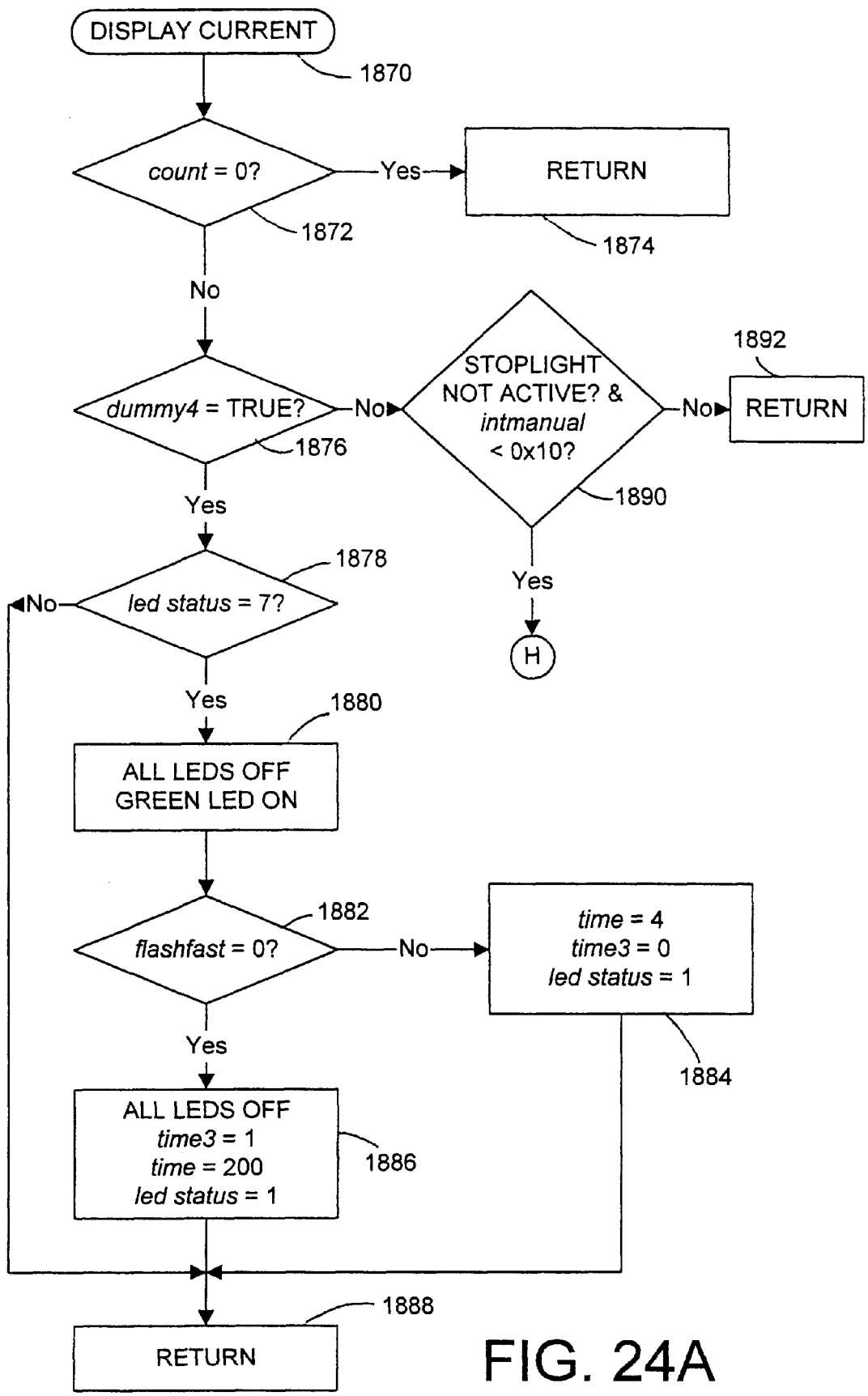
FIGS. 24A and 24B ire the flow diagrams of the "DISPLAY CURRENT" subroutine for the microcontroller of the third embodiment of the present invention.
Figure 24B:
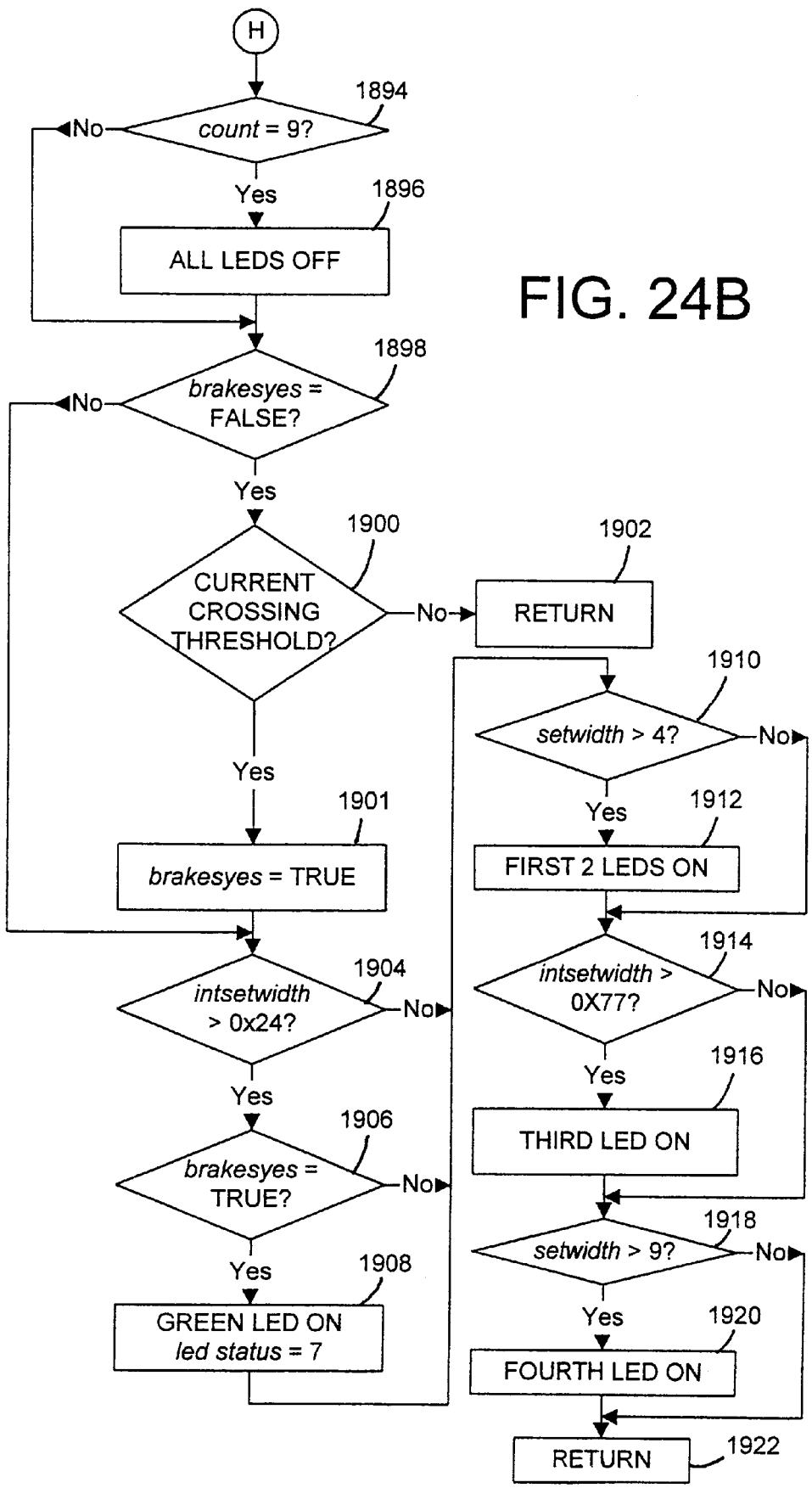

FIGS. 24A and B show the DISPLAY CURRENT subroutine for the microcontroller. Block 1870 signifies the beginning of the subroutine. Next, block 1872 determines if variable count is equal to 0 which would indicate overload current conditions. If it is, then there is no need to display the current magnitude, and the subroutine returns via block 1874. If block 1872 determines that variable count is not equal to 0, then block 1876 determines if variable dummy4 is TRUE, which would indicate that essentially no braking demand is present. If so, block 1878 determines if variable led status is equal to 7. Variable led status is set equal to 7 elsewhere in the program when the first display LED is turned on in order to indicate that the brake controller has been activated. Variable led status will be equal to 7 in block 1878 if it is the first time without a demand for brake current since the brake controller had been activated. If the condition of block 1878 is not satisfied, then the program proceeds to block 1888. If block 1878 determines that variable led status is equal to 7, then block 1880 turns all LEDs off and turns the green LED on. Next, block 1882 determines if variable flashfast is equal to 0. This variable is optionally set by the vehicles operator, and is 0 if indication of brakes being present is to be made by flashing the LED2 once every 8 seconds. Variable flashfast is not equal to 0 if a dimming of the LED2 is used to indicate that the brakes are present. If block 1882 determines that variable flashfast is equal to 0, then block 1886 turns all LEDs off, sets variable time3 equal to 1, sets variable time equal to 200, and sets variable led status equal to 1. The program then proceeds to block 1888. If block 1882 determines that variable flashfast is not equal to 0, then block 1884 sets variable time equal to 4, variable time3 equal to 0, and variable led status equal to 1. Block 1888 then causes the subroutine to return.

Returning analysis of the DISPLAY CURRENT subroutine to block 1876, if variable dummy4 equals FALSE (indicating that a demand for braking current is present), then block 1890 determines if the brakes of the towing vehicle have not been pressed and if variable integermanual is less than hexadecimal 10 such that very little manual braking has been demanded. If both conditions of block 1890 are satisfied, then the subroutine returns via block 1892. If both conditions of block 1890 are not satisfied, then block 1894 (FIG. 24B) determines if variable count is equal to 9. If it is not, then the program proceeds to block 1898. If the condition of block 1894 is satisfied, then block 1896 turns all LEDs off in order to reinitiate the display. Block 1898 then determines if variable brakesyes is FALSE, indicating that there is no electrical connections between the controller and the brakes. If this connection is present, the program proceeds to block 1904. If block 1898 determines that the brakes are not connected, then block 1900 determines if the sampled current is higher than a minimum threshold level indicating that brake current is definitely flowing and that the brakes must therefore be connected. This is a safety check which ensures that the setting of variable brakesyes is correct. If the sampled current does not cross the minimum threshold level, then block 1902 causes the subroutine to return. If block 1900 determines that sufficient current is flowing to indicate the presence of brakes, the program advances to block 1901, which sets the variable brakesyes equal to TRUE and block 1904 then determines if variable integersetwidth is greater than hexadecimal 24, which should always be the case at this point in the program. If for some reason it is not, then the program proceeds to block 1910. If block 1904 determines that variable integersetwidth is greater than hexadecimal 24, then block 1906 determines if variable brakesyes is TRUE, indicating that the brakes are connected. If not, then the program proceeds to block 1910. If block 1906 determines that the brakes are connected, then block 1908 turns the green LED on, and sets variable led status equal to 7 so that block 1878 (described above) knows that the brake controller has been made active. Block 1910 then determines if variable setwidth is greater than hexadecimal 4, which would indicate a particular threshold level of duty cycle of the PWM drive signal. If not, then the program proceeds to block 1914. If block 1910 determines that variable setwidth is greater than hexadecimal 4, then block 1912 turns the first two LEDs on. Next, block 1914 determines if variable intsetwidth is greater than hexadecimal 7 which would indicate another threshold level of duty cycle of the PWM drive signal. If not, then the program proceeds to block 1918. If block 1914 determines that variable intsetwidth is greater than hexadecimal 7, then block 1916 turns the third LED on. Block 1918 then determines if variable setwidth is greater than hexadecimal 9 which would indicate another threshold level of duty cycle of the PWM drive signal. If not, then the subroutine returns via block 1922. If the condition of block 1918 is satisfied, then block 1920 turns the fourth LED on, and the subroutine returns via block 1922.

The above description is considered that of the preferred embodiments only. Modifications of the invention will occur to those skilled in the art and to those who make or use the invention. Therefore, it is understood that the embodiments shown in the drawings and described above are merely for illustrative purposes and are not intended to limit the scope of the invention.

The embodiments of the invention in which an exclusive property or privilege is claimed are defined as follows:

1. A brake controller for controlling the brakes of a towed vehicle, said brake controller comprising:

an input circuit for generating a brake level signal representing the braking force to be applied by the towed vehicle's brakes;

a display circuit including a plurality of indicator lights;

a power switching circuit and adapted for coupling to the brakes of the towed vehicle and to the power supply of the towing vehicle, for selectively supplying power from the towing vehicle power supply to the brakes of the towed vehicle in response to a switching control signal supplied to a control input terminal;

a current sensing circuit for sensing a level of braking current supplied to the brakes of the towed vehicle through said power switching circuit, and for generating a current level signal representing the sensed level of braking current; and a microcontroller coupled to said input circuit, said display circuit, said current circuit, and to said power switching circuit, said microcontroller generating and supplying a switching control signal to said control input terminal of said power switching circuit thereby causing said power switching circuit to deliver a braking current to the brakes of the towed vehicle that is related to the brake level signal supplied to said microcontroller by said input circuit, said microcontroller illuminating one or more of said indicator lights of said display circuit to indicate a relative level of braking of the towed vehicle brakes and controlling one or more of said indicator lights to indicate that the towed vehicle brakes are or are not properly connected to said power switching circuit.

2. The brake controller as defined in claim 1, wherein one of said plurality of indicator lights is of a particular selected color different from others thereof, and wherein said microcontroller illuminates said different-colored light whenever braking current is supplied to the towed vehicle brakes.

3. The brake controller as defined in claim 2, wherein, during periods during which no braking is demanded, said microcontroller periodically causes said power switching circuit to supply a low level braking current to the towed vehicle brakes while monitoring the sensed braking current to determine whether an abnormality exists.

4. The brake controller as defined in claim 3, wherein said microcontroller continuously illuminates said different-colored light at a low intensity when no abnormality exists and no towed vehicle braking is demanded, and illuminates said different-colored light at a higher intensity when braking current is supplied to the towed vehicle brakes in response to a brake level signal.

5. The brake controller as defined in claim 3, wherein said microcontroller intermittently illuminates said different-colored light when no abnormality exists and no towed vehicle braking is demanded, and continuously illuminates said different-colored light when braking current is supplied to the towed vehicle brakes in response to a brake level signal.

6. The brake controller as defined in claim 3 and further including:

a manual input circuit for generating a display mode input signal in response to an actuation thereof by an operator of the towing vehicle, wherein, in a first display mode, said microcontroller continuously illuminates said different-colored light at a low intensity when no abnormality exists and no towed vehicle braking is demanded, and illuminates said different-colored light at a higher intensity when braking current is supplied to the towed vehicle brakes in response to a brake level signal, and in a second display mode, said microcontroller intermittently illuminates said different-colored light when no abnormality exists and no towed vehicle braking is demanded, and continuously illuminates said different-colored light when braking current is supplied to the towed vehicle brakes in response to a brake level signal, and wherein said microcontroller operates in the first or second display mode in response to a display mode input signal received from said manual input circuit.

7. The brake controller as defined in claim 1, wherein said microcontroller illuminates one or more of said indicator lights of the display device when a current overload is sensed in the towed vehicle brakes.

8. The brake controller as defined in claim 7, wherein a current overload is found to exist when a short circuit is sensed.

9. The brake controller as defined in claim 1, wherein, during periods during which no braking is demanded, said microcontroller periodically causes said power switching circuit to supply a low level braking current to the towed vehicle brakes while monitoring the sensed braking current to determine whether an abnormality exists.

10. The brake controller as defined in claim 1, wherein said power switching circuit includes at least one MOSFET, and wherein said current sensing circuit senses the current flowing through said power switching circuit by sensing the voltage across the drain and source of said MOSFET.

11. The brake controller as defined in claim 1, wherein said microcontroller is adapted to illuminate one or more of said indicator lights of the display device when a short circuit is sensed in the towed vehicle brakes.

12. The brake controller as defined in claim 1, wherein said microcontroller is adapted to determine that the towed vehicle brakes are not properly connected to said power switching circuit when said microcontroller applies the switching control signal to said power switching circuit and no braking current is sensed by said current sensing circuit.

13. A brake controller for controlling the brakes of a towed vehicle, said brake controller comprising:
- an input circuit for generating a brake level signal representing the braking force to be applied by the towed vehicle's brakes;
- a power switching circuit having a control input terminal and adapted for coupling to the brakes of the towed vehicle and to the power supply of the towing vehicle, for selectively supplying power from the towing vehicle power supply to the brakes of the towed vehicle in response to a switching control signal supplied to said control input terminal; and
- a microcontroller coupled to said input circuit and to said power switching circuit, said microcontroller being operable in a set-up mode and an operating mode, wherein, in said set-up mode, said microcontroller determines a number of axles of the towed vehicle and stores the number of axles, and in said operating mode, said microcontroller generates and supplies a switching control signal to said control input terminal of said power switching circuit thereby causing said power switching circuit to deliver a braking current to the brakes of the towed vehicle that is related to the brake level signal supplied to said microcontroller by said input circuit and that is adjusted by said microcontroller to account for the number of axles of the towed vehicle.

14. The brake controller as defined in claim 13 and further including:
- a display circuit coupled to said microcontroller for receiving display signals and for displaying information to the operator in response to said display signals that represents the relative braising force applied to the towed vehicle brakes,
- wherein said microcontroller scales the display signals that are supplied to said display circuit based upon the input number of axles of the towed vehicle.

15. The brake controller as defined in claim 14 and further including:
- a current sensing circuit coupled to said microcontroller for sensing a level of braking current supplied from said power switching circuit to the brakes of the towed vehicle, and for generating a current level signal representing the sensed level of braking current,
- wherein the display signals generated by said microcontroller represent the current level sensed by said current sensing current and said display circuit displays the sensed current level to the operator.

16. The brake controller as defined in claim 13 and further including:
- a display circuit coupled to said microcontroller for receiving display signals and for displaying information to the operator in response to said display signals that represents the relative braking force applied to the towed vehicle brakes,
- wherein said switching control signal is a pulse width modulated signal having a duty cycle that is varied by said microcontroller to correspond to the desired level of braking, and wherein the display signals generated by said microcontroller are representative of the duty cycle of the switching control signal and said display circuit displays information representative of the duty cycle to the operator.

17. The brake controller as defined in claim 13, wherein, in said set-up mode, said microcontroller prompts the operator of the towing vehicle to input data representative of the number of axles of the towed vehicle and determines the number of axles based upon the operator input.

18. A brake controller for controlling the brakes of a towed vehicle, said brake controller comprising:
- an input circuit for generating a brake level signal representing the braking force to be applied by the towed vehicle's brakes;
- a power switching circuit and adapted for coupling to the brakes of the towed vehicle and to the power supply of the towing vehicle, for selectively supplying power from the towing vehicle power supply to the brakes of the towed vehicle in response to a switching control signal supplied to a control input terminal; and
- a display circuit for receiving display signals and for displaying information to the operator in response to said display signals that represents the relative braking force applied to the towed vehicle brakes;
- a microcontroller coupled to said input circuit, to said display circuit, and to said power switching circuit, said microcontroller being operable in a set-up mode and an operating mode, wherein, in said set-up mode, said microcontroller determines a number of axles of the towed vehicle and stores the number of axles, and in said operating mode, said microcontroller generates and supplies a switching control signal to said control input terminal of said power switching circuit thereby causing said power switching circuit to deliver a braking current to the brakes of the towed vehicle that is related to the brake level signal supplied to said microcontroller by said input circuit, wherein said microcontroller scales the display signals that are supplied to said display circuit based upon the input number of axles of the towed vehicle.

19. A brake controller for controlling the brakes of a towed vehicle, said brake controller comprising:
- an input circuit for generating a brake level signal representing the braking force to be applied by the towed vehicle's brakes;
- a power switching circuit and adapted for coupling to the brakes of the towed vehicle and to the power supply of the towing vehicle, for selectively supplying power from the towing vehicle power supply to the brakes of the towed vehicle in response to a switching control signal supplied to a control input terminal;
- a microcontroller coupled to said input circuit and to said power switching circuit, said microcontroller generating and supplying a switching control signal to said control input terminal of said power switching circuit thereby causing said power switching circuit to deliver a braking current to the brakes of the towed vehicle that is related to the brake level signal supplied to said microcontroller by said input circuit; and
- malfunction monitoring means for monitoring the functioning of said microcontroller and resetting said microcontroller when a malfunction is detected.

20. The brake controller as defined in claim 19, wherein said malfunction monitoring means detects a malfunction when said microcontroller fails to execute a specified interrupt routine within a predetermined time period.

21. A brake controller for controlling the brakes of a towed vehicle, said brake controller comprising:
- a sensor input circuit including a decelerometer for sensing the deceleration of the towing vehicle and for generating a brake level signal representing the desired braking when the brakes of the towing vehicle are actuated and the sensed deceleration exceeds a threshold level, said sensor input circuit including means for adjusting the threshold level of said decelerometer;

a display circuit including an indicator light;

a power switching circuit having a control input terminal and adapted for coupling to the brakes of the towed vehicle and to the power supply of the towing vehicle, for selectively supplying power from the towing vehicle power supply to the brakes of the towed vehicle in response to a switching control signal supplied to said control input terminal; and a microcontroller coupled to said sensor input circuit, said display circuit, and to said power switching circuit, said microcontroller generating and supplying said switching control signal to said control input terminal of said power switching circuit thereby causing said power switching circuit to deliver a braking current to the brakes of the towed vehicle that is related to the brake level signal supplied to said microcontroller by said sensor input circuit, said microcontroller illuminating said indicator light of said display circuit when said microcontroller receives a brake level control signal from said sensor input circuit.

22. The brake controller as defined in claim 21, wherein said indicator light is a bicolored LED and said microcontroller illuminates said indicator light at a first color when a brake level signal is received from said sensor input circuit that falls within a first range of levels and illuminates said indicator light at a second color when a brake level signal is received from said sensor input circuit that falls within a second range of levels.

23. The brake controller as defined in claim 22, wherein said microcontroller is adapted to selectively illuminate said indicator light depending upon whether the threshold level of said decelerometer is correctly or incorrectly adjusted.

24. The brake controller as defined in claim 23, wherein, when said means for adjusting the threshold level of said decelerometer is adjusted such that said sensor input circuit generates a brake level signal when the towing vehicle is parked, said microcontroller adapted to determine that the threshold level of said decelerometer is incorrectly adjusted and to extinguish the indicator light in response to such determination.

25. The brake controller as defined in claim 22, wherein said bicolored LED is a green/red LED and said microcontroller illuminates the green LED of said indicator light when a brake level signal is received from said sensor input circuit that falls within said first range and illuminates the red LED of said indicator light when a brake level signal is received from said sensor input circuit that falls within said second range.

26. The brake controller as defined in claim 22, wherein during operation, said microprocessor controls said bicolored LED to provider an indication of the adjusted sensitivity of said decelerometer relative to the braking force of the towing vehicle at the time that said bicolored LED changes color.

27. In an electronic brake control system having a power switching circuit for selectively supplying braking current to the towed vehicle brakes in response to a control signal, a method comprising the steps of:

determining whether the brakes of the towed vehicle are to be activated;

periodically generating and supplying a control signal to the power switching circuit to supply a level of braking current that is too low to cause noticeable braking of the towed vehicle when it is determined that the brakes of the towed vehicle are not to be activated;

sensing the braking current flowing through said power switching circuit when the control signal is periodically generated;

determining whether the braking system is operating abnormally based upon the sensed level of braking current; and generating a warning signal to warn an operator of the towing vehicle of abnormal operation when the sensed braking current is not at an expected current level.

28. The method of claim 27, wherein the step of determining whether the braking system is operating abnormally includes determining that an abnormality exists resulting from the brakes of the towed vehicle not being connected to the brake controller when the sensed braking current is below an open circuit threshold level.

29. The method of claim 27, wherein the step of determining whether the braking system is operating abnormally includes determining that an abnormality exists resulting from a short circuit in the brakes of the towed vehicle when the sensed braking current is above a short circuit threshold level.

30. The method of claim 27, wherein the step of determining whether the braking system is operating abnormally includes determining that an abnormality exists resulting from an open ground connection.

31. The method of claim 27, wherein the brake controller includes a microcontroller and the steps are all executed by the microcontroller.

32. The method of claim 27, wherein the step of determining whether the brakes of the towed vehicle are to be activated includes sensing whether a brake light of the towing vehicle is illuminated.

33. The method of claim 27, wherein the step of determining whether the brakes of the towed vehicle are to be activated includes sensing whether a manual braking input has been actuated.

34. In an electronic brake control system having a power switching circuit for selectively supplying braking current to the towed vehicle brakes in response to a pulse width modulated control signal having a variable duty cycle, a method comprising the steps of:

applying a pulse width modulated control signal to the power switching circuit;

sensing the braking current flowing through the power switching circuit;

determining that a short circuit or current overload condition exists in the brakes of the towed vehicle when the sensed braking current exceeds a threshold current level; and changing the duty cycle and the frequency of the pulse width modulated control signal applied to the power switching circuit to selectively reduce the supplied braking current when a short circuit or current overload condition is found to exist.

35. The method of claim 34 further including the step of generating a warning signal to an operator of the towing vehicle when a short circuit or current overload condition is found to exist.

36. The method of claim 35 wherein the step of generating a warning signal includes illuminating a warning light in the view of an operator of the towing vehicle when a short circuit or current overload condition is found to exist.

37. The method of claim 34 further including the steps of:

sensing the braking current flowing through the power switching circuit in response to the pulse width modulated control signal having the changed duty cycle to determine whether the braking current still exceeds the threshold current level; and terminating the supply of braking current to the brakes of the towed vehicle if the sensed braking current still exceeds the threshold level.

38. The method of claim 34 wherein the step of changing the duty cycle of the pulse width modulated control signal includes changing the duty cycle to cause the level of supplied braking current to be at about 70% of the threshold level.

39. The method of claim 34 further including the step of:
periodically supplying braking current to the towed vehicle brakes after the supply of braking current has been terminated due to said short circuit or current overload condition in order to determine whether a short circuit condition persists, and continuing to periodically supply such braking current while the short circuit or current overload condition persists.

40. The method of claim 34, wherein the step of changing the duty cycle and the frequency of the pulse width modulated control signal includes reducing the supplied braking current to a predetermined level below the threshold current level when the sensed braking current level exceeds the threshold current level.

41. A brake controller for controlling the brakes of a towed vehicle, said brake controller comprising:
an input circuit for generating a brake level signal representing the braking force to be applied by the towed vehicle's brakes;
a display circuit including a plurality of indicator lights;
a power switching circuit adapted for coupling to the brakes of the towed vehicle and to the power supply of the towing vehicle, for selectively supplying power from the towing vehicle power supply to the brakes of the towed vehicle in response to a switching control signal supplied to a control input terminal;
a microcontroller coupled to said input circuit, to said display circuit, and to said power switching circuit, said microcontroller in an operating mode generating and supplying a switching control signal to said control input terminal of said power switching circuit thereby causing said power switching circuit to deliver a braking current to the brakes of the towed vehicle that is related to the brake level signal supplied to said microcontroller by said input circuit while illuminating one or more of said indicator lights to indicate a relative level of towed vehicle braking, and said microcontroller in a self-testing mode gradually and continuously varying the level of the switching control signal while inhibiting power from being supplied through said power switching circuit and illuminating one or more of said indicator lights to reflect the changing levels of the switching control signal.

42. The brake controller as defined in claim 41, wherein said microcontroller gradually and continuously sweeps the level of the switching control signal repeatedly from its highest to lowest levels and back to its highest level during the self-testing mode.

43. The brake controller as defined in claim 41, wherein said microcontroller gradually and continuously sweeps the level of the switching control signal repeatedly from its lowest to highest levels and back to its lowest level during the self-testing mode.

44. A brake controller for controlling the brakes of a towed vehicle, said brake controller comprising:
a brake light circuit adapted for coupling to a brake light of a towing vehicle for generating an output signal when the brake light is illuminated as a basis for determining that the brakes of the towing vehicle are actuated;
a sensor input circuit coupled to said brake light circuit for sensing the deceleration of the towing vehicle in response to said output signal from said brake light circuit;
a manual input circuit for receiving input from an operator of the towing vehicle of a desired braking force of the towed vehicle's brakes;
a gain adjustment circuit coupled to said manual input circuit and to said sensor input circuit for receiving brake level signals output therefrom that are indicative of a desired level of braking and for generating a gain-adjusted brake level signal in response to a brake level signal received from either said manual input circuit or said sensor input circuit;
a power control circuit adapted for coupling to a power supply of the towing vehicle for supplying power to the brakes of the towed vehicle;
a power switching circuit coupled to said power control circuit and having a brake terminal adapted for coupling to the brakes of the towed vehicle, for selectively supplying power from said power control circuit to the brakes of the towed vehicle in response to a switching control signal supplied to a control input terminal;
a current sensing circuit for sensing a level of braking current supplied from said power control circuit to the brakes of the towed vehicle through said power switching circuit, and for generating a current level signal representing the sensed level of braking current;
a display circuit for displaying information to the operator of the towing vehicle;
a microcontroller coupled to said brake light circuit, said sensor input circuit, said manual input circuit, said gain adjustment circuit, said power control circuit, said power switching circuit, said current sensing circuit, and to said display circuit, said microcontroller adapted to generate and supply a switching control signal to said control input terminal of said power switching circuit thereby causing said power switching circuit to deliver a braking current to the brakes of the towed vehicle that is related to the gain-adjusted brake level signal supplied to said microcontroller by said gain adjusting circuit.

45. The brake controller as defined in claim 44, wherein said switching control signal is a pulse width modulated signal.

46. The brake controller as defined in claim 45, wherein said pulse width modulated signal has a duty cycle that is varied in inverse proportion to the desired level of braking.

47. The brake controller as defined in claim 44, wherein said gain adjusting circuit includes a ramping circuit having a first time constant for gradually increasing the gain of a brake level signal when first applied thereto to gradually apply the towed vehicle brakes.

48. The brake controller as defined in claim 47, wherein said ramping circuit has a second time constant shorter than the first time constant for rapidly responding to a drop in level of a brake signal applied thereto from said sensor input circuit or said manual input circuit.

49. The brake controller as defined in claim 44, wherein said microcontroller disrupts the supply of power from said power control circuit that is delivered to said power switching circuit when no brake level signal is generated by either said sensor input circuit or said manual input circuit.

50. The brake controller as defined in claim 44, wherein said microcontroller disables said sensor input circuit when a brake level signal is received from said manual input circuit.

51. The brake controller as defined in claim 44, wherein said microcontroller monitors the level of current actually supplied to the brakes of the towed vehicle as sensed by said current sensing circuit, and generates and supplies current level display signals to said display circuit for providing an indication to the operator of the towing vehicle of the level of current supplied to the brakes of the towed vehicle.

52. The brake controller as defined in claim 44, wherein said microcontroller controls said power switching circuit to discontinue the supply of current to the towed vehicle brakes when the level of current supplied to the brakes as sensed by said current sensing circuit exceeds a threshold level.

53. The brake controller as defined in claim 44, wherein said microcontroller periodically generates a switching control signal causing said power switching circuit to provide power to the towed vehicle brakes while monitoring the sensed current level after it is determined that the sensed current level has exceeded the threshold level until the sensed current level falls below the threshold level.

54. The brake controller as defined in claim 44, wherein said microcontroller disrupts the supply of power from said power control circuit that is delivered to said power switching circuit when no brake level signal is generated by either said sensor input circuit or said manual input circuit and when no periodic switching control signal is generated by said microcontroller.

55. The brake controller as defined in claim 44, wherein said microcontroller periodically generates a switching control signal causing said power switching circuit to connect said power control circuit momentarily to said brake terminal while monitoring the current flowing through said power switching circuit to determine whether the towed vehicle brakes are connected to said brake terminal, and wherein said microcontroller generates and supplies a warning signal to said display circuit when the towed vehicle brakes are not connected to said brake terminal.

56. The brake controller as defined in claim 44, wherein said microcontroller performs a setup routine by prompting the operator of the towing vehicle to input a number of axles of the towed vehicle and by storing the input number of axles.

57. The brake controller as defined in claim 56, wherein said microcontroller scales the current level display signals that are supplied to said display circuit based upon the input number of axles of the towed vehicle.

58. The brake controller as defined in claim 44, wherein said sensor input circuit is normally disabled and is enabled when said brake light circuit determines that the towing vehicle brake switch is activated.

59. The brake controller as defined in claim 44, wherein said microcontroller attempts to reduce the level of braking current supplied to the towed vehicle brakes when an overload current condition is present.

60. The brake controller as defined in claim 44, wherein said power switching circuit includes at least one MOSFET, and wherein said current sensing circuit senses the current flowing through said power switching circuit by sensing the voltage across the drain and source of said MOSFET.

61. In an electronic brake control system having a power switching circuit for selectively supplying braking current to the towed vehicle brakes in response to a control signal, a method comprising the steps of:
   determining whether the brakes of the towed vehicle are to be activated;
   periodically generating and supplying a first control signal to the power switching circuit to supply a level of braking current that is too low to cause noticeable braking of the towed vehicle when it is determined that the brakes of the towed vehicle are not to be activated;
   identifying and storing a baseline braking current flowing through the power switching circuit when the first control signal is periodically generated;
   generating and supplying a second control signal to the power switching circuit when it is determined that the brakes of the towed vehicle are to be activated, said second control signal having a level corresponding to the desired level of braking;
   sensing the braking current supplied to the towed vehicle brakes by the power switching circuit in response to the second control signal; and
   displaying an indication of the magnitude of braking current supplied to the towed vehicle brakes by generating a display corresponding to the difference between the magnitudes of the baseline braking current and the sensed braking current.

62. The method of claim 61 further including the steps of:
   comparing the magnitude of the baseline braking current to a threshold level to determine whether lamp load is mistakenly connected to a brake magnet terminal through which the power switching circuit supplies power to the towed vehicle brakes; and
   generating a warning signal to warn an operator of the towing vehicle that the lamp load is improperly connected when the baseline braking current exceeds the threshold level.

63. In an electronic brake control system having a power switching circuit for selectively supplying braking current to the towed vehicle brakes in response to a control signal, a method comprising the steps of:
   determining whether the brakes of the towed vehicle are to be activated;
   periodically generating and supplying a control signal to the power switching circuit to supply a level of braking current that is too low to cause noticeable braking of the towed vehicle when it is determined that the brakes of the towed vehicle are not to be activated;
   sensing the braking current flowing through said power switching circuit when the control signal is periodically generated;
   determining whether the braking system is operating abnormally based upon the sensed level of braking current; and
   generating a signal to advise an operator of the towing vehicle that the towed vehicle's brakes are connected properly unless an abnormal operation is detected.

64. A brake controller for controlling the brakes of a towed vehicle, said brake controller comprising:
   an input circuit for generating a brake level signal representing the braking force to be applied by the towed vehicle's brakes;
   a power switching circuit adapted for coupling to the brakes of the towed vehicle and to the power supply of the towing vehicle, for selectively supplying power from the towing vehicle power supply to the brakes of the towed vehicle in response to a pulse width modulated control signal supplied to a control input terminal whereby the braking current supplied to the towed vehicle brakes corresponds to a duty cycle of the pulse width modulated control signal; and
   a microcontroller coupled to said input circuit and to said power switching circuit, said microcontroller generating and supplying the pulse width modulated control signal to said control input terminal of said power switching circuit, said microcontroller varying the duty cycle of the pulse width modulated control signal in response to the brake level signal supplied to said microcontroller by said input circuit to thereby cause said power switching circuit to deliver a braking current to the brakes of the towed vehicle that corresponds to the desired level of braking.

65. The brake controller as defined in claim 64 and further including:

a display circuit coupled to said microcontroller for receiving display signals and for displaying information to the operator in response to said display signals that represents the relative braking force applied to the towed vehicle brakes.

66. The brake controller as defined in claim 65, wherein display signals generated by said microcontroller correspond to the duty cycle of the switching control signal and said display circuit displays information corresponding to the duty cycle to the operator.

67. The brake controller is defined in claim 66, wherein said display circuit includes a plurality of LEDs that are illuminated to display a relative percentage of the duty cycle of the pulse width modulated control signal.

68. The brake controller as defined in claim 67 and further including:

a current sensing circuit coupled to said microcontroller for sensing a level of braking current supplied from said power switching circuit to the brakes of the towed vehicle, and for generating a current level signal representing the sensed level of braking current, wherein said microcontroller activates the LEDs of the display circuit only when braking current is sensed by said current sensing circuit.

69. The brake controller as defined in claim 65 and further including:

a current sensing circuit coupled to said microcontroller for sensing a level of braking current supplied from said power switching circuit to the brakes of the towed vehicle, and for generating a current level signal representing the sensed level of braking current, wherein the display signals generated by said microcontroller represent the current level sensed by said current sensing current and said display circuit displays the sensed current level to the operator.

70. The brake controller as defined in claim 64, wherein said input circuit includes a decelerometer comprising an inertia sensor that determines an extent of deceleration and generates said brake level signal.

71. The brake controller is defined in claim 70, wherein said microcontroller further includes means for detecting a short circuit condition in said power switching circuit and towed vehicle brakes.

72. The brake controller as defined in claim 64, wherein said microcontroller is programmed to execute a first interrupt routine at a periodic interval which causes the pulse width modulation control signal to go from a low to a high voltage level, and wherein said microcontroller is programmed to execute a second interrupt routine at a selected time period following the execution of said first interrupt routine, said second interrupt routine causing the pulse width modulation control signal to go from a high to a low voltage level, said microcontroller adapted to set said selected time period based upon the desired level of braking to achieve a corresponding duty cycle for the pulse width modulated control signal.

73. The brake controller as defined in claim 64, wherein said microcontroller varies the duty cycle of the pulse width modulated control signal at smaller increments for lower levels of demanded braking to allow for fine adjustment of supplied braking current.

74. The brake controller as defined in claim 64, wherein said power switching circuit is adapted for direct coupling to a power source of the towing vehicle.

75. The brake controller as defined in claim 64, wherein said microcontroller further includes means for detecting a short circuit condition in said power switching circuit and towed vehicle brakes.

76. The brake controller as defined in claim 64, wherein said microcontroller varies the duty cycle of the pulse width modulated control signal in inverse proportion to the demand for braking current.

* * * * *

UNITED STATES PATENT AND TRADEMARK OFFICE
CERTIFICATE OF CORRECTION

PATENT NO.    : 6,068,352
DATED         : May 30, 2000
INVENTOR(S)   : Kulkarni et al.

It is certified that error appears in the above-identified patent and that said Letters Patent is hereby corrected as shown below:

Column 3,
Line 3, delete "(" (parenthesis).
Line 12, "i," should be -- is --.
Line 18, "insect" should be -- aspect --.

Column 5,
Line 19, "ire" should be -- are --.

Column 7,
Line 41, "controller" should be -- controllers --.

Column 13,
Line 8, "LEDS" should be -- LED5 --.

Column 15,
Line 16, "*serwidth*" should be -- *setwidth* --.

Column 16,
Line 52, "it" should be -- if --.

Column 18,
Line 48, "hid" should be -- had --.

Column 23,
Line 44, "LE1)'s" should be -- LEDs --.

Column 25,
Line 32, "ire" should be -- are --.

Column 27,
Line 31, "gainmsb (1st occurrence)" should be -- gainlsb --.

Column 32,
Line 16, "*serwidth*" should be -- *setwidth* --.

Column 37,
Line 19, "142" should be -- 1842 --.
Line 43, "1855" should be -- 1856 --.

UNITED STATES PATENT AND TRADEMARK OFFICE
CERTIFICATE OF CORRECTION

PATENT NO. : 6,068,352
DATED : May 30, 2000
INVENTOR(S) : Kulkarni et al.

It is certified that error appears in the above-identified patent and that said Letters Patent is hereby corrected as shown below:

Column 41, claim 14,
Line 32, "braising" should be -- braking --.

Signed and Sealed this

Thirteenth Day of November, 2001

Attest:

*Attesting Officer*

NICHOLAS P. GODICI
*Acting Director of the United States Patent and Trademark Office*